US012736671B2

(12) United States Patent
Reed et al.

(10) Patent No.: US 12,736,671 B2
(45) Date of Patent: Sep. 15, 2026

(54) NEURAL VOLUMETRIC RECONSTRUCTION FOR COHERENT SYNTHETIC APERTURE SONAR

(71) Applicants: Arizona Board of Regents on Behalf of Arizona State University, Scottsdale, AZ (US); Trustees of Dartmouth College, Hanover, NH (US); The Penn State Research Foundation, University Park, PA (US)

(72) Inventors: Albert Reed, Tempe, AZ (US); Juhyeon Kim, Hanover, NH (US); Thomas Blanford, State College, PA (US); Adithya Pediredla, Hanover, NH (US); Daniel Brown, State College, NH (US); Suren Jayasuriya, Chandler, AZ (US)

(73) Assignees: Arizona Board of Regents on Behalf of Arizona State University, Scottsdale, AZ (US); Trustees of Dartmouth College, Hanover, NH (US); The Penn State Research Foundation, University Park, PA (US)

( * ) Notice: Subject to any disclaimer, the term of this patent is extended or adjusted under 35 U.S.C. 154(b) by 187 days.

(21) Appl. No.: 18/647,408

(22) Filed: Apr. 26, 2024

(65) Prior Publication Data

US 2024/0369703 A1 Nov. 7, 2024

Related U.S. Application Data

(60) Provisional application No. 63/462,809, filed on Apr. 28, 2023.

(51) Int. Cl.
*G01S 7/539* (2006.01)
*G01S 15/89* (2006.01)

(52) U.S. Cl.
CPC .......... *G01S 15/8904* (2013.01); *G01S 7/539* (2013.01)

(58) Field of Classification Search
CPC ............................. G01S 15/8904; G01S 7/539
See application file for complete search history.

(56) References Cited

U.S. PATENT DOCUMENTS

| | | | | |
|---|---|---|---|---|
| 6,286,104 | B1 * | 9/2001 | Buhle | H04L 63/105 707/999.009 |
| 7,529,481 | B1 * | 5/2009 | Doerr | G01J 11/00 398/16 |

(Continued)

OTHER PUBLICATIONS

Ahn et al., "Convolutional approximations to the general non-line-of-sight imaging operator", Proceedings of the IEEE/CVF International Conference on Computer Vision, 2019, p. 7889-7899, (Applicant points out, in accordance with MPEP 609.04(a), that the year of publication, 2019, is sufficiently earlier than the effective U.S. filing date, so that the particular month of publication is not an issue.).

(Continued)

*Primary Examiner* — Abdallah Abulaban
*Assistant Examiner* — Amie M Ndure
(74) *Attorney, Agent, or Firm* — Shumaker & Sieffert, P.A.

(57) ABSTRACT

A system may be configured for implementing neural volumetric reconstruction for coherent synthetic aperture sonar. Exemplary systems include means for measuring underwater objects using high-resolution Synthetic aperture sonar (SAS) by coherently combining data from a moving array to form high-resolution imagery. Such a system may receive a waveform from the measurements of the underwater object and optimize the waveform for deconvolving via an iterative deconvolution optimization process applying an adaptable approach to waveform compression where performance is (Continued)

tuned via sparsity and smoothness parameters. Such a system may deconvolve the wave form using pulse deconvolution and use the deconvolved waveforms in an analysis-by-synthesis optimization operation with an implicit neural representation to yield higher resolution and superior volumetric reconstruction scene of the underwater object.

20 Claims, 26 Drawing Sheets

(56) References Cited

U.S. PATENT DOCUMENTS

| | | | | |
|---|---|---|---|---|
| 2005/0220231 | A1* | 10/2005 | Bott | H04L 25/03292 375/350 |
| 2007/0034012 | A1* | 2/2007 | Amir | G01N 29/0609 73/644 |
| 2008/0208505 | A1* | 8/2008 | Amir | G01N 29/343 702/103 |
| 2010/0066586 | A1* | 3/2010 | Liu | G01S 3/74 342/33 |
| 2010/0201359 | A1* | 8/2010 | Rottengatter | G01V 3/32 324/303 |
| 2010/0238787 | A1* | 9/2010 | Guey | H04L 27/2657 370/208 |
| 2013/0097292 | A1* | 4/2013 | Yoakum | H04M 3/42 709/221 |
| 2013/0177275 | A1* | 7/2013 | Rossi | H01S 3/0057 385/14 |
| 2014/0306707 | A1* | 10/2014 | Walsworth | G01R 33/4616 324/309 |
| 2017/0299664 | A1* | 10/2017 | Walsworth | G01R 33/1284 |
| 2018/0074149 | A1* | 3/2018 | Walsworth | G01R 33/60 |
| 2019/0079180 | A1* | 3/2019 | Offe | G01S 13/42 |
| 2019/0094803 | A1* | 3/2019 | Futterer | G02B 5/0257 |
| 2020/0319300 | A1* | 10/2020 | Loffe | G01S 7/415 |
| 2021/0157312 | A1* | 5/2021 | Cella | G01M 13/028 |
| 2021/0329892 | A1* | 10/2021 | Kozachenok | A01K 61/95 |
| 2021/0356776 | A1* | 11/2021 | Ip | G01H 9/004 |
| 2022/0108262 | A1* | 4/2022 | Cella | G01N 29/14 |
| 2022/0236692 | A1* | 7/2022 | Futterer | G02B 27/0927 |
| 2023/0275908 | A1* | 8/2023 | Mace | H04L 63/1416 726/23 |

OTHER PUBLICATIONS

Arellano et al., "Fast back-projection for non-line of sight reconstruction", Optics Express, vol. 25, No. 10, Optica Publishing Group, May 15, 2017, pp. 11574-11583.
Attal et al., "TöRF: Time-of-Flight Radiance Fields for Dynamic Scene View Synthesis", Advances in Neural Information Processing Systems, vol. 34, Dec. 6, 2021, 13 pp.
Bamler, "A comparison of range-Doppler and wavenumber domain SAR focusing algorithms", IEEE Transactions on Geoscience and Remote Sensing, vol. 30, No. 4, IEEE, Jul. 1992, p. 706-713.
Bellettini et al., "Design and experimental results of a 300-kHz synthetic aperture sonar optimized for shallow-water operations", IEEE Journal of Oceanic Engineering, vol. 34, No. 3, Jul. 2008, p. 285-293.
Bertero et al., "Introduction to inverse problems in imaging", vol. 2, CRC Press, Dec. 20, 2021, 358 pp.
Bian et al., "Evaluation of sparse-view reconstruction from flat-panel-detector cone-beam CT", Physics in Medicine & Biology, vol. 55, No. 22, Nov. 21, 2010, p. 6575-6599.
Blanford et al., "Development of an in-air circular synthetic aperture sonar system as an educational tool", 177th Meeting of the Acoustical Society of America, vol. 36, No. 1, Acoustical Society of America, May 13, 2019, 11 pp., https://doi.org/10.1121/2.0001025.
Blanford et al., "Leveraging audio hardware for underwater acoustics experiments", Proceedings of Meetings on Acoustics, vol. 46, No. 1, Acoustical Society of America, May 23, 2022, 12 pp.
Borgefors, "Distance transformations in digital images", Computer Vision, Graphics, and Image Processing, vol. 34, No. 3, Elsevier, Jun. 1, 1986, p. 344-371.
Bouman, "Foundations of Computational Imaging: A Model-Based Approach", SIAM—Society for Industrial and Applied Mathematics, Jul. 6, 2022, 349 pp.
Bracewell et al., "The Fourier transform and its applications", McGraw-Hill Science/Engineering/Math, Jun. 8, 1999, 640 pp.
Brown et al., "A point-based scattering model for the incoherent component of the scattered field", Journal of the Acoustical Society of America, Acoustical Society of America, Mar. 6, 2017, p. EL210-EL215.
Brown et al., "Final Report: Sediment vol. Search Sonar Development", SERDP Project MR-2545, May 20, 2021, 165 pp., https://serdp-estcp.org/projects/details/97e4a43c-bb65-432d-94ba-6aaff361571a.
Brown et al., "Interpolation kernels for synthetic aperture sonar along-track motion estimation", Journal of Oceanic Engineering, IEEE, Jun. 2019, 9 pp.
Brown et al., "Simulation and testing results for a sub-bottom imaging sonar", 177th Meeting of the Acoustical Society of America, vol. 36, May 13, 2019, 13 pp.
Brown, "Modeling and measurement of spatial coherence for normal incidence seafloor scattering", Ph.D. Dissertation, The Pennsylvania State University, 2017, 195 pp., (Applicant points out, in accordance with MPEP 609.04(a), that the year of publication, 2017, is sufficiently earlier than the effective U.S. filing date, so that the particular month of publication is not an issue.).
Callenberg et al., "Low-Cost SPAD Sensing for Non-Line-of-Sight Tracking, Material Classification and Depth Imaging", ACM Transactions on Graphics (TOG), vol. 40, No. 4, Jul. 19, 2021, 12 pp.
Callow et al., "Effect of approximations in fast factorized backprojection in synthetic aperture imaging of spot regions", Oceans, IEEE, Sep. 18, 2006, 6 pp.
Callow et al., "Motion-Compensation Improvement for Widebeam, Multiple-Receiver SAS Systems", IEEE Journal of Oceanic Engineering, vol. 34, No. 3, IEEE, Aug. 5, 2009, p. 262-268.
Callow, "Signal Processing for Synthetic Aperture Sonar Image Enhancement", Ph.D. Dissertation, University of Canterbury, Apr. 2003, 273 pp.
Cao et al., "Interactive sound propagation with bidirectional path tracing", ACM Transactions on Graphics (TOG), vol. 35, No. 6, Nov. 2016, 11 pp.
Cao et al., "Towards Understanding the Spectral Bias of Deep Learning", arXiv:1912.01198v3, Oct. 5, 2020, 29 pp.
Chadwick et al., "Animating fire with sound", ACM Transactions on Graphics (TOG), vol. 30, No. 4, Jul. 25, 2011, 8 pp.
Chadwick et al., "Harmonic Shells: A Practical Nonlinear Sound Model for Near-Rigid Thin Shells", ACM Transactions on Graphics, vol. 28, No. 5, Dec. 1, 2009, 10 pp.
Chaillan et al., "Speckle noise reduction in SAS imagery", Signal Processing, vol. 87, No. 4, Elsevier B.V., Aug. 30, 2006, pp. 762-781.
Chaitanya et al., "Directional Sources and Listeners in Interactive Sound Propagation Using Reciprocal Wave Field Coding", ACM Trans, vol. 39, No. 4, Jul. 2020, 14 pp., https://doi.org/10.1145/3386569.3392459.
Chandran et al., "Adaptive Lighting for Data-Driven Non-Line-of-Sight 3D Localization and Object Identification", arXiv:1905.11595v2, Jul. 26, 2019, 22 pp.
Chen et al., "Steady-state non-line-of-sight imaging", Proceedings of the IEEE/CVF Conference on Computer Vision and Pattern Recognition, IEEE, 2019, p. 6790-6799, (Applicant points out, in accordance with MPEP 609.04(a), that the year of publication, 2019, is sufficiently earlier than the effective U.S. filing date, so that the particular month of publication is not an issue.).
Cook et al., "Analysis of phase error effects on stripmap SAS", IEEE Journal of Oceanic Engineering, vol. 34, No. 3, IEEE, Aug. 5, 2009, p. 250-261.
Cook, "Synthetic aperture sonar motion estimation and compensation", Ph.D. Dissertation, Georgia Institute of Technology, May 2007, 173 pp.

(56) References Cited

OTHER PUBLICATIONS

Cowen et al., "AirSAS: Controlled Dataset Generation for Physics-Informed Machine Learning", 35th Conference on Neural Information Processing Systems (NeurIPS 2021), Dec. 2021, 4 pp.
Eaves et al., "Principles of modern radar", Springer Science & Business Media, vol. 1, Scitech Publishing, Inc., Dec. 6, 2012, 1124 pp.
Ferguson et al., "Application of acoustic reflection tomography to sonar imaging", Journal of the Acoustical Society of America, vol. 117, No. 5, Apr. 28, 2005, p. 2915-2928.
Ferguson et al., "Generalized framework for real aperture, synthetic aperture, and tomographic sonar imaging", Journal of Oceanic Engineering, vol. 34, No. 3, IEEE, Jul. 2009, p. 225-238.
Fienup, "Synthetic-aperture radar autofocus by maximizing sharpness", Optics letters, vol. 25, No. 4, Optical Society of America, Feb. 15, 2000, p. 221-223.
Fortune et al., "Statistical Autofocus of Synthetic Aperture Sonar Images using Image Contrast Optimisation", MTS/IEEE Oceans, vol. 1, IEEE, Feb. 2001, p. 163-169.
Fridovich-Keil et al., "Plenoxels: Radiance Fields without Neural Networks", Proceedings of the IEEE/CVF conference on computer vision and pattern recognition, IEEE, 2022, pp. 5501-5551, (Applicant points out, in accordance with MPEP 609.04(a), that the year of publication, 2022, is sufficiently earlier than the effective U.S. filing date, so that the particular month of publication is not an issue.).
Gerg et al., "GPU Acceleration for Synthetic Aperture Sonar Image Reconstruction", Global Oceans 2020: Singapore—US Gulf Coast, IEEE, May 26, 2021, 9 pp.
Gerg et al., "Real-Time, Deep Synthetic Aperture Sonar (SAS) Autofocus", 2021 IEEE International Geoscience and Remote Sensing Symposium IGARSS, IEEE, Jun. 1, 2021, 4 pp.
Goehle et al., "Approximate extraction of late-time returns via morphological component analysis", The Journal of the Acoustical Society of America, May 1, 2023, pp. 2838-2854.
Gough et al., "Imaging algorithms for a strip-map synthetic aperture sonar: Minimizing the effects of aperture errors and aperture undersampling", IEEE Journal of Oceanic Engineering, vol. 22, No. 1, IEEE, Jan. 1997, p. 27-39.
Gough et al., "Unified framework for modern synthetic aperture imaging algorithms", International Journal of Imaging Systems and Technology, vol. 8, No. 4, John Wiley & Sons, Inc., Jan. 18, 1997, p. 343-358.
Greg et al., "Deep Autofocus for Synthetic Aperture Sonar", arXiv preprint arXiv:2010.15687, Jun. 1, 2021, 4 pp.
Griffiths et al., "Interferometric synthetic aperture sonar for high-resolution 3-D mapping of the seabed", IEE Proceedings-Radar, Sonar and Navigation, vol. 144, No. 2, Apr. 1, 1997, p. 96-103.
Gul et al., "Underwater acoustic channel modeling using BELLHOP ray tracing method", 14th International Bhurban Conference on Applied Sciences and Technology (IBCAST), IEEE, Jan. 10, 2017, p. 665-670.
Hamilton et al., "FDTD Methods for 3-D Room Acoustics Simulation With High-Order Accuracy in Space and Time", IEEE/ACM Transactions on Audio, Speech, and Language Processing, vol. 25, No. 11, Aug. 25, 2017, p. 2112-2124.
Hansen et al., "Challenges in seafloor imaging and mapping with synthetic aperture sonar", IEEE Transactions on Geoscience and Remote Sensing, vol. 49, No. 10, IEEE, Jul. 4, 2011, p. 3677-3687.
Hansen et al., "Signal processing for AUV based interferometric synthetic aperture sonar", Oceans 2003, IEEE, Sep. 22, 2003, 7 pp.
Harrison, "Introduction to Radar using Python and MATLAB", Artech House, Oct. 31, 2019, 581 pp.
Hawkins, "Synthetic aperture imaging algorithms: with application to wide bandwidth sonar", Ph.D. Dissertation, University of Canterbury, Oct. 1996, 266 pp.
Hayes et al., "Broad-band synthetic aperture sonar", IEEE Journal of Oceanic Engineering, vol. 17, No. 1, IEEE, Jan. 1992, p. 80-94.
Hayes et al., "Synthetic aperture sonar: A review of current status", IEEE Journal of Oceanic Engineering, vol. 34, No. 3, IEEE, Jul. 2009, p. 207-224.
Heering et al., "A Deconvolution Algorithm for Broadband Synthetic Aperture Data Processing", Journal of Oceanic Engineering, vol. 19, No. 1, IEEE, Jan. 1994, p. 73-83, https://doi.org/10.1109/48.289452.
Heide et al., "Lowbudget transient imaging using photonic mixer devices", ACM Transactions on Graphics (ToG), vol. 32, No. 4, Jul. 21, 2013, 10 pp.
Iseringhausen et al., "Non-line-of-sight reconstruction using efficient transient rendering", ACM Transactions on Graphics (ToG), vol. 39, No. 1, Jan. 16, 2020, 14 pp.
Jensen et al., "Synthetic aperture ultrasound imaging", Ultrasonics, vol. 44, Elsevier, Aug. 11, 2006, p. e5-e15.
Johnson et al., "SAS simulations with procedural texture and the point-based sonar scattering model", Oceans 2018 MTS/IEEE Charleston, IEEE, Aug. 22, 2018, 7 pp.
Kadambi et al., "Coded time of flight cameras: sparse deconvolution to address multipath interference and recover time profiles", ACM Transactions on Graphics (ToG), vol. 32, No. 6, Nov. 1, 2013, 10 pp.
Kadambi et al., "Occluded imaging with time-of-flight sensors", ACM Transactions on Graphics (ToG), vol. 35, No. 2, Mar. 15, 2016, p. 1-12.
Kaipio et al., "Computational and statistical methods for inverse problems", Applied Mathematical Sciences, vol. 160, Springer, Nov. 29, 2010, 356 pp.
Kim et al., "Fast and Lightweight Path Guiding Algorithm on GPU", The Eurographics Association, 2021, 6 pp., (Applicant points out, in accordance with MPEP 609.04(a), that the year of publication, 2021, is sufficiently earlier than the effective U.S. filing date, so that the particular month of publication is not an issue.).
Kingma et al., "Adam: A method for stochastic optimization", arXiv preprint arXiv:1412.6980, Jan. 30, 2017, 15 pp.
Lambert et al., "Photometria sive de mensura et gradibus luminis, colorum et umbrae", Sumptibus viduae Eberhardi Klett, 1760 , 547 pp., (Applicant points out, in accordance with MPEP 609.04(a), that the year of publication, 1760, is sufficiently earlier than the effective U.S. filing date, so that the particular month of publication is not an issue.).
Lannes et al., "Clean and wipe", Astronomy and Astrophysics Supplement Series, vol. 123, No. 1, May 11, 1997, p. 183-198.
Levoy et al., "Light field rendering", Aug. 1, 1996, p. 31-42.
Lindell et al., "Acoustic non-line-of sight imaging", Proceedings of the IEEE/CVF Conference on Computer Vision and Pattern Recognition, 2019, p. 6780-6789, (Applicant points out, in accordance with MPEP 609.04(a), that the year of publication, 2019, is sufficiently earlier than the effective U.S. filing date, so that the particular month of publication is not an issue.).
Lindell et al., "Wave-Based Non-Line-of-Sight Imaging using Fast f-k Migration", ACM Transactions on Graphics (ToG), vol. 38, No. 4, Jul. 12, 2019, 13 pp.
Liu et al., "Non-line-of-sight imaging using phasor-field virtual wave optics", Nature, vol. 572, No. 7771, Aug. 29, 2019, p. 620-623.
Liu et al., "Sound synthesis, propagation, and rendering: a survey", ar Xiv preprint arXiv:2011.05538, May 4, 2021, 27 pp.
Lu et al., "CAROM Air—Vehicle Localization and Traffic Scene Reconstruction from Aerial Video", arXiv:2306.00075v1, May 31, 2023, 8 pp.
Lucas et al., "Using deep neural networks for inverse problems in imaging: beyond analytical methods", IEEE Signal Processing Magazine, vol. 35, No. 1, Jan. 10, 2018, p. 20-36.
Mansour et al., "Sparse Blind Deconvolution for Distributed Radar Autofocus Imaging", IEEE Transactions on Computational Imaging, vol. 4, No. 4, May 8, 2018, 13 pp., http://arxiv.org/abs/1805.03269.
Marston et al., "Autofocusing circular synthetic aperture sonar imagery using phase corrections modeled as generalized cones", The Journal of the Acoustical Society of America, vol. 136, No. 2, IEEE, Aug. 1, 2014, p. 614-622.

(56) References Cited

OTHER PUBLICATIONS

Marston et al., "Coherent and semi-coherent processing of limited-aperture circular synthetic aperture (CSAS) data", Oceans'11 MTS/IEEE Kona, IEEE, Sep. 19, 2011, 6 pp.
Marston et al., "Volumetric acoustic imaging via circular multipass aperture synthesis", IEEE Journal of Oceanic Engineering, vol. 41, No. 4, IEEE, Oct. 11, 2016, p. 852-867.
Mildenhall et al., "Nerf: Representing scenes as neural radiance fields for view synthesis", Communications of the ACM, vol. 65, No. 1, Dec. 17, 2021, p. 99-106.
Muller et al., "Instant Neural Graphics Primitives with a Multiresolution Hash Encoding", ACM Trans. Graph., vol. 41, No. 4, Jul. 2022, 15 pp., URL: https://doi.org/10.1145/3528223.
Mursaline et al., "Acoustic scattering by elastic cylinders: Practical sonar effects", The Journal of the Acoustical Society of America, vol. 150, No. 4, Oct. 1, 2021, 2 pp., URL: https://pubs.aip.org/asa/jasa/article/150/4_Supplement/A327/705222/Acoustic-scattering-by-elastic-cylinders-Practical.
Nadimi et al., "Efficient Detection of Underwater Natural Gas Pipeline Leak Based on Synthetic Aperture Sonar (SAS) Systems", Journal of Marine Science and Engineering, vol. 9, No. 11, MDPI, Nov. 16, 2021, 17 pp.
O'Toole et al., "Reconstructing transient images from single-photon sensors", Proceedings of the IEEE conference on computer vision and pattern recognition, IEEE, 2017, p. 1539-1547, (Applicant points out, in accordance with MPEP 609.04(a), that the year of publication, 2017, is sufficiently earlier than the effective U.S. filing date, so that the particular month of publication is not an issue.).
Pailhas et al., "Increasing circular synthetic aperture sonar resolution via adapted wave atoms deconvolution", Journal of the Acoustical Society of America, vol. 141, Apr. 13, 2017, p. 2623-2632, URL: https://doi.org/10.1121/1.4979807.
Park et al., "Alternative representations and object classification of circular synthetic aperture in-air acoustic data", Journal of the Acoustical Society of America, vol. 148, No. 4, Oct. 1, 2020, p. 2661-2661, URL: https://pubs.aip.org/asa/jasa/article/148/4_Supplement/2661/672422/Alternative-representations-and-object.
Pediredla et al., "Ellipsoidal path connections for time-gated rendering", ACM Transactions on Graphics (TOG), vol. 38, No. 4, Jul. 12, 2019, 12 pp.
Pierce, "Acoustics: An introduction to its physical principles and applications", Acoustical Society of Amer, Jan. 1, 1981, p. 486-487.
Piper et al., "Detection of buried targets using a synthetic aperture sonar", IEEE Journal of Oceanic Engineering, vol. 27, No. 3, IEEE, Jul. 2002, p. 495-504.
Plack et al., "Fast Differentiable Transient Rendering for Non-Line-of-Sight Reconstruction", Proceedings of the IEEE/CVF Winter Conference on Applications of Computer Vision, 2023, p. 3067-3076, (Applicant points out, in accordance with MPEP 609.04(a), that the year of publication, 2023, is sufficiently earlier than the effective U.S. filing date, so that the particular month of publication is not an issue.).
Plotnick et al., "Fast nearfield to farfield conversion algorithm for circular synthetic aperture sonar", Journal of the Acoustical Society of America, vol. 136, No. 2, Jul. 11, 2014, p. EL61-EL66.
Poole et al., "DreamFusion: Text-to-3D using 2D Diffusion", ar Xiv preprint arXiv:2209.14988, Sep. 29, 2022, 20 pp.
Potokar et al., "HoloOcean: An underwater robotics simulator", 2022 International Conference on Robotics and Automation (ICRA), IEEE, May 23, 2022, p. 3040-3046.
Putney et al., "Reconstruction of under-sampled SAS data using the WIPE algorithm", Proceedings of MTS/IEEE Oceans, Sep. 17, 2005, p. 111-118, URL: https://doi.org/10.1109/OCEANS.2005.1639747.
Qadri et al., "Neural Implicit Surface Reconstruction using Imaging Sonar", IEEE International Conference on Robotics and Automation (ICRA), IEEE, May 29, 2023, pp. 1040-1047.
Raghuvanshi et al., "ParametricWave Field Coding for Precomputed Sound Propagation", ACM Trans. Graph., vol. 33, No. 4, Jul. 27, 2014, 11 pp., URL: https://doi.org/10.1145/2601097.2601184.
Raghuvanshi et al., "Precomputed Wave Simulation for Real-Time Sound Propagation of Dynamic Sources in Complex Scenes", ACM SIGGRAPH 2010 papers, vol. 29, No. 4, Jul. 26, 2010, 11 pp., URL: https://doi.org/10.1145/1778765.1778805.
Ramamoorthi et al., "A signal-processing framework for inverse rendering", Proceedings of the 28th Annual Conference on Computer Graphics and Interactive Techniques, ACM, Aug. 1, 2001, p. 117-128.
Reed et al., "Coupling rendering and generative adversarial networks for artificial SAS image generation", Oceans 2019 MTS/IEEE, IEEE, Oct. 2, 2019, 10 pp.
Reed et al., "Dynamic CT Reconstruction from Limited Views with Implicit Neural Representations and Parametric Motion Fields", IEEE/CVF International Conference on Computer Vision (ICCV), IEEE, 2021, p. 2238-2248, (Applicant points out, in accordance with MPEP 609.04(a), that the year of publication, 2021, is sufficiently earlier than the effective U.S. filing date, so that the particular month of publication is not an issue.).
Reed et al., "Implicit Neural Representations for Deconvolving SAS Images", Oceans 2021: San Diego—Porto, Sep. 20, 2021, 7 pp., URL: https://doi.org/10.23919/OCEANS44145.2021.9705799.
Reed et al., "Neural Volumetric Reconstruction for Coherent Synthetic Aperture Sonar", arXiv:2306.09909v1, vol. 42, No. 4, ACM, Aug. 2023, 28 pp.
Reed et al., "SINR: Deconvolving Circular SAS Images Using Implicit Neural Representations", IEEE Journal of Selected Topics in Signal Processing, IEEE, Jun. 15, 2023, 16 pp., URL: https://doi.org/10.1109/JSTSP.2022.3215849.
Ruckert et al., "NeAT: Neural Adaptive Tomography. ACM Transactions on Graphics", ACM Transactions on Graphics (TOG, Feb. 4, 2022, 12 pp.
Sammelmann, "Propagation and scattering in very shallow water", Conference Proceedings (IEEE Cat. No. 01CH37295), vol. 1, Nov. 5, 2001, p. 337-344.
Savioja et al., "Overview of geometrical room acoustic modeling techniques", Journal of the Acoustical Society of America, vol. 138, No. 2, Aug. 10, 2015, p. 708-730.
Schissler et al., "High-Order Diffraction and Diffuse Reflections for Interactive Sound Propagation in Large Environments", ACM Trans. Graph., vol. 33, No. 4, Jul. 27, 2014, 12 pp., URL: https://doi.org/10.1145/2601097.2601216.
Schweickart et al., "Animating elastic rods with sound", ACM Transactions on Graphics (TOG), vol. 36, No. 4, Jul. 20, 2017, 10 pp.
Shen et al., "Non-line-of-Sight Imaging via Neural Transient Fields", IEEE Transactions on Pattern Analysis and Machine Intelligence, IEEE, Apr. 27, 2021, pp. 2257-2268.
Siltanen et al., "The room acoustic rendering equation", Journal of the Acoustical Society of America, vol. 122, No. 3, Acoustical Society of America, Sep. 1, 2007, p. 1624-1635.
Smith et al., "The scientist and engineer's guide to digital signal processing", California Technical Pub., Jan. 1, 1997, 640 pp.
Soumekh et al., "Synthetic aperture radar signal processing", vol. 7, Wiley, Apr. 13, 1999, 648 pp.
Sture et al., "Recognition of cold-water corals in synthetic aperture sonar imagery", IEEE/OES Autonomous Underwater Vehicle Workshop (AUV), IEEE, Nov. 6, 2018, 6 pp.
Sun et al., "A review of the artificial neural network surrogate modeling in aerodynamic design", Proceedings of the Institution of Mechanical Engineers, Part G: Journal of Aerospace Engineering, vol. 233, No. 16, Dec. 2019, p. 5863-5872.
Sun et al., "Coil: Coordinate-based internal learning for imaging inverse problems", IEEE Transactions on Computational Imaging, IEEE, Feb. 9, 2022, 27 pp.
Velten et al., "Recovering three-dimensional shape around a corner using ultrafast time-of-flight imaging", Nature Communications, vol. 3, No. 1, Macmillan Publishers Limited, Mar. 20, 2012, 8 pp.
Wallis et al., "Three-Dimensional Display in Nuclear Medicine", IEEE Trans. Med. Imag., vol. 8, No. 4, IEEE, Jun. 20, 1989, p. 297-303, URL: https://doi.org/10.1109/42.41482.
Wang et al., "Toward wave-based sound synthesis for computer animation", ACM Trans. Graph., vol. 37, No. 4, Jul. 30, 2018, 16 pp.

(56) References Cited

OTHER PUBLICATIONS

Williams et al., "Underwater target classification in synthetic aperture sonar imagery using deep convolutional neural networks", 23rd International Conference on Pattern Recognition (ICPR), IEEE, Dec. 4, 2016, p. 2497-2502.
Woods et al., "Ray-based methods in PC SWAT", The Journal of the Acoustical Society of America, vol. 148, No. 4, Oct. 1, 2020, p. 2796-2796, URL: https://pubs.aip.org/asa/jasa/article/148/4_Supplement/2796/699291/Ray-based-methods-in-PC-SWAT.
Wu et al., "Differentiable time-gated rendering", ACM Transactions on Graphics (TOG), vol. 40, No. 6, Dec. 10, 2021, 16 pp.
Xie et al., "Neural fields in visual computing and beyond", Computer Graphics Forum, vol. 41, No. 2, Wiley Online Library, May 2022, p. 641-676.
Yi et al., "Differentiable transient rendering", ACM Transactions on Graphics (TOG), vol. 40, No. 6, Dec. 10, 2021, 11 pp.
Yu et al., "Multiple ping sonar accuracy improvement using robust motion estimation and ping fusion", The Journal of the Acoustical Society of America, vol. 119, No. 4, Apr. 1, 2006, p. 2106-2113.
Zang et al., "IntraTomo: Self-supervised Learning-based Tomography via Sinogram Synthesis and Prediction", Proceedings of the IEEE/CVF International Conference on Computer Vision, 2021, p. 1960-1970, (Applicant points out, in accordance with MPEP 609.04(a), that the year of publication, 2021, is sufficiently earlier than the effective U.S. filing date, so that the particular month of publication is not an issue.).
Zhang et al., "Acoustic texture rendering for extended sources in complex scenes", ACM Transactions on Graphics (TOG), vol. 38, No. 6, Nov. 8, 2019, 9 pp.
Zhang et al., "Ambient sound propagation", ACM Transactions on Graphics (TOG), vol. 37, No. 6, Dec. 4, 2018, 10 pp.
Zhang et al., "Nerfactor: Neural factorization of shape and reflectance under an unknown illumination", ACM Transactions on Graphics (TOG), vol. 40, No. 6, Dec. 10, 2021, 18 pp.
Zhang et al., "The unreasonable effectiveness of deep features as a perceptual metric", Proceedings of the IEEE Conference on Computer Vision and Pattern Recognition, 2018, p. 586-595, (Applicant points out, in accordance with MPEP 609.04(a), that the year of publication, 2018, is sufficiently earlier than the effective U.S. filing date, so that the particular month of publication is not an issue.).
Zheng et al., "Rigid-body fracture sound with precomputed soundbanks", ACM SIGGRAPH 2010 papers, Jul. 26, 2010, 13 pp.

* cited by examiner

TABLE 1 - 905

| Metric | 931 Chamfer ↓ | 932 IOU ↑ | 933 LPIPS ↓ | 934 PSNR ↑ | MSE ↓ |
|---|---|---|---|---|---|
| 921 BP | 1.36E − 04 | 0.2928 | 0.1215 | 15.783 | 5.55E − 03 |
| 922 GD | 2.21E − 04 | 0.4309 | 0.1236 | 15.117 | 6.13E − 03 |
| 923 PFA | 2.13E − 04 | 0.3586 | 0.1238 | 15.048 | 6.64E − 03 |
| 924 DISCLOSED METHODOLOGY | **1.12E − 04** | **0.5194** | **0.0988** | **17.918** | **3.99E − 03** |

FIG. 9

| | BACK PROJECTION 1121 | GRADIENT DECENT 1122 | DISCLOSED METHODOLOGY - 1124 |
|---|---|---|---|
| $\Delta f = 20\text{kHz}$ |  |  |  |
| Chamfer: | $1.346\text{E}-04$ | $1.196\text{E}-04$ | $1.037\text{E}-04$ |
| LPIPS: | $1.223\text{E}-01$ | $1.205\text{E}-01$ | $9.493\text{E}-02$ |
| $\Delta f = 10\text{kHz}$ |  |  |  |
| Chamfer: | $2.088\text{E}-04$ | $2.085\text{E}-04$ | $1.280\text{E}-05$ |
| LPIPS: | $1.330\text{E}-01$ | $1.293\text{E}-01$ | $1.113\text{E}-01$ |
| $\Delta f = 5\text{kHz}$ |  |  |  |
| Chamfer: | $2.724\text{E}-04$ | $1.968\text{E}-04$ | $1.370\text{E}-04$ |
| LPIPS: | $1.184\text{E}-01$ | $1.278\text{E}-01$ | $1.097\text{E}-01$ |

1400

NEURAL VOLUMETRIC RECONSTRUCTION FOR COHERENT SYNTHETIC APERTURE SONAR

CLAIM OF PRIORITY

This application claims the benefit of U.S. Patent Application No. 63/462,809, filed 28 Apr. 2023, the entire contents of which is incorporated herein by reference.

GOVERNMENT RIGHTS AND GOVERNMENT AGENCY SUPPORT NOTICE

This invention was made with government support under Grant No. N00014-22-1-2607 awarded by the U.S. Navy/ONR. The Government has certain rights in the invention.

TECHNICAL FIELD

Embodiments of the invention relate generally to the field of sonar and acoustic imaging, and more particularly, to systems, methods, and apparatuses for implementing neural volumetric reconstruction for coherent synthetic aperture sonar.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Synthetic aperture sonar (SAS) is an important technology for creating high-resolution acoustic images, typically underwater. Limited bandwidth and measurements can significantly hinder traditional image reconstruction methods.

Previously known techniques fail to provide adequate underwater imaging resolution.

SUMMARY

In general, this disclosure is directed to improved techniques for Synthetic Aperture Sonar (SAS). In particular, optimizations to image capture include measuring a scene from multiple views in order to increase resolution of reconstructed imagery. Image reconstruction methods for SAS coherently combine measurements to focus acoustic energy onto the scene. However, image formation is typically under-constrained due to a limited number of measurements and bandlimited hardware, which limits the capabilities of existing reconstruction methods. An analysis-by-synthesis optimization technique is described that leverages neural rendering to perform coherent SAS imaging. Such optimizations incorporate physics-based constraints and scene priors into the image formation process to produce higher resolution reconstructions. The described techniques were validated with simulation and experimental results captured in both air and water. The improved results are quantitatively and qualitatively demonstrated to produce superior reconstructions when compared with prior known techniques.

The present state of the art may therefore benefit from the systems, methods, and apparatuses for implementing neural volumetric reconstruction for coherent synthetic aperture sonar, as is described herein.

In at least one example, processing circuitry is configured to perform a method. Such a method may include processing circuitry executing an AI language model. In such an example, processing circuitry may obtain measurements of an underwater object using high-resolution Synthetic aperture sonar (SAS). Processing circuitry may apply an iterative deconvolution optimization process to the measurements to generate pulse deconvolved measurements and perform an analysis-by-synthesis reconstruction using an implicit neural representation to predict complex-valued scatterers from the pulse deconvolved measurements. In at least one example, processing circuitry generates synthesized complex measurements from the complex-valued scatterers using a differentiable forward model. In such an example, processing circuitry iteratively updates weights of the differentiable forward model with a computed minimized loss between the synthesized complex measurements and the complex-valued scatterers. Processing circuitry may further generate as output from the differentiable forward model, a reconstruction of the underwater object. According to such an example, processing circuitry then returns the output to a computing device.

In at least one example, a system includes processing circuitry; non-transitory computer readable media; and instructions that, when executed by the processing circuitry, configure the processing circuitry to perform operations. In such an example, processing circuitry may configure the system to obtain measurements of an underwater object using high-resolution Synthetic aperture sonar (SAS). Processing circuitry of the system may apply an iterative deconvolution optimization process to the measurements to generate pulse deconvolved measurements and perform an analysis-by-synthesis reconstruction using an implicit neural representation to predict complex-valued scatterers from the pulse deconvolved measurements. In at least one example, processing circuitry of such a system generates synthesized complex measurements from the complex-valued scatterers using a differentiable forward model. In such an example, processing circuitry of the system iteratively updates weights of the differentiable forward model with a computed minimized loss between the synthesized complex measurements and the complex-valued scatterers. Processing circuitry may further generate as output from the differentiable forward model, a reconstruction of the underwater object. According to such an example, processing circuitry then returns the output to a computing device.

In one example, there is computer-readable storage media having instructions that, when executed, configure processing circuitry to obtain measurements of an underwater object using high-resolution Synthetic aperture sonar (SAS). Processing circuitry may apply an iterative deconvolution optimization process to the measurements to generate pulse deconvolved measurements and perform an analysis-by-synthesis reconstruction using an implicit neural representation to predict complex-valued scatterers from the pulse deconvolved measurements. In at least one example, processing circuitry generates synthesized complex measurements from the complex-valued scatterers using a differentiable forward model. In such an example, processing circuitry iteratively updates weights of the differentiable forward model with a computed minimized loss between the synthesized complex measurements and the complex-valued scatterers. Processing circuitry may further generate as output from the differentiable forward model, a reconstruction of the underwater object. According to such an example, processing circuitry then returns the output to a computing device.

The details of one or more examples of the disclosure are set forth in the accompanying drawings and the description below. Other features, objects, and advantages will be apparent from the description and drawings, and from the claims.

BRIEF DESCRIPTION OF DRAWINGS

FIG. 9 illustrates Table 1 at element 905 which provides simulation results showing the average quantitative metrics for Back-projection (BP), Gradient descent (GD), the Polar formatting algorithm (PFA), and reconstructions rendered using the disclosed methodology for 8 different meshes, in accordance with aspects of the disclosure.

Like reference characters denote like elements throughout the text and figures.

DETAILED DESCRIPTION

Aspects of the disclosure provide increased resolution reconstructions utilizing improved techniques for Synthetic Aperture Sonar (SAS). In particular, optimizations include measuring a scene from multiple views in order to increase resolution of reconstructed imagery.

Figure 1:
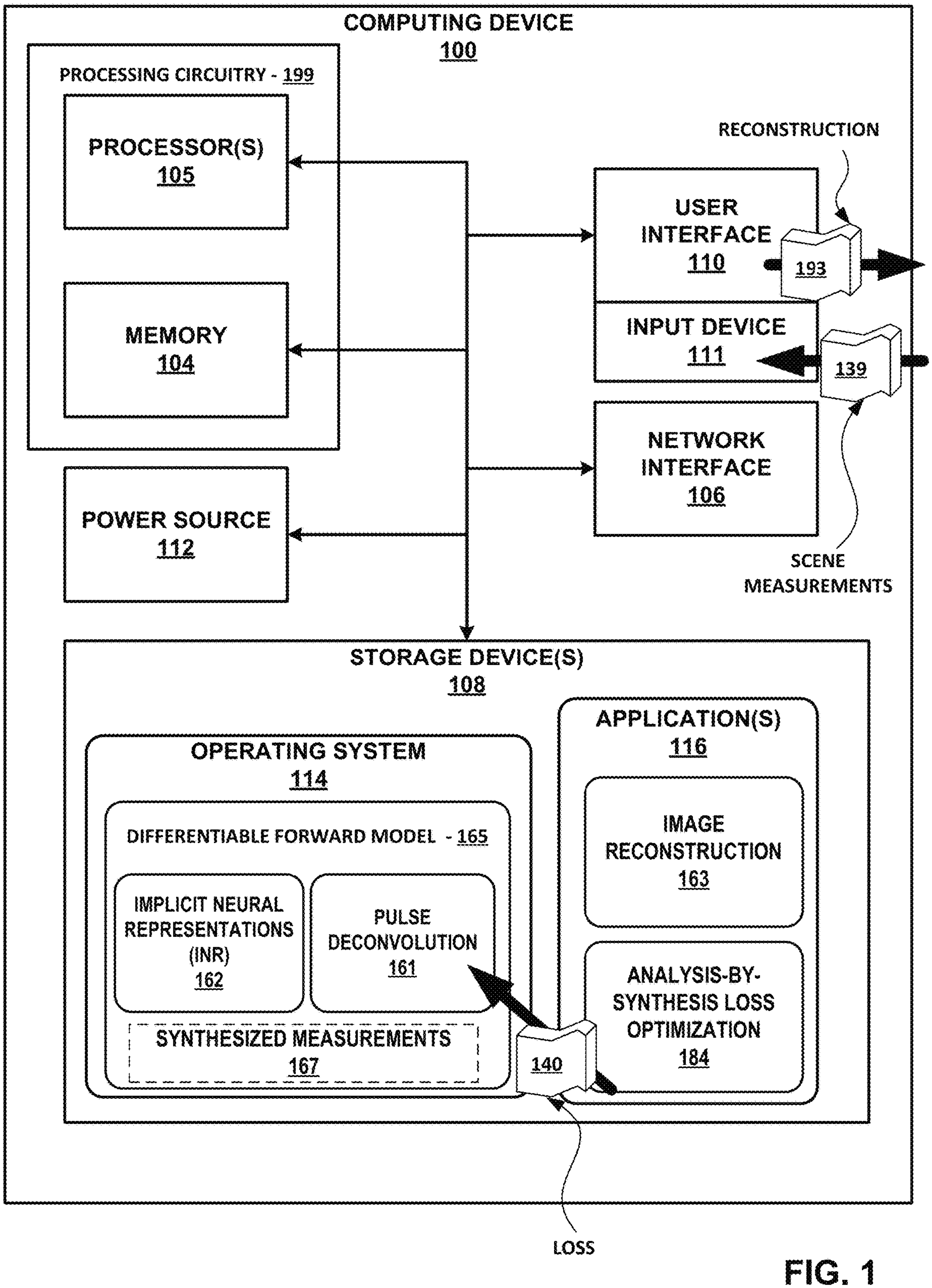
FIG. 1 is a block diagram illustrating further details of one example of computing device, in accordance with aspects of this disclosure.

FIG. 1 is a block diagram illustrating further details of one example of computing device, in accordance with aspects of this disclosure. FIG. 1 illustrates only one particular example of computing device 100. Many other example embodiments of computing device 100 may be used in other instances.

As shown in the specific example of FIG. 1, computing device 100 may include processing circuitry 199 including one or more processors 105 and memory 104. Computing device 100 may further include network interface 106, one or more storage devices 108, user interface 110, and power source 112. Computing device 100 may also include an operating system 114. Computing device 100, in one example, may further include one or more applications 116, such as image reconstruction 163 and analysis-by-synthesis loss optimization 184. One or more other applications 116 may also be executable by computing device 100. Components of computing device 100 may be interconnected (physically, communicatively, and/or operatively) for inter-component communications.

Operating system 114 may execute various functions including executing a trained AI model and performing AI model training. As shown here, operating system 114 executes differentiable forward model 165 which includes both pulse deconvolution 161 and implicit neural representations (INR) 162 components. Pulse deconvolution 161 may receive as input loss 140 as provided by analysis-by-synthesis-loss optimization 184 as output. Differentiable forward model 165 further includes synthesized measurements 167 to integrate newly learned losses into an AI model using reinforcement learning techniques.

Computing device 100 may perform improved techniques for Synthetic Aperture Sonar (SAS) including performing image capture by measuring a scene from multiple views in order to increase resolution of reconstructed imagery via hardware of computing device 100 specially configured to perform the operations and methodologies described herein.

Computing device 100 may receive scene measurements 139 via input device 111 and provide scene measurements 139 to differentiable forward model 165 executing via operating system 114. Computing device 100 may provide reconstruction(s) 193 as output to a connected user device via user interface 110.

In some examples, processing circuitry including one or more processors 105, implements functionality and/or process instructions for execution within computing device 100. For example, one or more processors 105 may be capable of processing instructions stored in memory 104 and/or instructions stored on one or more storage devices 108.

Memory 104, in one example, may store information within computing device 100 during operation. Memory 104, in some examples, may represent a computer-readable storage medium. In some examples, memory 104 may be a temporary memory, meaning that a primary purpose of memory 104 may not be long-term storage. Memory 104, in some examples, may be described as a volatile memory, meaning that memory 104 may not maintain stored contents when computing device 100 is turned off. Examples of volatile memories may include random access memories (RAM), dynamic random-access memories (DRAM), static random-access memories (SRAM), and other forms of volatile memories. In some examples, memory 104 may be used to store program instructions for execution by one or more processors 105. Memory 104, in one example, may be used by software or applications running on computing device 100 (e.g., one or more applications 116) to temporarily store data and/or instructions during program execution.

One or more storage devices 108, in some examples, may also include one or more computer-readable storage media. One or more storage devices 108 may be configured to store larger amounts of information than memory 104. One or more storage devices 108 may further be configured for long-term storage of information. In some examples, one or more storage devices 108 may include non-volatile storage elements. Examples of such non-volatile storage elements may include magnetic hard disks, optical discs, floppy disks, Flash memories, or forms of electrically programmable memories (EPROM) or electrically erasable and programmable (EEPROM) memories.

Computing device 100, in some examples, may also include a network interface 106. Computing device 100, in such examples, may use network interface 106 to communicate with external devices via one or more networks, such as one or more wired or wireless networks. Network interface 106 may be a network interface card, such as an Ethernet card, an optical transceiver, a radio frequency transceiver, a cellular transceiver or cellular radio, or any other type of device that can send and receive information. Other examples of such network interfaces may include BLUETOOTH®, 3G, 4G, 1G, LTE, and WI-FI® radios in mobile computing devices as well as USB. In some examples, computing device 100 may use network interface 106 to wirelessly communicate with an external device such as a server, mobile phone, or other networked computing device.

User interface 110 may include one or more input devices 111, such as a touch-sensitive display. Input device 111, in some examples, may be configured to receive input from a user through tactile, electromagnetic, audio, and/or video feedback. Examples of input device 111 may include a touch-sensitive display, mouse, keyboard, voice responsive system, video camera, microphone or any other type of device for detecting gestures by a user. In some examples, a touch-sensitive display may include a presence-sensitive screen.

User interface 110 may also include one or more output devices, such as a display screen of a computing device or a touch-sensitive display, including a touch-sensitive display of a mobile computing device. One or more output devices, in some examples, may be configured to provide output to a user using tactile, audio, or video stimuli. One or more output devices, in one example, may include a display, sound card, a video graphics adapter card, or any other type of device for converting a signal into an appropriate form understandable to humans or machines. Additional examples of one or more output devices may include a speaker, a cathode ray tube (CRT) monitor, a liquid crystal display (LCD), or any other type of device that can generate intelligible output to a user.

Computing device 100, in some examples, may include power source 112, which may be rechargeable and provide power to computing device 100. Power source 112, in some examples, may be a battery made from nickel-cadmium, lithium-ion, or other suitable material.

Examples of computing device 100 may include operating system 114. Operating system 114 may be stored in one or more storage devices 108 and may control the operation of components of computing device 100. For example, operating system 114 may facilitate the interaction of one or more applications 116 with hardware components of computing device 100.

FIGS. 2A, 2B, 2C, and 2D depict an analysis-by-synthesis optimization methodology leveraging techniques from neural rendering to optimize coherent reconstructions of SAS volumetric scenes 379.

Figure 2A:
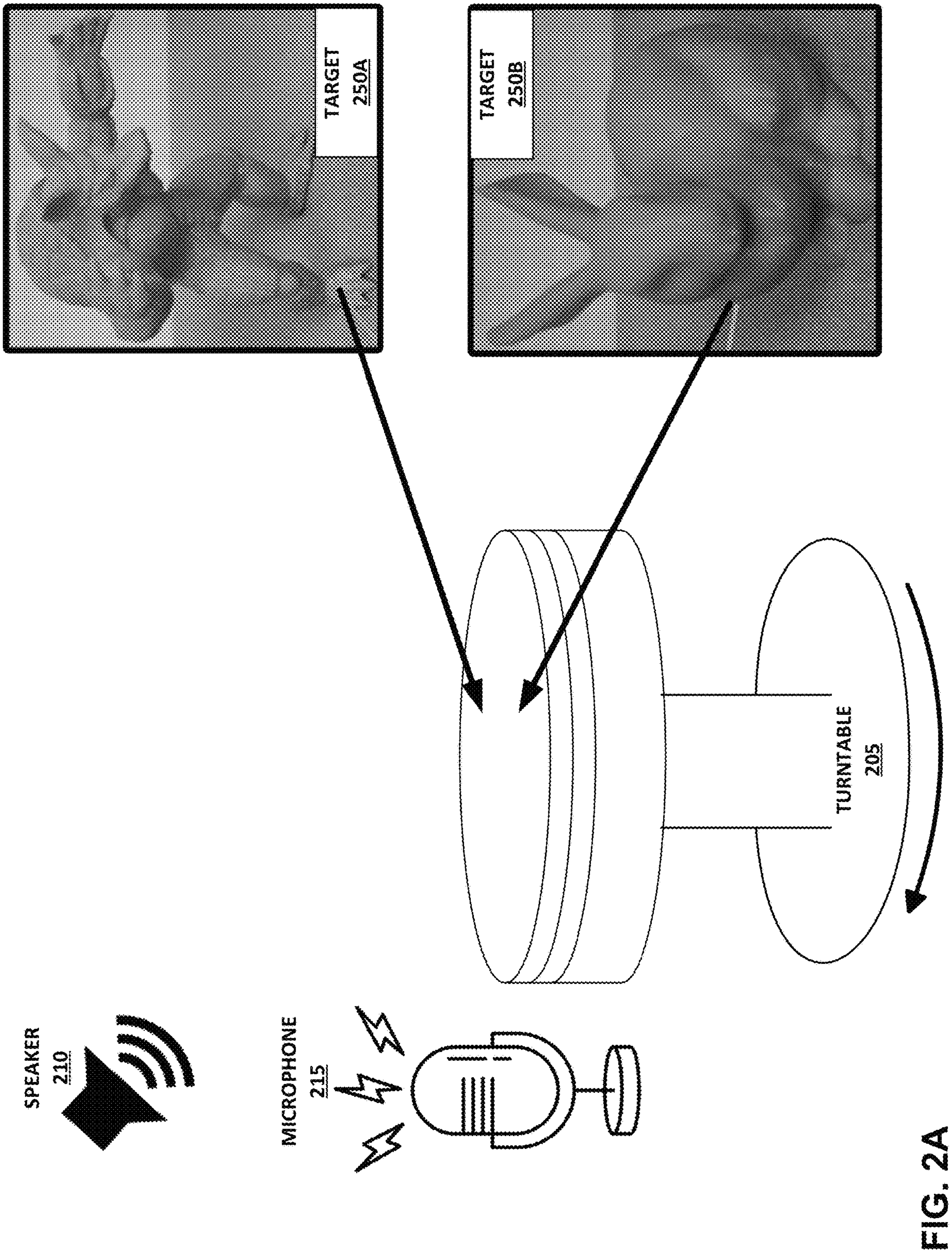
FIGS. 2A, 2B, 2C, and 2D depict an analysis-by-synthesis optimization methodology leveraging techniques from neural rendering to optimize coherent reconstructions of SAS volumetric scenes 379, in accordance with aspects of this disclosure.

FIG. 2A depicts speaker 210, microphone 215 and turntable 205. Each of targets 250A and 250B may be placed upon turntable 205 and subjected to various object capture and reconstruction techniques.

Figure 2B:
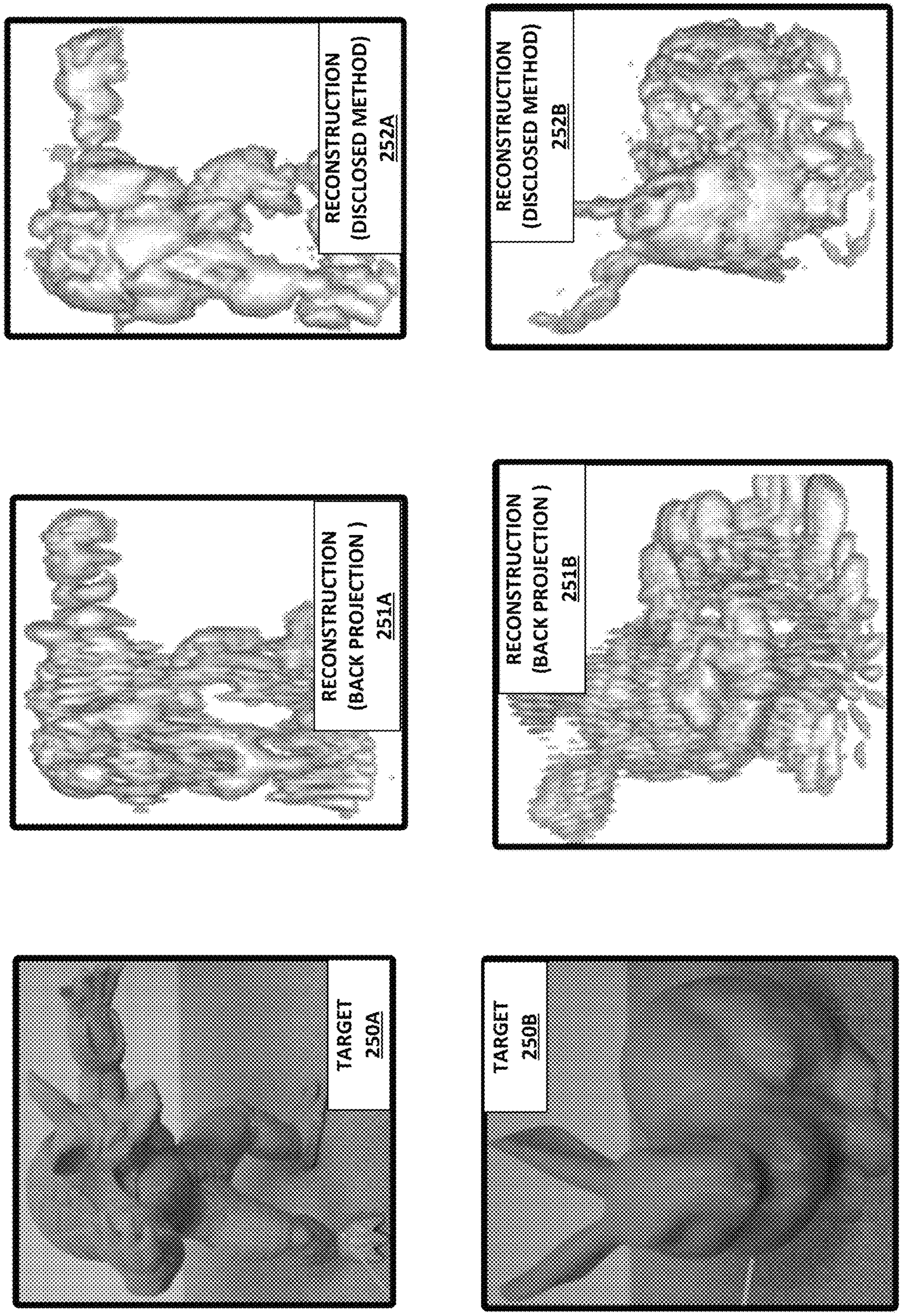

FIG. 2B depicts each of targets 250A and 250B subjected to object capture and reconstruction techniques resulting in reconstructions 251A and 251B generated using back projection techniques. Reconstruction 252A and 252B are generated utilizing the disclosed methodology. Reconstructions 251A and 252A use an in-lab circular SAS in air (AirSAS) and reconstructions 251B and 252B use in-water bistatic SAS techniques. However, the reconstructions are generated utilizing the disclosed methodology for reconstruction and thus yield improved resolution reconstructions 252A, 252B.

Targets 250A and 250B are 3D printed objects representing 2D maximum intensity projections (MIPs) of the SVSS track resulting in the 3D reconstructions 251A and 252B of the corresponding targets 250A and 250B.

Figure 2C:
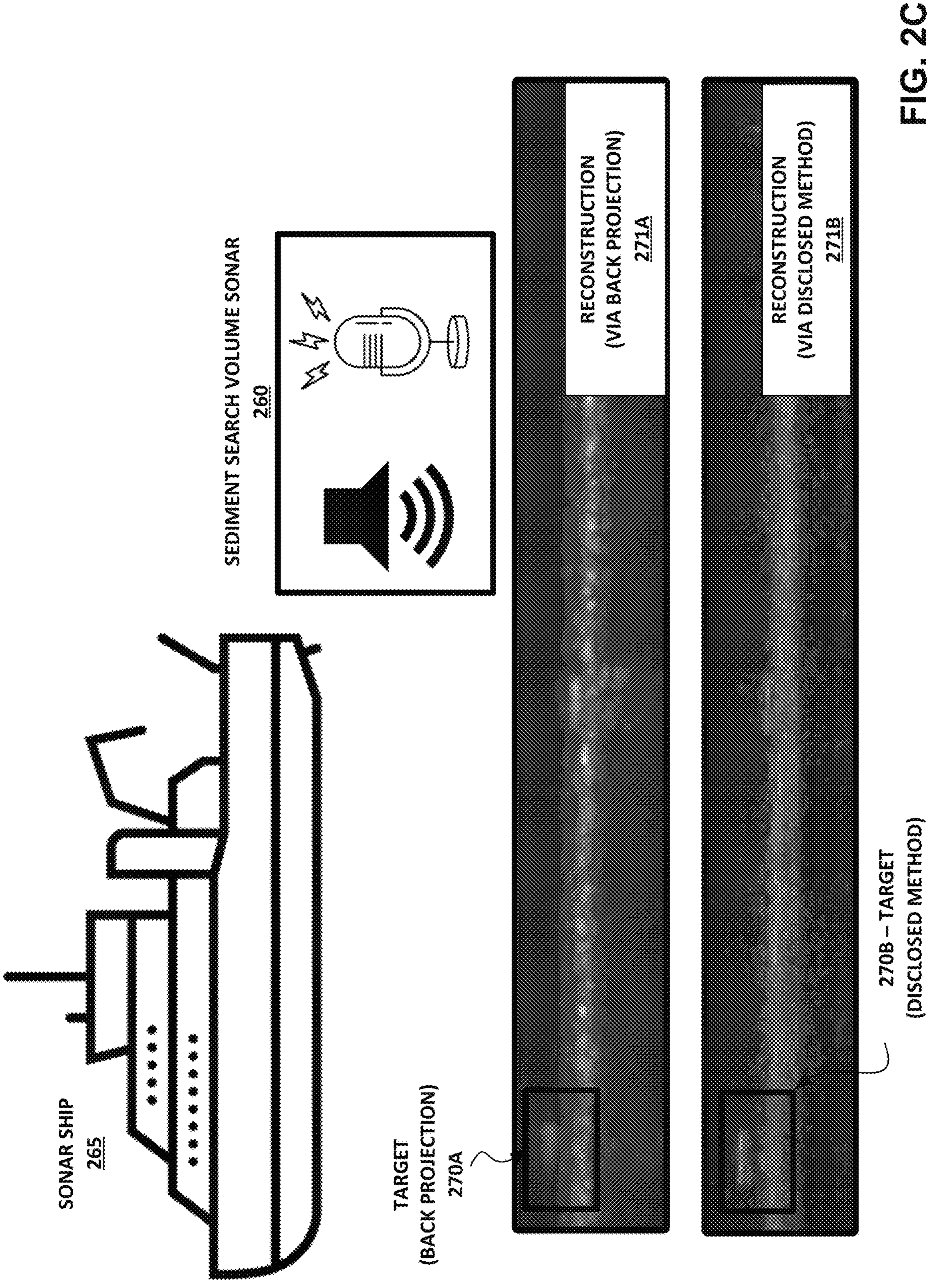

FIG. 2C depicts sonar ship 265 having Sediment search volume sonar (SSVS) 260 equipment via which targets 270A and 270B are observed within reconstruction 271A generated via back projection and reconstruction 271B generated utilizing the disclosed methodology. Reconstructions 270A and 270B both use sediment volume search sonar (SVSS) 260 but are generated utilizing the disclosed methodology for reconstruction and thus yield improved resolution reconstruction 271B.

Figure 2D:
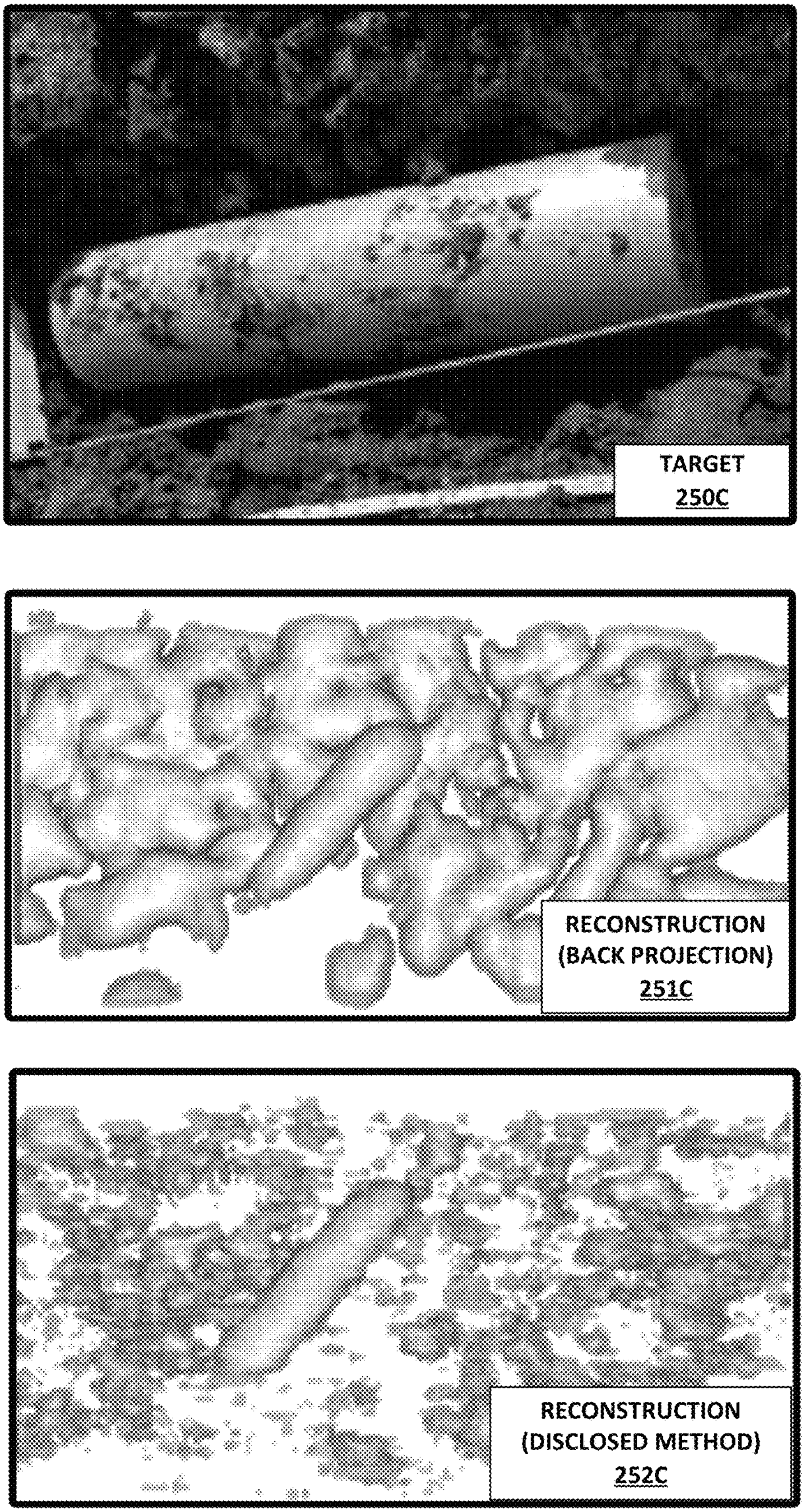

FIG. 2D depicts a photograph of target 250C, reconstruction 251C of target 250C utilizing back-projection and reconstruction 252C of target 250C utilizing the disclosed methodology which yields improved resolution.

Figure 3A:
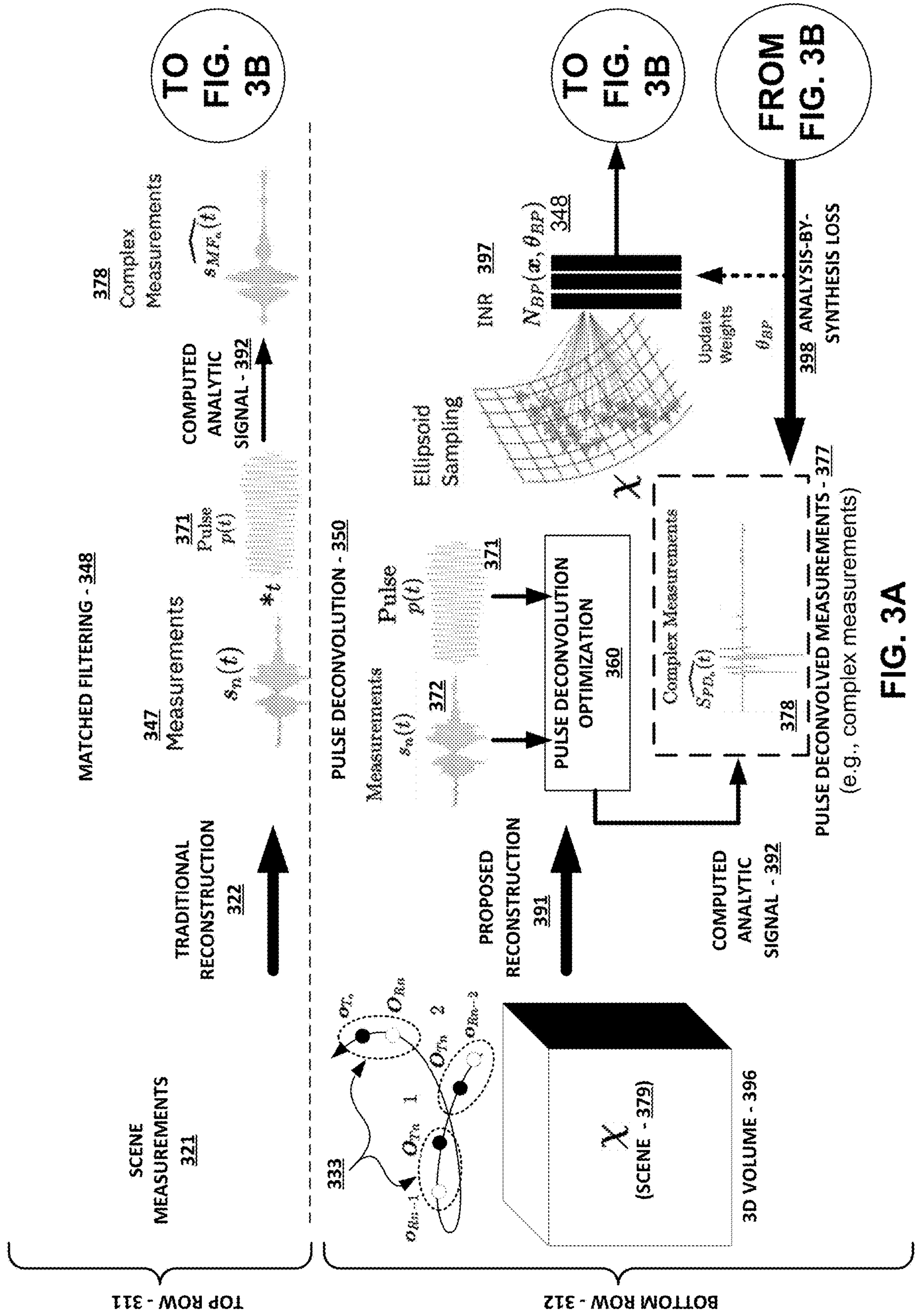
FIGS. 3A and 3B depict a block diagram illustrating improved techniques for providing increased resolution image reconstructions, in accordance with aspects of this disclosure.
Figure 3B:
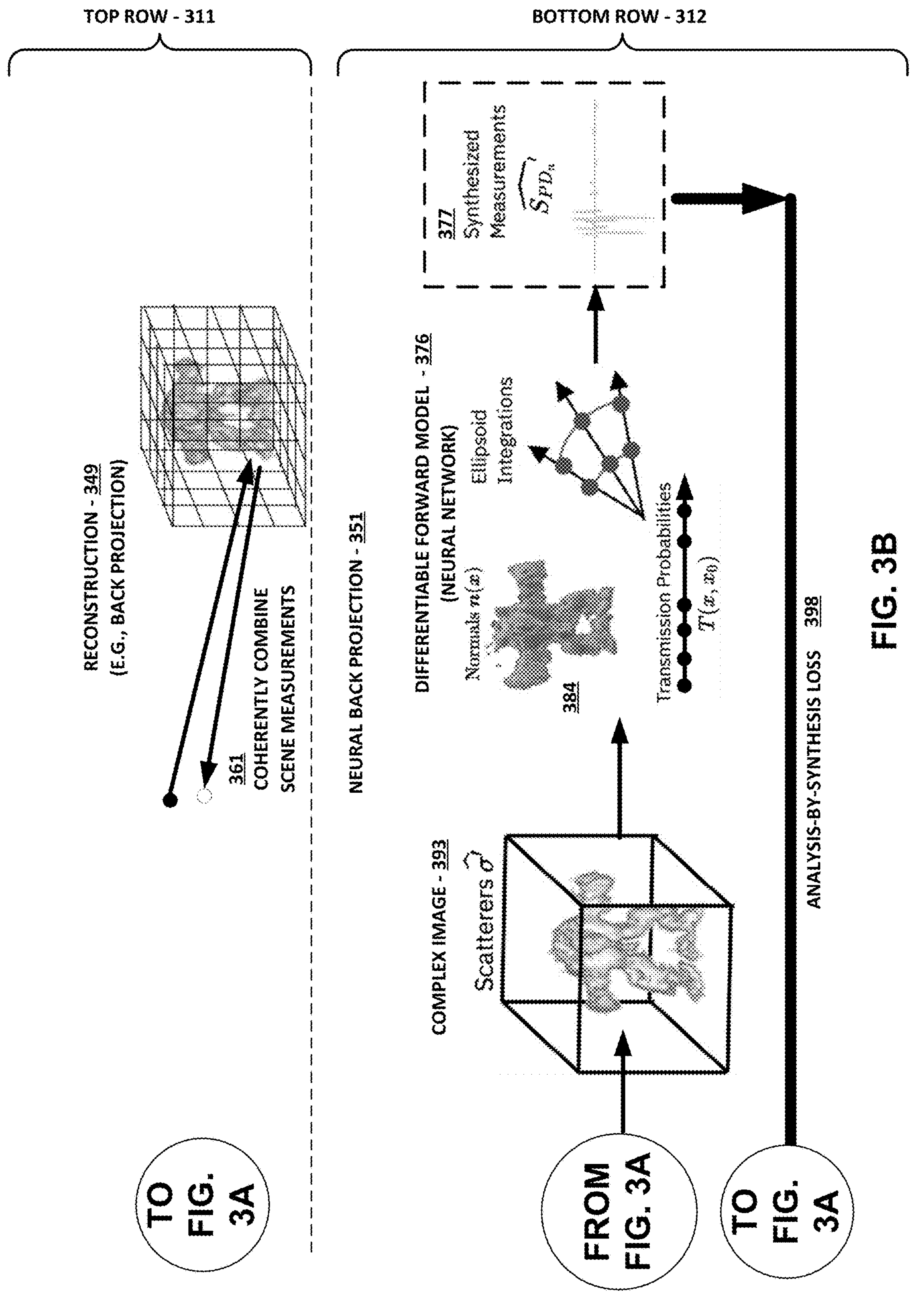

FIGS. 3A and 3B depict a block diagram illustrating improved techniques for providing increased resolution image reconstructions. Given scene measurements 321 obtained from n sensor positions, top row 311 shows a traditional reconstruction 322 pipeline for reconstruction 349 utilizing back-projection 349 to coherently combine scene measurements 361. Bottom row 312 shows an improved reconstruction pipeline utilizing neural back-projection 351.

Traditional reconstruction 322 uses matched filtering 348 to compress measurements 347 in time, and then coherently combines scene measurements 361 using back-projection reconstruction 349 or alternatively utilizing a functionally equivalent algorithm implemented in the Fourier domain.

Conversely, the disclosed methodology depicted at bottom row 312 results in proposed reconstruction 391 by applying additional optimizations, including, for example, pulse deconvolution 350 instead of matched filtering 348. Pulse deconvolution optimization 360 is an optimization that deconvolves transmitted pulse 371 from measurements 372. Measurements 372 may be interpreted from computed analytic signal 392. Neural back-projection 351 is then applied utilizing differentiable forward model 376 (e.g., a neural network). Differentiable forward model 376 generates estimates 384 of the scene 379 to produce synthesized measurements 377. Differentiable forward model 376 may be trained by minimizing a loss between synthesized measurements 377 and pulse deconvolved measurements 378.

Synthetic Aperture Sonar (SAS): Sensing modalities for Synthetic Aperture Sonar (SAS) may leverage a combination of spatially distributed measurements to enhance performance. In particular, array or aperture processing may use either a spatial array of sensors (e.g., a real aperture) or a virtual array from moving sensors (e.g., a synthetic aperture), such as those depicted at FIG. 2A, to reconstruct a spatial map of the scene 379. Synthetic aperture imaging has been used for sonar and radar, ultrasound, and optical light fields. Synthetic aperture imaging techniques parallel many of those in tomographic imaging which leverage penetrating waves to image the target scene 379.

Synthetic aperture sonar (SAS) is a leading technology for underwater imaging and visualization. Acoustical waves are used to insonify the scene 379, and time-of-flight of the acoustic signal is used to help determine the location of target objects and scatterers in the scene. Exploiting the full resolution of synthetic aperture systems requires coherent integration of measurements. Specifically, a combination considering measurement magnitude and phase of the scene measurements 321.

Coherent integration, in particular, yields an along-track (along the sensor path) resolution independent of range and wavelength. SAS systems typically transmit pulse compressible waveforms, waveforms with large average power but with good range resolution. Examples include swept frequency waveforms, which apply a linear or nonlinear change in waveform frequency over time. These waveforms are pulse compressed at the receiver by correlating measurements with the transmitted waveform (e.g., pulse 371). Such processing is commonly referred to throughout communications and remote sensing communities as matched filtering 348 (or replica-correlation).

Waveform design is an active area of research for creating optimal compressed waveforms. There is a tradeoff between range resolution and hardware limitations affecting bandwidth. As such, improved reconstruction methodologies may yield higher resolution reconstructions within permissible computational constraints.

SAS Reconstruction: Many algorithms exist for reconstructing imagery from SAS measurements. For example, time-domain back-projection algorithms (also called delay-and-sum or time-domain correlation) back-project received measurements 347 to image voxels using corresponding time-of-flight measurements. The advantage of such a method is that it works well with arbitrary scanning geometries. However, time-domain back-projection algorithms are computationally intensive and are therefore considered slow to compute or demand impractical computational hardware specifications.

Wavenumber domain algorithms such as range-Doppler and ω–k migration are significantly faster but the algorithms require assuming a far-field geometry and an interpolation step to snap measurements onto a Fourier grid. For circular scanning geometries (CSAS), specialized reconstruction algorithms may exploit symmetry and connections to computed tomography for high-resolution visualization. Certain SAS techniques may leverage interferometry for advanced seafloor mapping.

The disclosed methodologies for providing higher resolution reconstructions utilize time-domain back-projection as a baseline SAS reconstruction approach. Although time-domain back-projection may be considered too slow due to computational burdens of the technique, modem computing capabilities, and advances in Graphical Processing Unit (GPU) technology in particular, have alleviated this bottleneck. Back-projection is applicable to nearly arbitrary measurement patterns, in contrast with Fourier-based methods which make a collocated transmit/receive assumption and require interpolation to a Fourier grid. Further still, back-projection and Fourier methods typically produce equivalent imagery for data that meets the requirements necessary of the Fourier-based algorithms.

A variety of methods exist for further improving the visual quality of reconstructed imagery. For example, some methods estimate the platform track and motion to correct imaging errors, deconvolution, autofocus, and may even account for environmental noise. Such methods are complementary to the disclosed reconstruction techniques described herein, and thus, may provide complementary post-processing to the improved reconstructions yielded by the disclosed methodologies set forth herein.

Acoustic Rendering Modeling: Acoustic information in an environment has largely fallen into two broad categories, specifically, geometric acoustics and wave-based simulation. Geometric acoustic methods, also known as ray tracing, are based upon a small wavelength approximation to the wave equation. The analog of the rendering equation for room acoustics has been proposed with acoustic bidirectional reflectance distributions. Further, bidirectional path tracing has been introduced to handle occlusion in complex environments. However, diffraction can cause changes in sound propagation, particularly near edges where sound paths bend.

To overcome these problems, the disclosed methodology may utilize techniques to add higher-order diffraction effects to path tracing and radiosity simulations. In contrast, solving the wave equation directly encapsulates all of the diffraction effects, but is computationally expensive.

To alleviate processing times, pre-computation may be applied. In addition, acoustic textures may be introduced to enable fast computation of wave effects for ambient sound and extended sources. Anisotropic effects for complex directional sources can be rendered efficiently. In addition to acoustically modeling large environments, modeling vibration modes of complex objects may be achieved for targets and scenes 379 including elastic rods, fire, fractures, and thin shells. For SAS in particular, several acoustic rendering models include the "Personal Computer Shallow Water Acoustic Tool-set (PC-SWAT)" technique which is an underwater simulation environment that leverages finite element modeling as well as extensions to ray-based geometric acoustics. HoloOcean is a more generalized underwater robotics simulator that enables simulation of acoustics. BELLHOP is an acoustic ray tracing model for long range propagation modeling.

Certain examples of the improved reconstruction techniques described herein may utilize Point-based Sonar Scattering Model (PoSSM), which is a single bounce acoustic scattering model, to design differentiable forward model 351 for neural back-projection 351 methodologies.

Transient and Non-Line-of-Sight Imaging: Optical transient imaging may be utilized for measuring scenes 379 in depth by leveraging continuous wave time-of-flight devices or impulse-based time-off-light single photon avalanche diodes (SPADs). In particular, transient imaging may be useful for non-line-of-sight (NLOS) reconstruction.

Analysis-by-synthesis loss 398 optimization is effective for NLOS problems including differentiable transient rendering and may even be utilized by conventional cameras. While there are interesting connections between transient/NLOS imaging and SAS, previously known solutions have yet to successfully connect the transient, NLOS imaging and SAS domains. Acoustic time-of-flight has been utilized to perform NLOS reconstruction, but the technique does not consider SAS processing.

SAS imaging presents new technical challenges for transient imaging including non-linear measurement trajectories and bi-static transducer arrays, coherent processing, and acoustic-specific effects.

Neural Fields: Representing scenes 379 or physical quantities using the optimized weights of neural networks has been attempted by networks termed "implicit neural representations" or "INR" 397 type networks. Such INR 397 networks, and more broadly neural rendering or neural fields, found increased utilization with Neural Radiance Fields (NeRF), which utilizes neural rendering or neural fields for learning 3D volumes 396 from 2D images. Such networks use a positional encoding to overcome spectral bias. A large number of inverse problems utilize INRs 397 across imaging and scientific applications. In particular, INRs 397 have been applied to tomographic imaging methods which share some characteristics with synthetic aperture processing.

Neural rendering for time-of-flight (ToF) cameras may be particularly useful as Time-of-Flight Radiance Fields couple a ToF camera with an optical camera to create depth reconstructions. While such a technique does consider the phase of the ToF measurements, the technique lacks coherent integration of phase values as performed by synthetic aperture processing. Further, the technique relies upon ToF cameras where each pixel corresponds to samples along a ray, whereas measurements from a SAS array correspond to samples along propagating spherical wavefronts.

While certain techniques leverage neural fields for NLOS imaging, the disclosed methodology leverages neural fields coupled with differentiable forward model 351 with acoustic capabilities for SAS imaging. Other techniques have applied neural fields for sonar and SAS image reconstruction, for instance, by leveraging neural fields to perform 2D CSAS deconvolution. However, such techniques require post-processing which deblurs reconstructed 2D scenes for circular SAS measurement geometries. Conversely, the described techniques are capable of reconstruction for 3D SAS.

A particular technique for INR 397 forward-looking sonar stitches images together from individual slices without utilizing coherent integration. Conversely, the described techniques may affirmatively account for the effects of the transmit waveform and consider the coherent integration of multiple views, to facilitate synthetic aperture processing.

Figure 4:
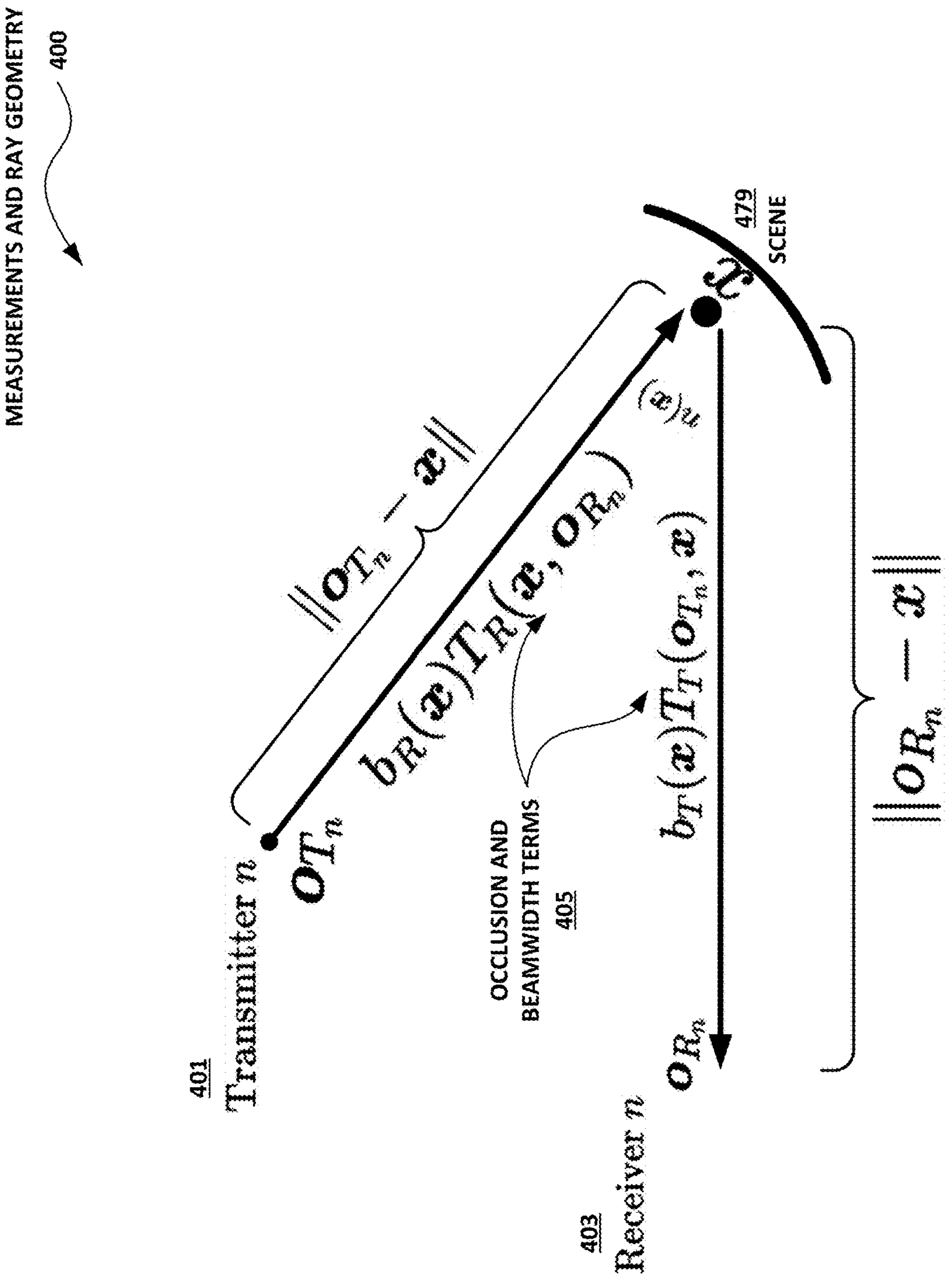
FIG. 4 depicts forward model measurements and ray geometry 400 having a transmitter 401 which pings a scene 479 with the transmit waveform.

FIG. 4 depicts forward model measurements and ray geometry 400 having a transmitter 401 which pings a scene 479 with the transmit waveform. The propagation of the waveform to a scene 479 at point x is weighted by the directivity function and transmission probability. The scene 479 at point x reflects acoustic energy back towards receiver 403 weighted by a Lambertian scattering term, the return transmission probability, and the receiver directivity.

Forward Model and Time-Domain Back-Projection:

Differentiable forward model 376 (e.g., a forward measurement model) was utilized to design analysis-by-synthesis loss 398 optimization (refer to FIG. 3A, 3B). Differentiable forward model 376 utilizes a point-based sonar scattering model which assumes high-frequency propagation (e.g., geometric acoustics), but offers computational tractability and differentiability that is friendly for neural rendering techniques.

An imaging model was formulated mathematically with reference to the listing of operators and variables, set forth as follows:

Operators:

The following operates are utilized throughout the description and figures:

Operator $\hat{x}$ is defined as a complex-valued analytic signal of x.

Operator $|x|$ is defined as a magnitude of x. If x=a+jb then $|x|=\sqrt{a^2+b^2}$.

Operator $|x|$ is defined as an angle of x. If x=a+jb then $\angle x=\tan^{-1} b/a$.

Operator $\|x\|$ is defined as a 2-norm of vector x.

Operator $\mathcal{H}(x)$ is defined as a Hilbert transform of x.

Operator $\mathcal{R}(x)$ is defined as a real part of X.

Operator $\mathcal{I}(x)$ is defined as an imaginary part of X.

Variables:

The following variables are utilized throughout the description and figures:

Variables p(t) are defined as a transmitted pulse.

Variables $s_n(t)$ are defined as raw measurements of sensor n.

Variables $s_{MF}(t)$ are defined as match-filtered measurements.

Variables $s_{PD}(t)$ are defined as given pulse deconvolved measurements.

Variables $$s'_{PD}(t)$$

are defined as synthesized pulse deconvolved measurements.

Variables $N_{PD}$ are defined as pulse deconvolution networks.

Variables $N_{BP}$ are defined as neural back-projection networks.

Variables $\Delta f$ are defined as transmit pulse bandwidth.

Variables $f_{start}$ are defined as transmit pulse start frequency.

Variables $f_{stop}$ are defined as transmit pulse stop frequency.

Variables fc are defined as transmit pulse center frequency, $(f_{start}+f_{stop})/2$.

Variables X are defined as the set of all scene points.

Variables $E_{r_i}$ are defined as the set of points x on the ellipsoid surface at range $r_i$.

Variables $b_T(x)$ are defined as transmitter directivity function at point X.

Variables $b_R(x)$ are defined as receiver directivity function at point X.

Variables $a(r_i)$ are defined as length of ellipsoid x semi-axis defined at range $r_i$.

Variables $b(r_i)$ are defined as length of ellipsoid y semi-axis defined at range $r_i$.

Variables $c(r_i)$ are defined as length of ellipsoid z semi-axis defined at range $r_i$.

Variables $o_T$ are defined as transmitter origin.

Variables $x_T$ are defined as transmission rays.

Variables $o_R$ are defined as receiver origins.

Variables $x_R$ are defined as receive rays.

Variables $d_T$ are defined as transmit ray direction (unit vector).

Variables $T(o_T, x)$ are defined as transmission probability from a transmitter origin to a point X.

Variables T (oR, x) are defined as transmission probability from a receiver origin to a point X.

Variables $r_i$ are defined as distance i from transmit and receiver origin.

Variables $l_i$ are defined as depth i along ray.

Variables $\hat{\sigma}$ are defined as estimated complex scattering function.

Variables σ are defined as ground truth scattering function.

To formulate the imaging model, let $x \in \mathbb{R}^3$ describe a 3D coordinate in a scene 479, $\sigma(x) \in \mathbb{R}$ the amplitude of the acoustic scatterer at x, p(t) is the transmitted pulse, and χ the set of all coordinates in the volume of interest. The terms $b_T(x)$ and $b_R(x)$ are defined to be the transmitter 401 and receiver 403 directivity functions, respectively. The terms $T(o_T, x)$ and $T(o_R, x)$ are defined as the transmission probabilities between a scene 479 at point x and the transmitter 401 and receiver 403 origins, respectively, where T(•) is a function that computes the transmission probability between two points and enables the model to account for occlusion.

Let $R_T = \|o_T - x\|$ and $R_R = \|o_R - x\|$ be the distances between the scene point and sensor transmitter 401 and receiver 403 origins, respectively. Then, the receiver 403 records real-valued measurements which are set forth according to Equation 1, as follows:

$$s(t) = \int_X \frac{b_T(x) b_R(x) T(o_T, x) T(o_R, x)}{2\pi R_T R_R} L(\sigma(x)) p\left(t - \frac{R_t + R_R}{c}\right) dx,$$

where L(•) is a Lambertian acoustic scattering model computed using the normal vector at a point n(x). Contrary to acoustic radiance, equation 1 models acoustic pressure which has a 1/distance falloff due to spherical propagation. Additionally, note that the sensor measurement $s(t)=s(o_T, o_R, t)$ is actually a function of the transmitter 401 and receiver 403 origins as well. Note that measurements are sometimes indexed as $s_n(t)$, but typically omit n for brevity.

Conventional SAS Reconstruction with Time-domain Back-projection: A processing pipeline for SAS measurements may utilize received measurements which are compressed in range and the coherent integration of measurements to form an image.

Match-filtering and Pulse Compression: A first processing step for the received signal may perform matched filtering 348 (refer to FIG. 3A) by cross-correlating with transmitted pulse 371, set forth according to Equation 2, as follows:

$$s_{MF}(t) = s(t) * tp^*(-t).$$

Note that cross-correlation is written as a convolution in time *t with the time-reversed conjugate signal p*(−t) which is typically done in sonar/radar processing. Match-filtering 348 is a robust method for deconvolving the transmission waveform from measurements and is the optimal linear filter for detecting a signal in white noise.

For a simple rectangular transmitted pulse $$p(t) = A, -\frac{\tau}{2} \leq t \leq \tau/2$$

and zero elsewhere, it is easy to show that $S_{MF}(t)$ is a triangle function and the energy of the signal is Ahi. Since the transmitter is operating at peak amplitude (in this example), the duration of the signal τ yields higher energy, and thus higher signal-to-noise ratio (SNR). However, increasing τ comes at the expense of poor range-resolution, set forth according to Equation 3, as follows:

$$\Delta r = \frac{c}{2B},$$

where c is the pulse propagation speed, and the bandwidth B=1/τ in this case. To decouple the relationship between range resolution and energy of the signal, sonars may transmit a frequency-modulated pulse.

In particular, the linear frequency modulated (LFM) pulse may be utilized, set forth according to Equation 4, as follows:

$$p(t) = w(t)\cos\left(2\pi \frac{\Delta f}{2\tau} t^2 + 2\pi f_{start} t\right),$$

where the bandwidth in Hz is given by Δf=|fstart−fstop|, τ is the pulse duration in seconds, and w(t) is a windowing function to attenuate side-lobes in the ambiguity function. The range-resolution of a pulse-compressed waveform computed using Equation 3 above is $$\Delta r = \frac{c}{2\Delta f}.$$

Coherent Back-projection: Synthetic aperture imaging reconstructs images with range-independent along-track resolution through coherent integration of measurements. As the transmitted waveform is typically modulated by a carrier frequency, it is desirable to coherently integrate the envelope of received measurements. The signal envelope can be estimated with range binning, but the analytical form of the envelope may be obtained using a Hilbert transform. In particular, the Hilbert transform can be used to obtain the analytic signal (also called the pre-envelope), set forth according to Equation 5, as follows:

$$\widehat{s_{MF}} = s_{MF} + j\mathcal{H}(s_{MF}),$$

where $j=\sqrt{-1}$ and $\mathcal{H}$ is the Hilbert transform operator. Given these (now) complex measurements 378 (refer to FIG. 3A), SAS image formation uses the sensor and scene geometry to coherently integrate measurements that are projected onto the scene using their time-of-flights, set forth according to Equation 6, as follows:

$$I_{BP}(x) = \sum_n \widehat{s_{MF,n}}\left(t - \frac{R_T + R_R}{c}\right).$$

Later, Equation 6 is shown to effectively integrate energy along ellipsoids defined by transmitter 401 and receiver 403 locations and time-of-flights. Values $R_T$, $R_R$ are defined in terms of x and transmitter 401 and receiver 403 positions of the transducers, and thus are not constant for differing n and x. Equation 6 represents the coherent integration of measurements and results in a complex image 393 (refer to FIG. 3B). The final estimate of the acoustic scattering coefficient σ(x) (see complex image 393, FIG. 3B) is obtained by taking the image magnitude $|I_{BP}(x)|$.

With reference again to FIGS. 3A and 3B, proposed reconstruction 391 may utilize two main steps that roughly parallel matched filtering 348 and coherent back-projection to coherently combine scene measurements 361 as discussed above.

For example, initially pulse deconvolution 350 is applied for deconvolving given waveforms measurements 372 via an iterative pulse deconvolution optimization 360 process in lieu of matched filtering 348. While matched filtering 348 may be optimized through waveform design to realize a better ambiguity function in cross-correlation (e.g., better range compression), such techniques require a priori knowledge and do not work across a variety of sonar environments. Conversely, aspects of the disclosure utilize an adaptable approach to waveform compression where performance may be tuned via sparsity and smoothness priors, labeled as referred to as pulse deconvolution 350.

Subsequent to application of pulse deconvolution 350, analysis-by-synthesis loss 398 reconstruction is performed using an implicit neural representation (INR) 397. Differentiated from NeRF techniques, INR 397 utilizes differentiable forward model 376 to predict complex image 393 valued scatterers, and utilizes differentiable forward model 376 to synthesize complex sensor measurements in time, thus yielding synthesized measurements 377.

Previously known NeRF scene sampling methods are not directly applicable to the disclosed methodology as the techniques described herein require sampling of scene 379 points with constant time-of-flight, which correspond to ellipsoids with the transmitter 401 and receiver 403 as foci (refer to FIG. 4). For example, rays are projected from the transducer and sample rays at the intersection of ellipsoidal surfaces 333 corresponding to measurement time bins which develop importance sampling methods to determine transmission probabilities for these rays and ellipsoidal surfaces. Additionally utilized are physics-based priors, such as a Lambertian scattering assumption, and regularization which are added to analysis-by-synthesis loss 398 optimization.

Pulse Deconvolution:

Aspects of the invention may perform deconvolving of the transmit waveform from SAS measurements. Deconvolved measurements are identified as $s_{PD}(t)$. Aspects of the disclosure optimize a differentiable forward model 376, referred to as a pulse deconvolution network $N_{pd}$, according to Equation 7, set forth as follows:

$$\mathcal{L}_{PD} = \|N_{PD}(t;\theta_{PD}) * p^*(-t) - s(t)\|_2 + \lambda_{1_{PD}}\mathcal{L}^{PD}_{Sparse} + \lambda_{2_{PD}}\mathcal{L}^{PD}_{TV\ Phase},$$

where $\theta_{PD}$ are the trainable weights of the differentiable forward model 376. The sparsity and phase smoothing operators are defined according to Equation 8, set forth as follows:

$$\mathcal{L}^{PD}_{Sparse} = \sum_t \|N_{PD}(t;\theta_{PD})\|_1,$$

and further according to Equation 9, set forth as follows:

$$\mathcal{L}^{PD}_{PD,TV\ Phase} = \sum_t \|\nabla \angle N_{PD}(t;\theta_{PD})\|_1,$$

where $\angle\bullet$ denotes the angle of a complex value and where regularizors are weighted by scalar hyperparameters $\lambda_{1_{PD}}$ and $\lambda_{2_{PD}}$.

Sparsity regularization may be particularly useful for recovering accurate deconvolutions. The total-variation (TV) phase prior encourages the solution to have a smoothly varying phase, which helps attenuate noise in the deconvolved waveforms.

In certain examples, processing circuitry may minimize the total pulse deconvolution loss $\mathcal{L}_{PD}$ with respect to the network weights $\theta_{PD}$ using a PyTorch ADAM optimizer. For example, differentiable forward model 376 may be implemented using an implicit neural representation (INR) 397, where input coordinates are transformed with a hash-encoding to help differentiable forward model 376 overcome spectral bias.

According to at least one example, processing circuitry trains INR 397 per batch of sensor measurements. For instance, an additional input is added to the network, n (omitted from Equation 9 above), that denotes a sensor index and allows differentiable forward model 376 to deconvolve a batch of sensor measurements.

At inference, the pulse deconvolved signal $s_{PD}(t)=N_{PD}(t;\theta_{PD})$ is formed using differentiable forward model 376 and then processing circuitry generates calculated analytic signal 3921 $\widehat{s_{PD}}$ to be used for coherent neural back-projection as described above.

Figure 5:
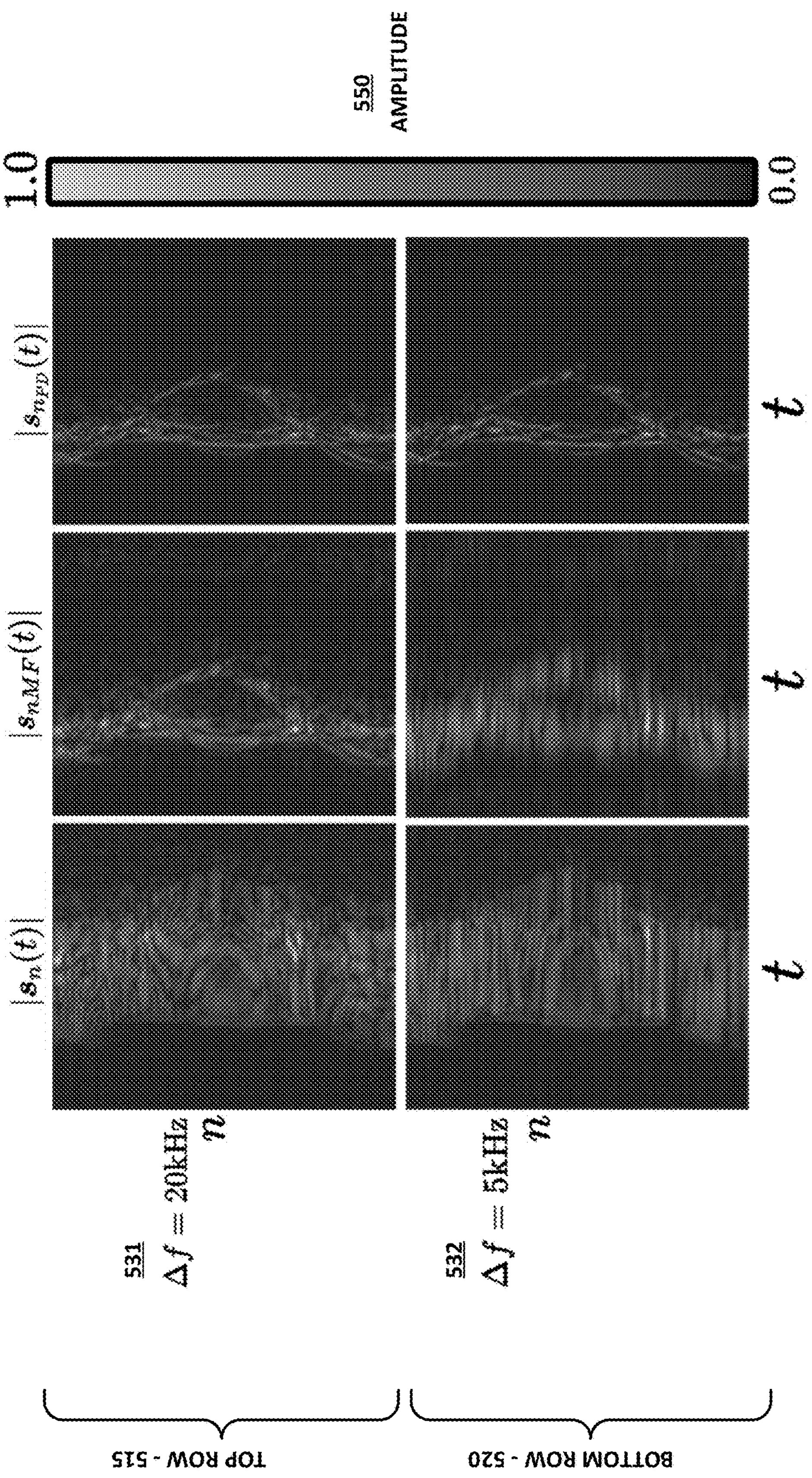
FIG. 5 compares matched filtering 511 performance with pulse deconvolution 512 performance techniques for generating higher resolution reconstructions, in accordance with aspects of the disclosure.

FIG. 5 compares matched filtering 511 performance with pulse deconvolution 512 performance techniques for generating higher resolution reconstructions, in accordance with aspects of the disclosure. Depicted here are magnitude (e.g., a signal envelope) of AirSAS measurements 510 of a 3D-printed Stanford bunny as the target in a scene measured with an LFM($f_c$=20 kHz) at bandwidths Δf=20 kHz (top row 515) and Δf=5 kHz (bottom row 520). Matched filtering 511 has the ability to compress measurements degrades at the lower 5 kHz bandwidth. Conversely, pulse deconvolution 512 methodology yields better compression at both bandwidths.

The comparison of pulse deconvolution 512 compression performance with matched-filtering 211 on AirSAS data demonstrates the improved technique for yielding higher resolution reconstructions. FIG. 5 shows n=360 measurements of the target (3D-printed Stanford bunny) recorded using an LFM with center frequency fc=20 kHz at bandwidths Δf=20 kHz (531) and Δf=5 kHz (532). In agreement with Equation 3, matched-filtering 511 compresses measurements more at Δf=20 kHz (531) than at Δf=5 kHz (532). Pulse deconvolution 512 compresses measurements 510 more than matched-filtering 511 and with remarkably similar performance at both bandwidths.

Experiments were additionally performed utilizing the described methodology for pulse deconvolution 512, by deconvolving the waveforms in a single step using simple Wiener deconvolution. Notably inferior performance was observed when compared to use of differentiable forward model 376 network (refer to FIG. 3A). Other experiments attempted optimizing Equation 7 without differentiable forward model 376 network (e.g., by updating the values at each time bins directly via gradient descent) which yielded competitive deconvolution performance. However, use of differentiable forward model 376 network outputs marginally smoother deconvolved waveforms. Given this observation, and the fact that the INR 397 (refer to FIG. 3A) has a nearly equivalent latency, differentiable forward model 376 network is utilized with Equation 7 to obtain $s_{PD}(t)$ for all experiments.

Neural Back-Projection:

With reference again to FIGS. 3A and 3B, the point-based scattering model of Equation 1 may be utilized for synthesizing measurements. However, coherent back-projection methods integrate the envelope of the signal from Equation 1. Analysis-by-synthesis loss 398 optimization may be performed by computing a loss between synthesized measurements 377 and a given computed analytic signal 392 (e.g., complex measurements 378) from the data (e.g., scene measurements 321). To generate synthesized measurements 377 from computed analytic signal 392 (e.g., complex measurements 378), an approximation to the analytic forward model is derived, according to Equation 10, as follows:

$$\widehat{s'_{PD}}\left(t=\frac{R_T+R_R}{c}\right)\approx\int_{E_r} b_T(x)b_R(x)T(o_T,x)T(x,o_R)L(\hat{\sigma}'(x))dx,$$

where $\widehat{s'_{PD}}$ are synthesized (e.g., rendered) complex-valued pulse deconvolved measurements.

Equation 10 synthesizes measurements using transmitter 401 and receiver 403 (refer to FIG. 4) directivity functions $b_T(x)$ and $b_R(x)$, the transmission probabilities to and from each point $T(o_T, x)$ and $T(x, o_R)$, and a Lambertian scattering function L(•) applied to complex-valued scene scatterers $\hat{\sigma}'$. A property of Equation 10 is that $\hat{\sigma}'$ now defines complex image 393 valued scatterers, which is consistent with how conventional back-projection algorithms recover a complex SAS image corresponding to the complex envelope of the matched filtered signals. Equation 10 also accounts for any non-idealities in the pulse deconvolution 350 which can introduce complex magnitude and phase into the equation.

Utilizing Equation 10, processing circuitry may synthesize complex-valued estimates 384 of given deconvolved measurements such that $\mathcal{R}(\widehat{s'_{PD}}(t))\approx s_{PD}(t)$. Synthesizing complex-valued estimates 384 of given deconvolved measurements enables processing circuitry to coherently integrate scatterers and recover estimate 384 of the scatterers σ(x) from Equation 1 by computing the magnitude $|\hat{\sigma}'(x)|\approx\sigma(x)$.

In Equation 10, amplitude 550 measured at a particular time is given by integrating complex-valued scatterers along a 3D ellipsoid surface $E_r$. Assuming no multipath, the ellipsoid is defined by a constant time-of-flight from the transmitter and receiver origins. The ellipsoid approximation assumes that pulse deconvolution 512 works well, and experimental results show that methods which do not use performing pulse deconvolution 512 indeed result in worse reconstructions.

Note that $b_R(x)=1$ is assumed for all X, which is reasonable since receivers 403 typically have relatively large beamwidths to suppress aliasing. Note also that the term $$\frac{1}{2\pi R_T R_R}$$

is omitted from Equation 10 as is commonly done in time-domain beamformers in actual implementation.

Processing circuitry estimates complex scattering function $\hat{\sigma}'$ using a neural network, entitled the back-projection network $N_{BP}$ 352 (refer to FIG. 3A) parameterized with weights $\theta_{BP}$. Specifically, the network defines the complex scatterer at each location according to Equation 11, set forth as follows:

$$\hat{\sigma}'(x)=N_{BP}(x;\theta_{BP}).$$

Thus analysis-by-synthesis loss 398 optimization can be written according to Equation 12, set forth as follows:

$$\mathcal{L}_{BP}=\|\widehat{s'_{PD}}-\widehat{s_{PD}}\|_2,$$

where loss is minimized between complex-valued synthesized and given pulse deconvolved measurements with respect to the network weights $\theta_{BP}$ using a PyTorch ADAM optimizer.

Figure 6A:
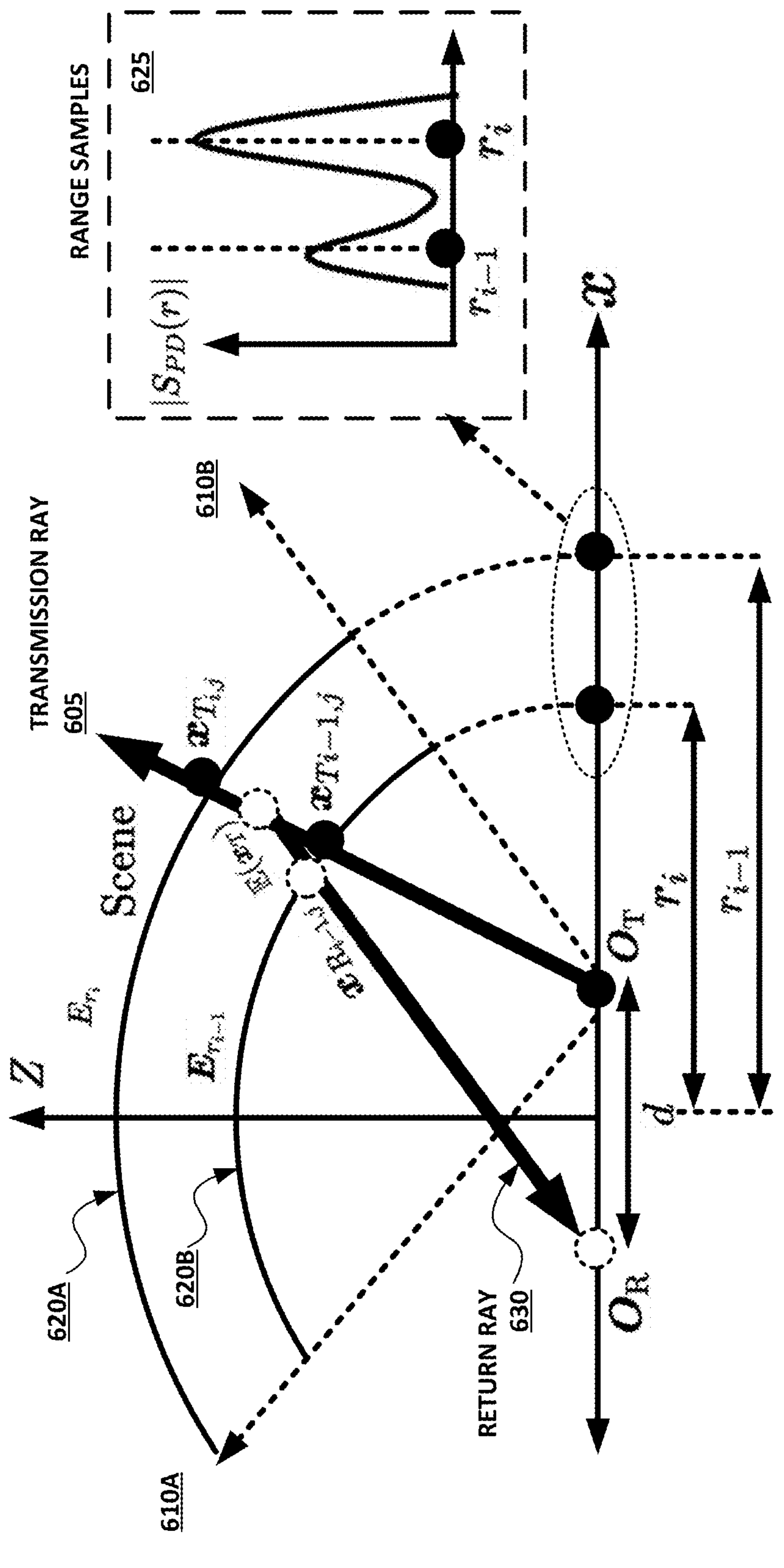
FIG. 6A depicts a 2D diagram (xz slice) of an example sampling scheme, in accordance with aspects of the disclosure.

FIG. 6A depicts a 2D diagram (xz slice) of an example sampling scheme, in accordance with aspects of the disclosure. A transmission ray (605) is projected within the transmitter beamwidth (area between 610A and 610B) and sampled at the intersection of the ellipsoids (620A and 620B) defined by range samples (625). The return ray (630) is computed from the expected depth of the transmit ray back to the receiver.

Figure 6B:
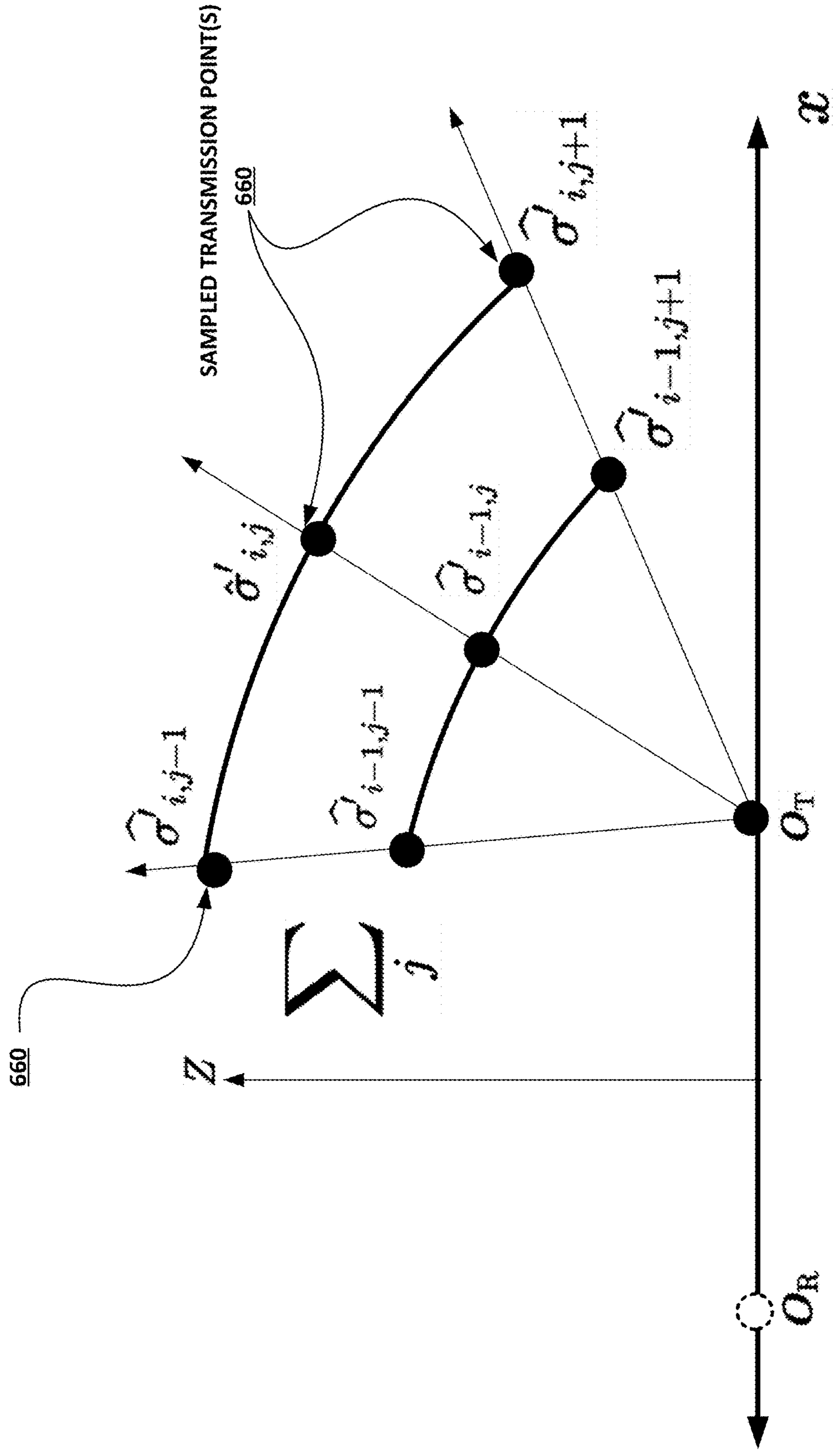
FIG. 6B depicts a 2D diagram (xz slice) of an example scheme for integrating ellipsoid surfaces to synthesize measurements, in accordance with aspects of the disclosure.

FIG. 6B depicts a 2D diagram (xz slice) of an example scheme for integrating ellipsoid surfaces to synthesize measurements, in accordance with aspects of the disclosure. Equation 10 weights scene scatterers by their respective transmission and Lambertian terms and integrates them along the surface of ellipsoids.

The scene may be assessed for importance via ellipsoids of constant time-of-flight. Transmission probabilities are estimated for transmission rays 605 and return rays 630.

Processing circuitry computes surface normals and computes the loss with regularization terms discussed above.

Ellipsoidal Sampling: As depicted by FIG. 6A, a set of points for a constant time-of-flight $$t = \frac{R_t + R_R}{c}$$

define an ellipsoid whose foci are transmitter 401 and receiver 403 positions (refer to FIG. 4), and with semi-major axis length r=c·t/2, where c is the sound speed. The ellipsoid can be written according to Equation 11, set forth as follows:

$$\frac{x^2}{a(r)^2} + \frac{y^2}{b(r)^2} + \frac{z^2}{c(r)^2} - 1 = 0,$$

where transmit $o_T$ and receive $o_R$ elements are separated by distance d. The ellipsoid semi-axes lengths are defined according to Equation 14, set forth as follows:

$$a(r) = r,\ b(r) = \sqrt{(r)^2 - (d/2)^2},\ c(r) = b(r).$$

Thus, the problem is reduced to sampling the intersection of transmitted and received rays with these ellipsoids. Processing circuitry may begin by sampling a bundle of rays originating from the transmitter 401 (refer to FIG. 4) and within its beamwidth (area between 610A and 610B) $\theta_{bw}$. Transmitted ray 605 is depicted with direction $d_{T_j}$ and is defined according to Equation 15, set forth as follows:

$$\boldsymbol{x}_{T_{ij}} = \boldsymbol{o}_T + l_i \boldsymbol{d}_{T_j}$$

where $l_i$ are depth samples along the transmitted ray 605. Processing circuitry samples transmitted ray 605 at its intersection with ellipsoids defined by desired range of samples 625.

Ray samples may be indexed by the ray direction j and the depth sample i. Processing circuitry may utilize time series measurements for the described methodology, in contrast to NeRF methods that use a coarse network for depth importance sampling. For instance, time $t_i$ may be sampled with probability $$Pr(t = t_i) = \frac{|\widehat{SPD}(t_i)|}{\sum_i |\widehat{SPD}(t_i)|}.$$

This concept is depicted at the upper left portion of FIG. 6A, showing a deconvolved waveform that is sampled at two-time bins (converted to range using $r_i$=c·$t_i$/2). Range samples 625 define ellipsoids 620A and 620B. Depth $l_i$ is determined for a ray that intersects the ellipsoid 620A, 620B by substituting the ray into the ellipsoid equation. Substitution yields a quadratic equation with a positive root, according to Equation 16, set forth as follows:

$$l_i = -b_0 + \frac{\sqrt{b_0^2 - 4a_0c_0}}{2a_0},$$

where $a_0$ is defined according to Equation 17 set forth as follows, $$a_0 = \frac{[d_T]_x^2}{a(r_i)^2} + \frac{[d_T]_y^2}{b(r_i)^2} + \frac{[d_T]_z^2}{c(r_i)^2}$$

where $b_0$ is defined according to Equation 18 set forth as follows, $$b_0 = \frac{2[x_T]_x[d_T]_x}{a(r_i)^2} + \frac{2[x_T]_y[d_T]_y}{b(r_i)^2} + \frac{2[x_T]_z[d_T]_z}{c(r_i)^2}$$

where $c_0$ is defined according to Equation 19 set forth as follows, $$c_0 = \frac{[x_T]_x^2}{a(r_i)^2} + \frac{[x_T]_y^2}{b(r_i)^2} + \frac{[x_T]_z^2}{c(r_i)^2} - 1,$$

where the notation $[d_T]_x$ refers to the x component of the vector $d_T$.

The positive root of the quadratic corresponds to the valid intersection, while the negative root is the intersection on the other side of the ellipsoid 620A, 620B. Processing circuitry may further implement a simple direction-based priority sampling. Specifically, processing circuitry may sample a set of sparse rays spanning uniform directions within the transmitter beamwidth 610A to 610B. Processing circuitry may integrate each ray and use the resulting magnitude to weight the likelihood of dense sampling in nearby directions.

Transmission and Normal Calculations: Occlusion is handled by computing transmission probabilities between the transmitter 401/receiver 403 and scene points. Processing circuitry computes transmission probability and may utilize the computed transmission probability to weight complex-valued scatter coefficients rather than scene density.

With reference to FIG. 6B, the network $N_{BP}$ 348 (refer to FIG. 3A) predicts complex-valued scatterers ($\hat{\sigma}'_{ij}$) at the sampled ray-ellipsoid intersections. The transmission probability between the transmitter and scene point is computed using the cumulative product in depth defined according to Equation 20, set forth as follows:

$$T(o_T, x_{T_i}) = \prod_{k<i} \exp(-|\hat{\sigma}'_k| \cdot |l_{k+1} - l_k| \cdot \zeta),$$

where k indexes depth. The direction index j is omitted since Equation 20 is computed for all rays. The scalar ζ to scale the transmission falloff rate. In certain examples, it may be useful to increase ζ for sparser pulse deconvolved waveforms (corresponding to sparser scenes).

Scatterer magnitude is utilized to compute the transmission probability since each term in the cumulative product should be non-negative. Computing a return ray 630 from each sampled transmission point approximately squares the number of required scene samples. Thus, a return ray 630 is computed only from the expected depth of the transmission ray. Processing circuitry computes the expected ray sample in-depth according to Equation 21, set forth as follows:

$$\mathbb{E}(x_T) = \sum_i x_{T_i} \frac{|\hat{\sigma}^r(x_i)T(o_T, x_{T_i})|}{\sum_i |\hat{\sigma}^r(x_i)T(o_T, x_{T_i})|}.$$

The return ray 630 is defined according to Equation 22, set forth as follows:

$$x_{R_{ij}} = \mathbb{E}(x_{T_i}) + l_i d_{R_j},$$

$$\text{where } d_{R_j} = \frac{o_R - \mathbb{E}(x_{T_j})}{\|o_R - \mathbb{E}(x_{T_j})\|}$$

and the depths $l_i$ are sampled at the ellipsoid intersections found using the negative root of Equation 16.

Since the expected depth is typically less than the max depth (refer to FIG. 5A), return ray 630 samples are simply set with depths greater than the expected sample (e.g., when l<0) to 0 so that they are ignored by downstream calculations. Processing circuitry computes a transmission probability for the return ray 630 using a cumulative product in depth according to Equation 20. The return ray 630 is used only to compute the transmission probability, as sampled points of return ray 630 are not part of the ellipsoid surface integrations of Equation 10.

For simulated and real AirSAS experiments, the transmitter 401 and receiver 403 (refer to FIG. 4) were collocated and are therefore omitted when calculating the transmittance of return ray 630. Processing circuitry computes surface normals according to Equation 23, set forth as follows:

$$n(x) = \frac{\nabla x|\hat{\sigma}'|}{\|\nabla x|\hat{\sigma}'|\|}$$

where the magnitude of the scatterers are utilized for normal computation. Scatterers are weighted with a Lambertian scattering model according to Equation 24, set forth as follows:

$$L(\hat{\sigma}') = \hat{\sigma}' \cdot \max\left(0, n(x) \cdot \frac{x - o_T}{\|x - o_T\|}\right).$$

Experiments show that the Lambertian scattering model is important for reconstructing accurate object surfaces.

Figure 7:
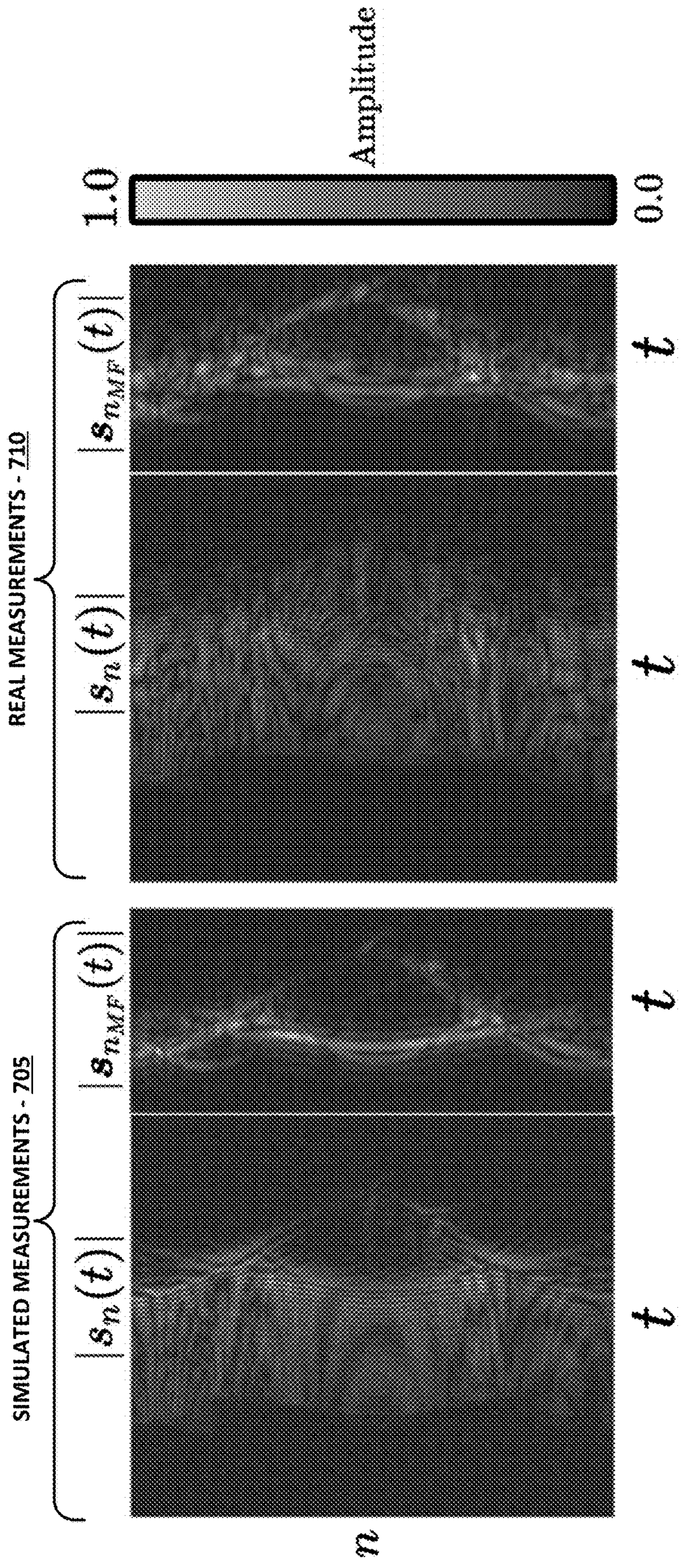
FIG. 7 depicts integrating sampled ellipsoid surfaces after weighting scene scatterers with transmission and Lambertian terms, in accordance with aspects of the disclosure.

FIG. 7 depicts integrating sampled ellipsoid surfaces after weighting scene scatterers with transmission and Lambertian terms, in accordance with aspects of the disclosure.

Loss and Regularization: FIG. 7 compares simulated measurements 705 and real measurements 710 of the bunny measured using an LFM pulse ($f_c$=20 kHz and Δf=20 kHz). As shown here, simulated measurements 705 are qualitatively similar to real measurements.

As expressed in Equation 10, these operations synthesize a complex-valued waveform. Processing circuitry computes a loss between the synthesized waveform and the analytic version of the pulse deconvolved waveforms, according to Equation 25, set forth as follows:

$$\mathcal{L}_{BP} = \|\hat{s}_{PI} - s_{PI}\|_2 + \lambda_{1_{BP}}\mathcal{L}^{BP}_{Sparse} + \lambda_{2_{BP}}\mathcal{L}^{BP}_{TV_{Space}} + \lambda_{3_{BP}}\mathcal{L}^{BP}_{TV_{Phase}}$$

where $\lambda_{1_{BP}}$, $\lambda_{2_{BP}}$, and $\lambda_{3_{BP}}$ are scalar weights for commonly used sparsity and total variation priors, where $\lambda_{1_{BP}}$ is defined according to Equation 26, set forth as follows:

$$\mathcal{L}^{BP}_{Sparse} = \sum_n \||\hat{\sigma}'|\|_1$$

where $\lambda_{2_{BP}}$ is defined according to Equation 27, set forth as follows:

$$\mathcal{L}^{BP}_{TV_{Space}} = \sum_n \|\nabla_{d_{reg}} \hat{\sigma}'\|_1,$$

where $\lambda_{3_{BP}}$ is defined according to Equation 28, set forth as follows:

$$\mathcal{L}^{BP}_{TV_{Phase}} = \sum_n \|\nabla_{d_{reg}} \angle\hat{\sigma}'\|_1.$$

Processing circuitry minimizes total loss with respect to the network weights. The total variation losses are performed on the complex scene scatterers and their phase—the $\nabla_{d_{reg}}$ is computed using the distance hyperparameter $d_{reg}$ that determines the distance between the compared samples. Regularization terms are computed using all ray samples. The priors may benefit some reconstructions while harming others and should be tuned depending on the scene and measurement noise. For example, the priors may be particularly useful when reconstructing from limited measurements. The ability to add and tune priors is an advantage of the disclosed methodology method over back-projection, which does not have the ability to incorporate priors. Equation 25 may be minimized over the given n sensor measurements. In practice, gradient accumulation may be utilized to average the gradients over a fixed number of sensors before performing a back-propagation update to the weights. Averaging the gradients may stabilize the optimization while avoiding the memory overhead of batching multiple sensors. In all experiments, gradients were accumulated over 5 sensors. Note that the loss function as shown in Equation 25 may be considered coherent since it computes the loss between the complex estimated and target deconvolved measurements. Incoherent reconstruction may yield inferior results, further validating use of the network to predict complex-valued scatterers and perform the loss between complex-valued measurements.

Figure 8A:
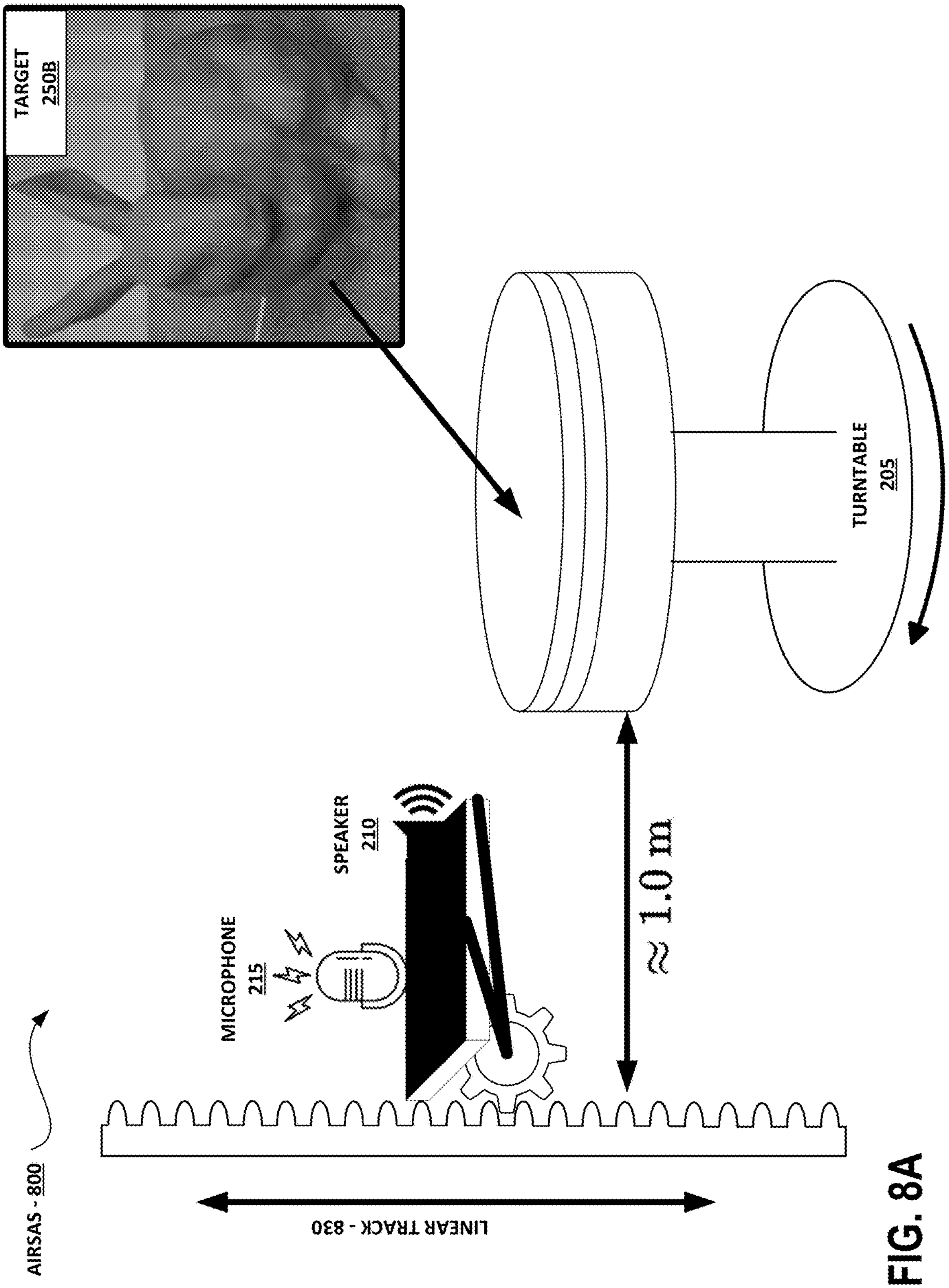
FIGS. 8A and 8B depict measurement geometry for the AirSAS (800) and SVSS (801), in accordance with aspects of the disclosure.
Figure 8B:
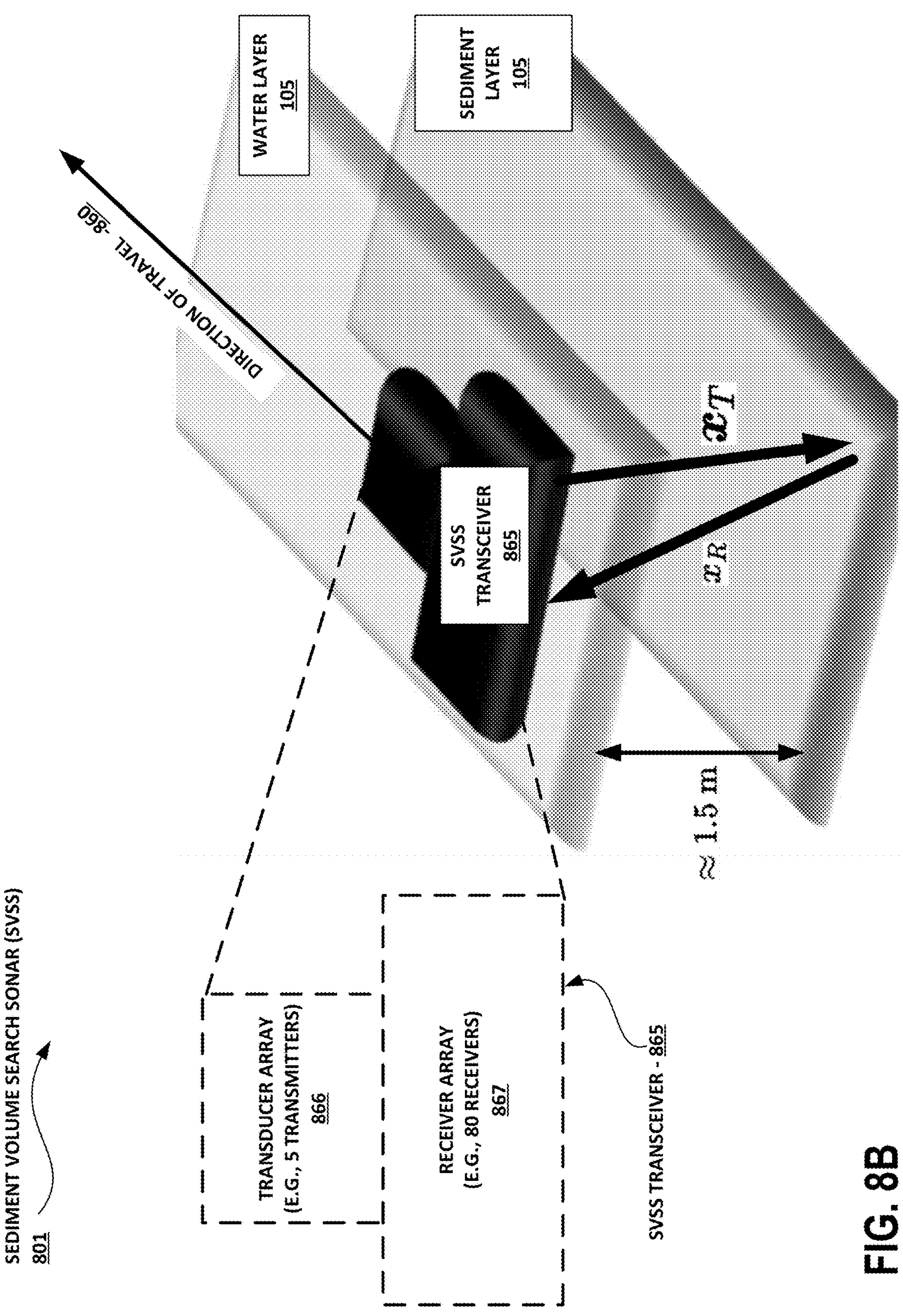

Simulator and Hardware Implementation:

FIGS. 8A and 8B depict measurement geometry for the AirSAS (800) and SVSS (801), in accordance with aspects of the disclosure. Implementation details of an example simulator and hardware for collecting SAS measurements are provided. AirSAS 800 collects circular SAS measurements inside an anechoic chamber using a speaker and microphone pointed at a turntable. The speaker 210 and microphone 215 are mounted on a vertical linear track 830 approximately one (1) meter from the turntable 205. Objects on the turntable 205 fit within 0.2 cubic meters. SVSS 801 may be mounted on a pontoon boat that proceeds in direction of travel 860 in a linear fashion and is used to image underwater targets. The SVSS transceiver 865 having both transmitter array 866 and receiver array 867 array is approximately 1.5 meters above a lake bed upon which a target rests. SVSS transceiver 865 reconstructs scenes with dimensions of approximately one (1) meter across (perpendicular to platform path) and between 1-10 meters long (parallel to platform path).

SAS Simulator using Optical Time-of-Flight Renderer: SAS measurements are simulated by leveraging an implementation of an optical time-of-flight (ToF) renderer. This renderer was chosen in part due to its CUDA implementation that uses asynchronous operations to efficiently accumulate per-ray radiances by their travel time. While this simulator does not capture acoustic effects (including diffraction), it does enable efficient prototyping. Note that optical renderers have been successfully leveraged for SAS simulation. Specifically, the simulator is configured to emulate an in-air, circular SAS setup called AirSAS. AirSAS consists of a speaker 210 and microphone 215 directed at a circular turntable 205 that holds a target 205B. Speaker 210 (transmitter) is simulated as a point light source and microphone 215 (receiver) is simulated with an irradiance meter to measure reflected rays.

In such an experiment, the renderer is configured to measure the ToF transients from each sensor location. Processing circuitry convolves these transients with a transmitted pulse to obtain simulated SAS measurements. Simulated measurements are utilized for several experiments to quantitatively evaluate the effect of bandwidth, noise, and object shape. FIGS. 8A and 8B depict side-by-side comparisons of a subset of simulated and measured waveforms from the bunny.

While SVSS 801 simulator ignores non-linear wave effects like sound diffraction and environmental effects like changing sound speed, the simulated measurements are observed to be similar to AirSAS measurements.

AirSAS: AirSAS is an in-air, circular SAS contained within an anechoic chamber. AirSAS being an in-air system enables experimental control that is impossible or challenging to achieve in water. Notably, the relevant sound physics between air and water are directly analogous for the purposes of this work. AirSAS data has been used successfully with prior techniques for proof-of-concept demonstrations.

The concept of AirSAS is depicted at FIG. 8A showing an AirSAS transducer array having speaker 210 (Peerless OX20SC02-04 loudspeaker tweeter) and microphone 215 (GRAS 46AM). The tweeter speaker 210 transmits a linear frequency modulated chirp for a duration of 1 ms waveform at center frequency fc=20 kHz and bandwidth Δf=20 kHz or Δf=5 kHz depending on the experiment. The transmitted LFM is multiplied with a Tukey window with ratio 0.1 to suppress side-lobes.

AirSAS measurements correspond to 3D printed objects depicted at FIG. 2A (refer to targets 250A and 250B). AirSAS scenes were collected on a 0.2×0.2 meter turntable 205 that is rotated in 360, 1-degree increments. The speaker 210 and microphone 215 are placed approximately 1 meter from the table and vertically translated by a linear track 830 by 5 mm at every 360 measurements. The spacing between measurements satisfies SAS sampling criteria of $D \leq \lambda_{min}/2$ where $\lambda_{min}$ is the minimum wavelength in the transmit waveform and D is the distance between measurement elements.

Figure 13:
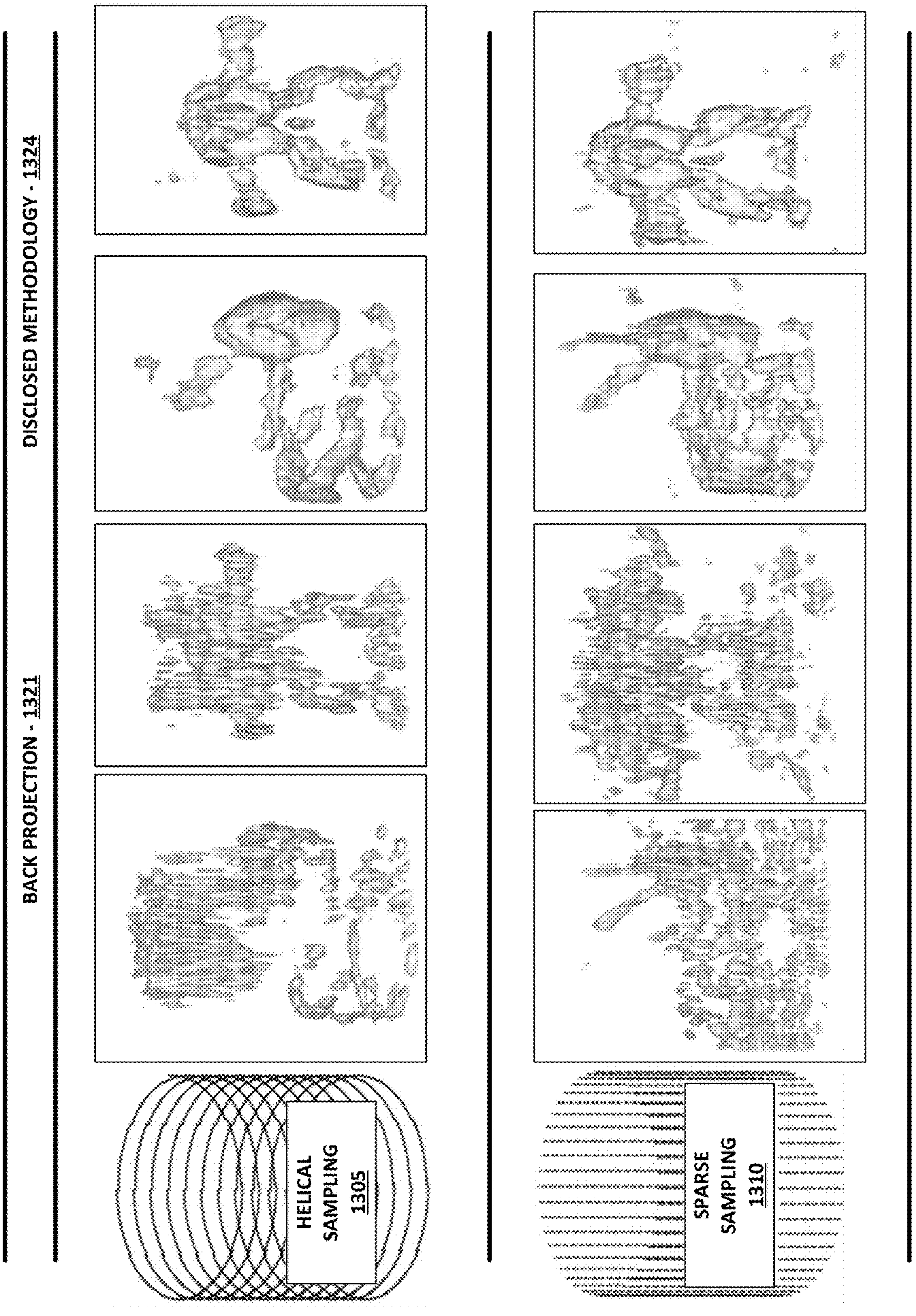
FIG. 13 shows helical sampling 1305 and sparse sampling 1310 view reconstructions of AirSAS measurements from $\Delta f$=20 kHz AirSAS for bunny and armadillo target objects in accordance with aspects of the disclosure.

The full set of given measurements may be sub-sampled to create helical or sparse-angle collection geometries (e.g., refer to FIG. 13).

Sediment Volume Search Sonar: The method was further experimentally evaluated on in-water sonar measurements collected from Sediment Volume Search Sonar (SVSS) 801. SVSS 801 is designed for sub-surface imaging and thus uses relatively long wavelengths to penetrate a lake bed. Specifically, the array transmitters emit an LFM with spectra ($f_c$=27.5 kHz and Δf=15 kHz) for a duration of 255 μs and are Taylor windowed. SVSS 801 may be deployed on a pontoon boat or sonar ship 265 (refer to FIG. 2C) equipped with a suite of precise navigation sensors to accurately tow SVSS transceiver 865 sonar array in the water. For the experiment, field data was provided from the Foster Joseph Sayers Reservoir in Pennsylvania where various targets and objects of interest were placed on the lakebed and then measured.

FIG. 8B shows SVSS 801 as having a SVSS transceiver 865 array for collecting measurement geometry. The SVSS 801 transducer array 866 consists of 5 transmitters that ping the scene in cyclical succession and a receiver array 867 having 80 actively recording receive elements. For the reconstructions, measurements where the scene target is outside the beamwidth of the firing transmitter may be discarded. Unlike AirSAS, a collocated transmitter and receiver for SVSS 801 is not assumed. Rather, the transmit and receive elements of SVSS transceiver 865 are relatively far apart relative to the imaging range (e.g., bistatic). Processing circuitry accounts for the bistatic transmit and receive elements by computing a return ray for each transmit ray at the expected transmission depth.

FIG. 9 illustrates Table 1 at element 905 which provides simulation results showing the average quantitative metrics for Back-projection (BP), Gradient descent (GD), the Polar formatting algorithm (PFA), and reconstructions rendered using the disclosed methodology for 8 different meshes.

Methods for Comparison: The disclosed methodology is compared with two 3D SAS imaging algorithms: time-domain back-projection 921 and a polar formatting algorithm (PFA) 923. Matched-filtered waveforms are utilized as input to the SAS imaging algorithms, except for the ablation experiment (refer to FIG. 14).

Time-domain back-projection 921 focuses the matched-filtered waveforms onto the scene by explicitly computing the delay between the sensor and scene. Back-projection applies to near arbitrary array and measurement trajectories and is standard for high-resolution SAS imaging, making it the stable baseline for both AirSAS and SVSS experiments. For breadth of comparison, experiments also implement and are compared against a polar formatting algorithm (PFA) 923, a wavenumber method designed for circular SAS. This algorithm applies the circular AirSAS and simulation geometries, but not the non-linear and bistatic measurement geometry of SVSS. Note that there are several existing analysis-by-synthesis reconstruction methods for 2D SAS, but these are not easily adapted to 3D SAS with non-linear and bistatic measurement geometries.

Prior deconvolution methods for 2D SAS assume a spatially invariant PSF and do not consider 3D effects like occlusion and surface normals, and thus apply only to 2D circular SAS. Prior techniques adapted the WIPE deconvolution method for 2D SAS, however, WIPE was originally designed for 1D deconvolution. Prior techniques extend WIPE deconvolution to 2D SAS by inverting a range migration algorithm (RMA) and evaluating against two SAS images. However, reproducible details on how to invert the RMA, how to apply it to SAS, or how to program the technique are not known. Future work would be needed to implement and adapt WIPE to consider 3D effects and complexities such as occlusion, surface scattering, bistatic arrays, and arbitrary collection geometries.

In addition to back-projection 921 and PFA 923, a "Gradient Descent" (GD) 922 is further provided, which is a neural back-projection method without the INR 397 (refer to FIG. 3A). Instead of an INR 397, error gradients are back-propagated directly to a fixed set of scene voxels. The value of a scene point is computed by trilinear interpolation of the relevant voxels. This comparison is similar to NeRF implementations without a neural network, but note that such an implementation optimizes a spherical harmonic basis rather than scene values directly. Conversely, the gradient descent (GD) 922 comparison is simply the removal of the INR 397 from neural back-projection 921, allowing better observation of the INR 397 specific impacts on reconstruction quality.

Optimization, Visualizations, and Metrics: All real results were reconstructed using an A100 GPU and simulated results using a 3090 Ti GPU. PyTorch python library was used for all experiments. For pulse deconvolution, an INR hash encoding and model architecture derived from 'Instant NeRF' was utilized for its convergence speed. For neural back-projection 921, the same hash encoding technique was used, coupled with four fully-connected layers. Using the A100 system, it takes approximately 40 ms to deconvolve a single 1000 sample measurement. For reconstruction, using 5000 rays and 200 depth samples, it takes proposed methodology 924 approximately 10 ms per iteration, and approximately 10,000-20,000 iterations to converge. The gradient descent 922 method runs marginally slower at approximately 16 ms per iteration. The number of iterations until convergence was approximately equivalent for all scenes reconstructed using between 2000 and 50000 measurements.

Finally, note that back-projection 921 was faster than iterative methods utilizing disclosed methodology 924 as it takes approximately 0.1 ms per measurement (analogous to one iteration since one measurement is processed per iteration). Overall it takes approximately 1-2 hours to reconstruct AirSAS and SVSS scenes with disclosed methodology 924 or gradient descent 922 while back-projection 921 of the scenes takes less than 5 minutes.

Figure 10:
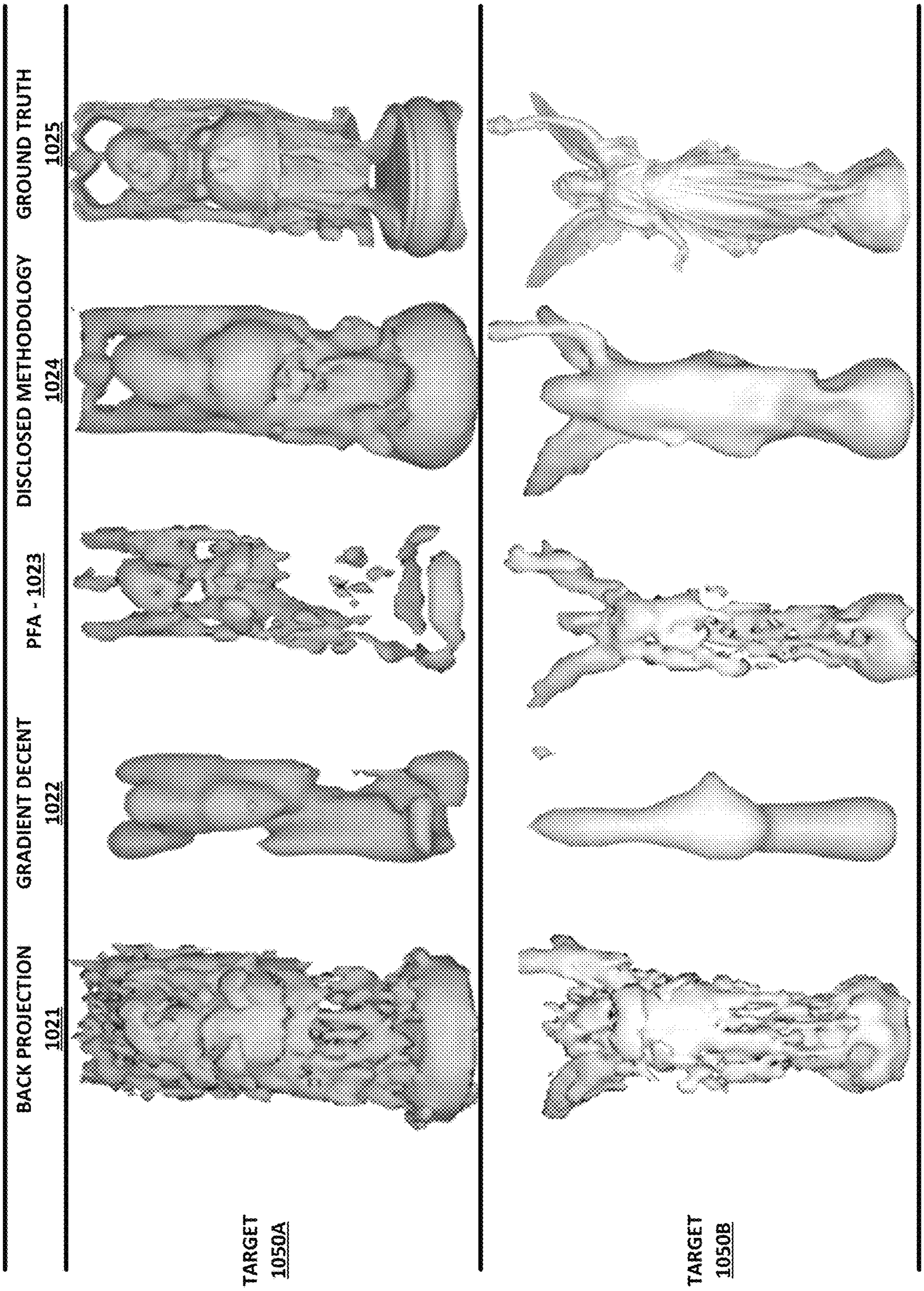
FIG. 10 shows reconstructions from simulated measurements using back-projection 1021, gradient descent 1022, the polar formatting algorithm (PFA) 1023, and disclosed methodology 1024, in accordance with aspects of the disclosure.

FIG. 10 shows reconstructions from simulated measurements using back-projection 1021, gradient descent 1022, the polar formatting algorithm (PFA) 1023, and disclosed methodology 1024, in accordance with aspects of the disclosure. Compared to other methods, the reconstructions of targets 1050A and 1050B using disclosed methodology 1024 more accurately match the ground truth geometry 1025.

AirSAS and SVSS reconstructions are visualized using MATLAB's volumetric rendering function, volshow( ). For the SVSS data, maximum intensity projections (MIPs) were used to better visualize the data collapsed into two dimensions and more easily measure the dimensions of reconstructed targets in the supplemental material.

For simulated visualizations, marching cubes were utilized to export a mesh and render depth and illumination colored images (converted to black and white here). All methods are depicted utilizing the same threshold to provide a fair comparison.

With reference again to FIG. 9, to quantitatively evaluate each method, two 3D metrics are utilized (Chamfer distance 931, intersection-over-union 932 (IOU)) and two image metrics are utilized (PSNR 934, LPIPS 933) for selected viewpoints of the 3D volume. The 3D metrics capture the entire point cloud reconstruction performance, while the 2D image metrics help capture the perceptual quality of the shape from the rendered viewpoints. Processing circuitry computes points for the 3D metrics by exporting each method's predicted point cloud to a mesh. As the point cloud threshold (e.g., points<threshold=0) influences the predicted mesh, processing circuitry sweeps over possible thresholds and selects the threshold that maximizes the performance of each method. The Chamfer distance 931 is calculated based on a point cloud sampled from the reconstructed mesh surface, while IOU 932 is calculated using a voxel representation of the mesh. Processing circuitry computes image metrics on rendered depth-images of the predicted and ground truth mesh at 10 azimuth angles. Depth images are utilized as these are independent of illumination and rely solely on the reconstructed geometry of the object.

Experimental Results:

Disclosed methodology 1024 was experimentally validated on simulated data and two real-data sources. Disclosed methodology 1024 was tested against baselines while varying experiment noise and bandwidths.

Described below are the first real-data source, AirSAS, where disclosed methodology 1024 was tested under varying measurement trajectories, bandwidths, and ablations. A second real-data source is then described having measurements captured of the Foster Joseph Sayers Reservoir, Pennsylvania using SVSS.

The SVSS results validate applicability of disclosed methodology 1024 to underwater environments and bistatic transducer arrays.

Simulation Results Effectiveness of proposed method: Disclosed methodology 1024 is compared against back-projection 1021, the polar formatting algorithm 1023, and gradient descent 1022 on simulated scenes measured with an LFM ($f_c$=20 kHz and Δf=20 kHz) at an SNR of 20 dB.

Table 1 905 (refer to FIG. 9) presents quantitative metrics averaged over reconstructions from eight (8) different objects. Considering PSNR 934 as a metric, disclosed methodology 924 offers a 2 dB improvement over other methods.

With reference to FIG. 10, reconstructions of two targets 1050A and 1050B were used to compute the averages in Table 1 905 (refer to FIG. 9). In general, disclosed methodology 924 more accurately matches the ground truth 1025 geometry, especially occlusions in the mesh. Although disclosed methodology 924 may lose some high-frequency details.

Figure 11A:
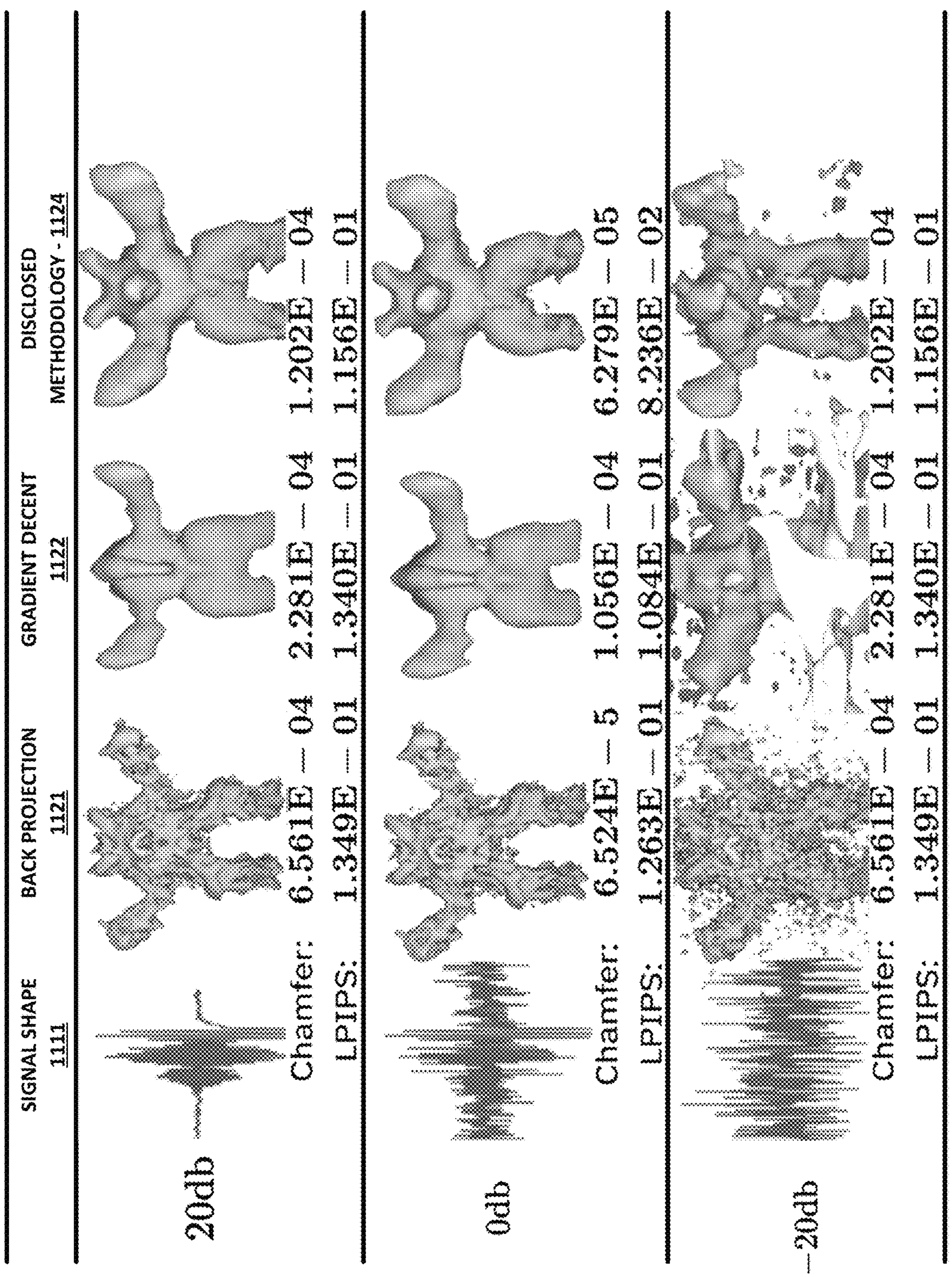
FIGS. 11A and 11B show simulation results using a $\Delta f$=20 kHz LFM showing the reconstructed meshes of an armadillo object at three noise levels, in accordance with aspects of the disclosure.
Figure 11B:
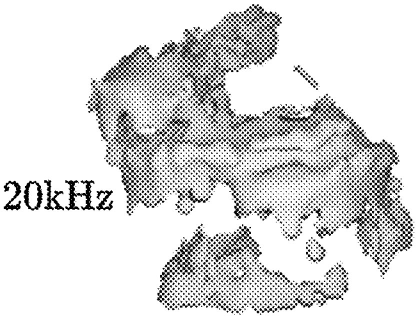
Figure 11B:
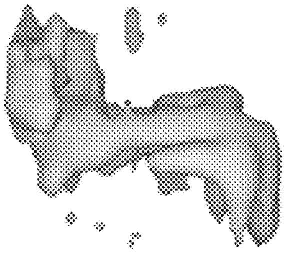
Figure 11B:
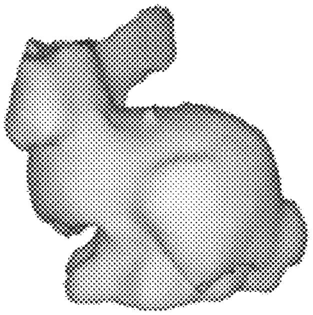
Figure 11B:
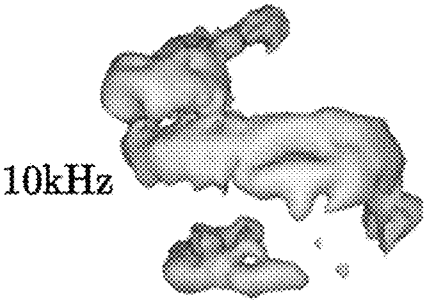
Figure 11B:
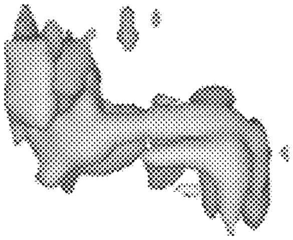
Figure 11B:
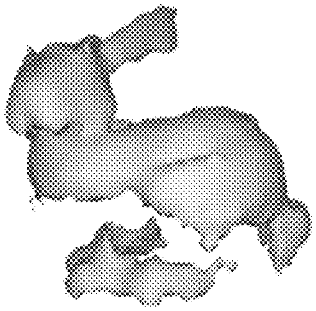
Figure 11B:
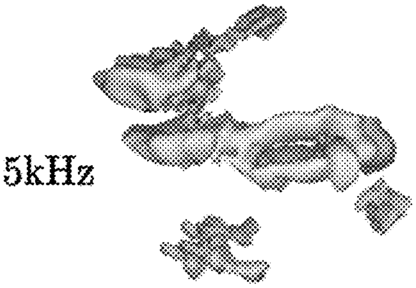
Figure 11B:
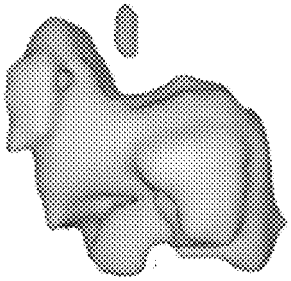
Figure 11B:
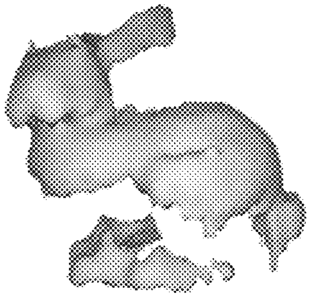

FIGS. 11A and 11B show simulation results using a Δf=20 kHz LFM showing the reconstructed meshes of an armadillo object at three noise levels, in accordance with aspects of the disclosure. Disclosed methodology 1124 performs decently well even at −20 dB signal-to-noise-ratio.

Effects of noise: FIG. 11A depicts reconstructions of an armadillo from each method at three SNR levels and measured using a Δf=20 kHz LFM. The bottom row of the figure shows an example waveform to highlight the challenge of reconstructing the scene under poor SNR conditions. As expected, the performance of each method tends to degrade as SNR decreases. Disclosed methodology 1124 tends to outperform both competing methods at each noise level.

It is further observed that the gradient descent method fails to recover higher frequency details on the object. There also seems to be a saturation level where 20 dB is not that much improved over 0 dB for all methods.

Effects of bandwidth: FIG. 11B shows another experiment where a bunny object is simulated using three LFM bandwidths, Δf=5 kHz, Δf=10 kHz, and Δf=20 kHz. As expected, the performance of all methods degrades at lower bandwidths, but it is observed that disclosed methodology 1124 tends to preserve the shape of spatial features more accurately compared to back-projection 1121 and gradient descent 1122 techniques. This observation is reflected in the quantitative results, where disclosed methodology 924 generally reports superior metrics (refer to Table 1, FIG. 9).

Figure 12:
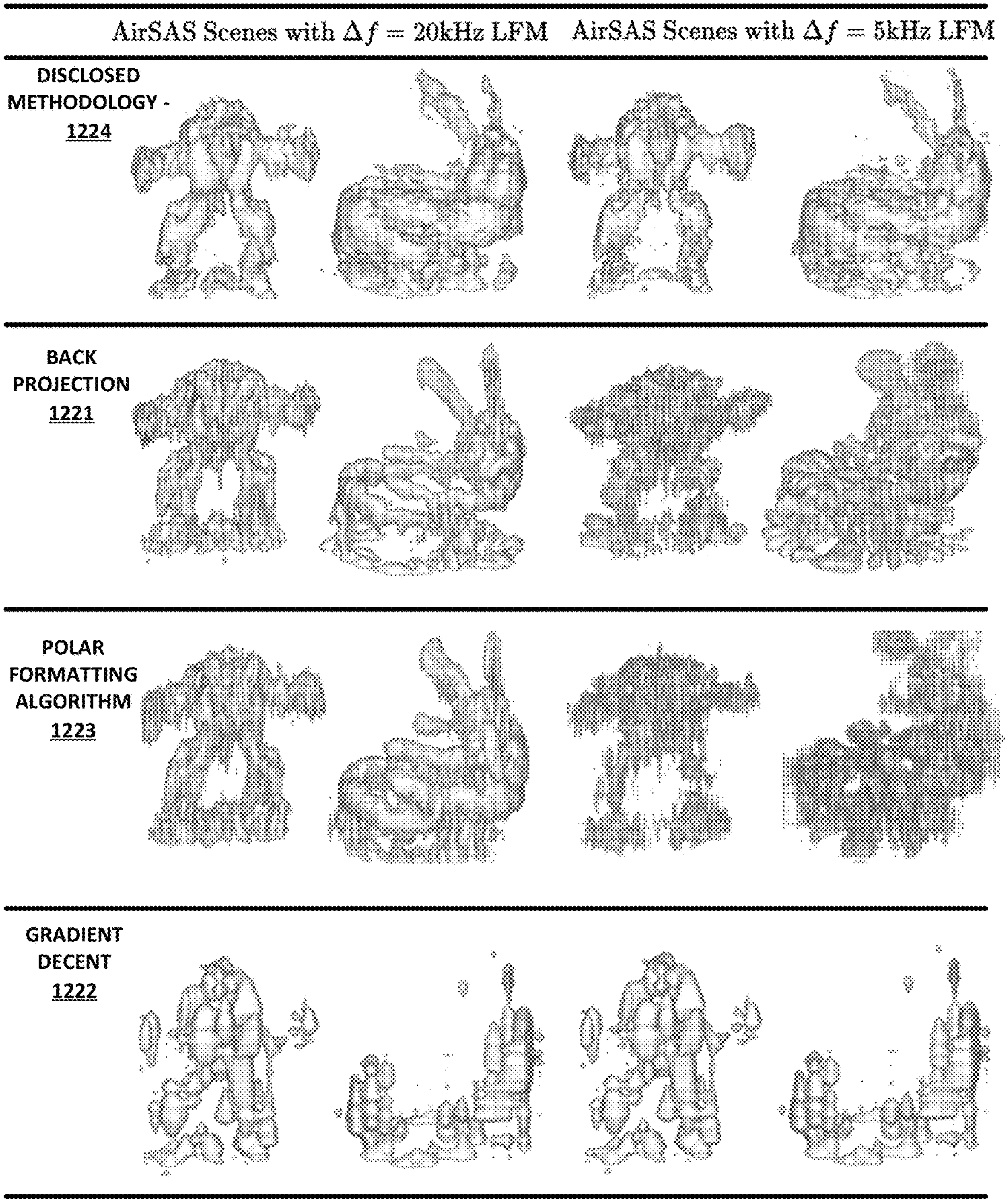
FIG. 12 shows reconstructions of AirSAS data captured with relatively high ($\Delta f$=20 kHz) and low ($\Delta f$=5 kHz) bandwidth LFMs, in accordance with aspects of the disclosure.

FIG. 12 shows reconstructions of AirSAS data captured with relatively high (Δf=20 kHz) and low (Δf=5 kHz) bandwidth LFMs, in accordance with aspects of the disclosure. The disclosed methodology demonstrates more consistent performance across waveform bandwidth compared to back-projection, the polar formatting algorithm, and gradient descent.

AirSAS Reconstructions—Main results: A 3D printed bunny and armadillo were reconstructed that were measured with an LFM of center frequency $f_c$=20 kHz at bandwidths Δf=20 kHz and Δf=5 kHz.

FIG. 12 shows the results of disclosed methodology 1224, back-projection 1221, polar formatting algorithm 1223, and gradient descent 1222. Reconstruction quality decreases across all methods as the bandwidth decreases. However, the quality of disclosed methodology 1224 is notably more consistent across the two bandwidth values, which conforms to the simulated results presented earlier. In the lower bandwidth case, disclosed methodology 1224 produces notably more detailed and artifact-free reconstructions compared to the other methods. This is partially due to the fact that pulse deconvolution of disclosed methodology 1224 performs similarly across both bandwidths, which is not the case for back-projection 1221 since it uses matched filtered waveforms. Additionally, neural back-projection of disclosed methodology 1224 helps overcome structural errors present in back-projection 1221 and PFA 1223, such as the concave head of the bunny target object at the 20 kHz bandwidth.

Gradient descent 1222 yields a reconstruction noisier and less accurate than disclosed methodology 1224, highlighting the importance of using an INR 397 (refer to FIG. 3A) in neural back-projection of disclosed methodology 1224.

FIG. 13 shows helical sampling 1305 and sparse sampling 1310 view reconstructions of AirSAS measurements from Δf=20 kHz AirSAS for bunny and armadillo target objects in accordance with aspects of the disclosure.

Under-sampling: Disclosed methodology 1324 recovers scene geometry while attenuating the undesirable image artifacts that plague back-projection 1321 in under-sampled regimes. In real-world SAS applications, it is difficult to obtain multiple looks at an object from a dense collection of viewpoints. Thus performance of disclosed methodology 1324 is compared with back-projection 1321 in helical sampling 1305 and sparse sampling 1310 schemes. In both the helical sampling 1305 and sparse sampling 1310 cases, the experiment utilized only approximately 10% of the measurements required to be fully sampled in the traditional sense.

Helical sampling 1305 is missing many vertical samples, and therefore induces vertical streaking artifacts in the back-projection 1321 results. While reconstruction of disclosed methodology 1324 is not perfect in this case, it contains fewer vertical streaking artifacts when compared to back-projection 1321. Sparse view sampling 1310 is common in computed-tomography literature, and is known to induce radial streaking artifacts in imagery due to the missing angles. As shown in the bottom row of FIG. 13, disclosed methodology 1324 does remarkably well in this case, reconstructing a scene that is comparable to one obtained with fully sampled measurements.

The notably superior performance of disclosed methodology 1324 can potentially be attributed to sparsity and smoothness priors utilized by disclosed methodology 1324, and also aligns with previous works that demonstrate the utility of INR 397 of disclosed methodology 1324 in limited data reconstruction problems.

Figure 14:
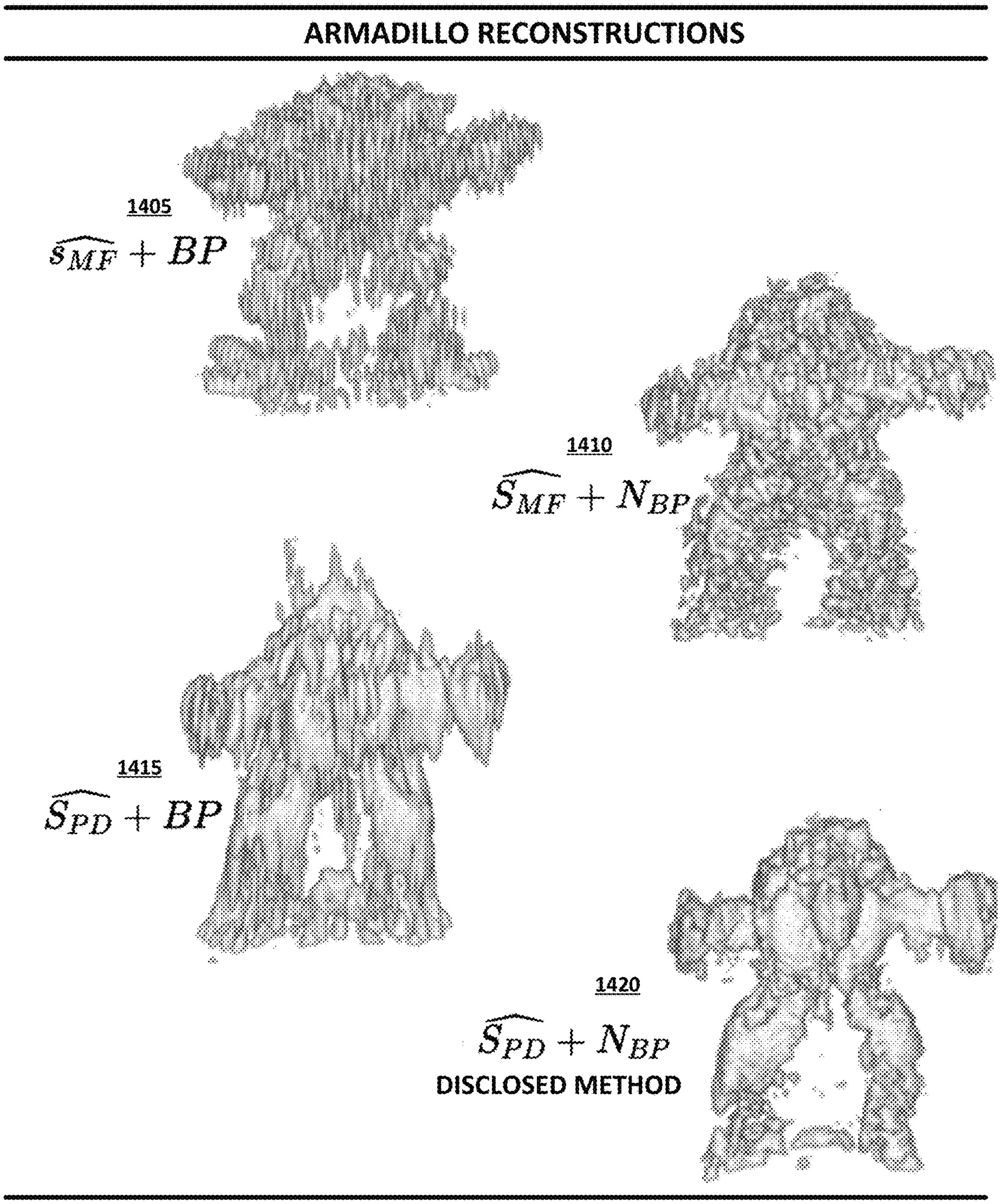
FIG. 14 shows ablating pulse deconvolution and neural back-projection using AirSAS $\Delta f$=5 kHz armadillo measurements, in accordance with aspects of the disclosure.

FIG. 14 shows ablating pulse deconvolution and neural back-projection using AirSAS Δf=5 kHz armadillo measurements. The top left reconstruction (1405) shows the traditional reconstruction pipeline that uses matched filtered waveforms as input to back-projection. The top right reconstruction (1410) shows using the matched filtered waveforms as input to neural back-projection. The bottom left reconstruction (1415) shows using the pulse deconvolved measurements as input to back-projection. The bottom right reconstruction (1420) corresponds to the disclosed methodology and uses pulse deconvolution as input to neural back-projection. Pulse deconvolution of disclosed methodology helps attenuate high-frequency surface noise, while neural back-projection aids in reconstructing accurate geometric features. Both pulse deconvolution and neural back-projection of the disclosed methodology are important for maximizing reconstruction performance.

Ablation studies: The depicted ablations of FIG. 14 investigate various design choices in the pipeline of disclosed methodology. An experiment was performed to highlight the synergistic importance of both pulse deconvolution and neural back-projection using the disclosed methodology. Armadillo reconstructions 1400 depict results yielded using matched-filtering and time-domain back-projection (1405), using matched-filtering and neural back-projection (1410), using pulse deconvolution and time-domain back-projection (1415), and using pulse deconvolution and neural back-projection of the disclosed methodology (1420).

Both steps of disclosed methodology may be utilized for maximizing reconstruction quality. Using match filtered waveforms with neural back-projection gives a slightly more accurate geometry, but is extremely noisy due to the limited range compression abilities of match-filtering. On the other hand, using pulse deconvolved waveforms of disclosed methodology with traditional back-projection yields a smoother reconstruction than the traditional pipeline, but contains streaking artifacts common in back-projection algorithms.

Figure 15:
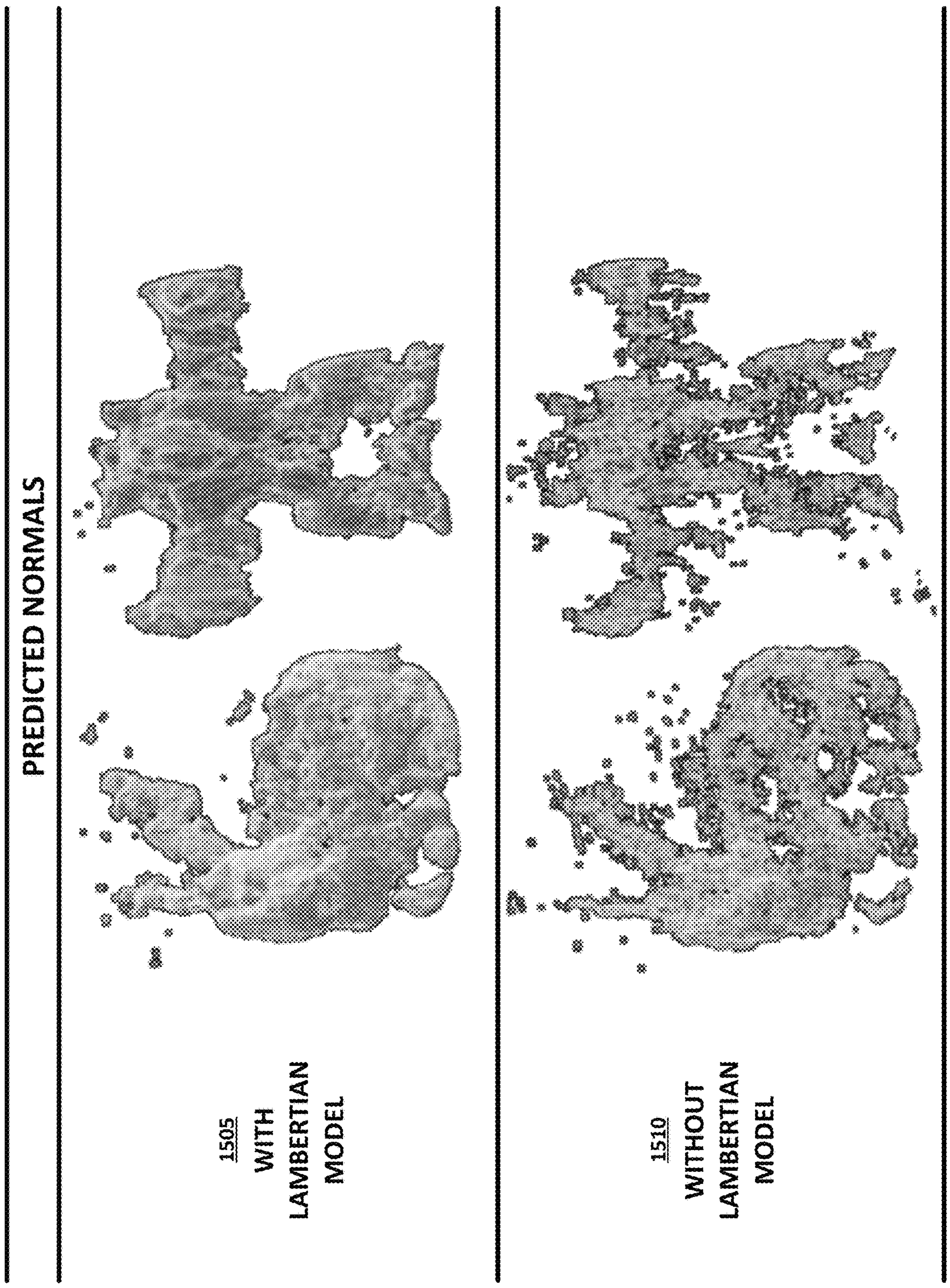
FIG. 15 shows AirSAS reconstructions of scenes measured with a $\Delta f$=20 kHz LFM weighted by the 3D predicted normals encoded using the RGB channels, in accordance with aspects of the disclosure.

FIG. 15 shows AirSAS reconstructions of scenes measured with a Δf=20 kHz LFM weighted by the 3D predicted normals encoded using the RGB channels, in accordance with aspects of the disclosure. Top row shows reconstructions with Lambertian model 1505 and bottom row shows reconstructions without Lambertian model 1510. Using the Lambertian model yields better reconstructions and normal predictions since it enables the model to account for incidence angle.

The Lambertian scattering model utilized by the disclosed methodology may be utilized for visualizing the normals computed by Equation 23. The reconstruction without the Lambertian model 1510 is noisier and sparser as the network struggles to reconstruct a scene consistent with given measurements since the 3D printed object is roughly diffuse in acoustic scattering. The normals also appear almost random without Lambertian model 1510, as the network was not constrained to output consistent surfaces.

Figure 16:
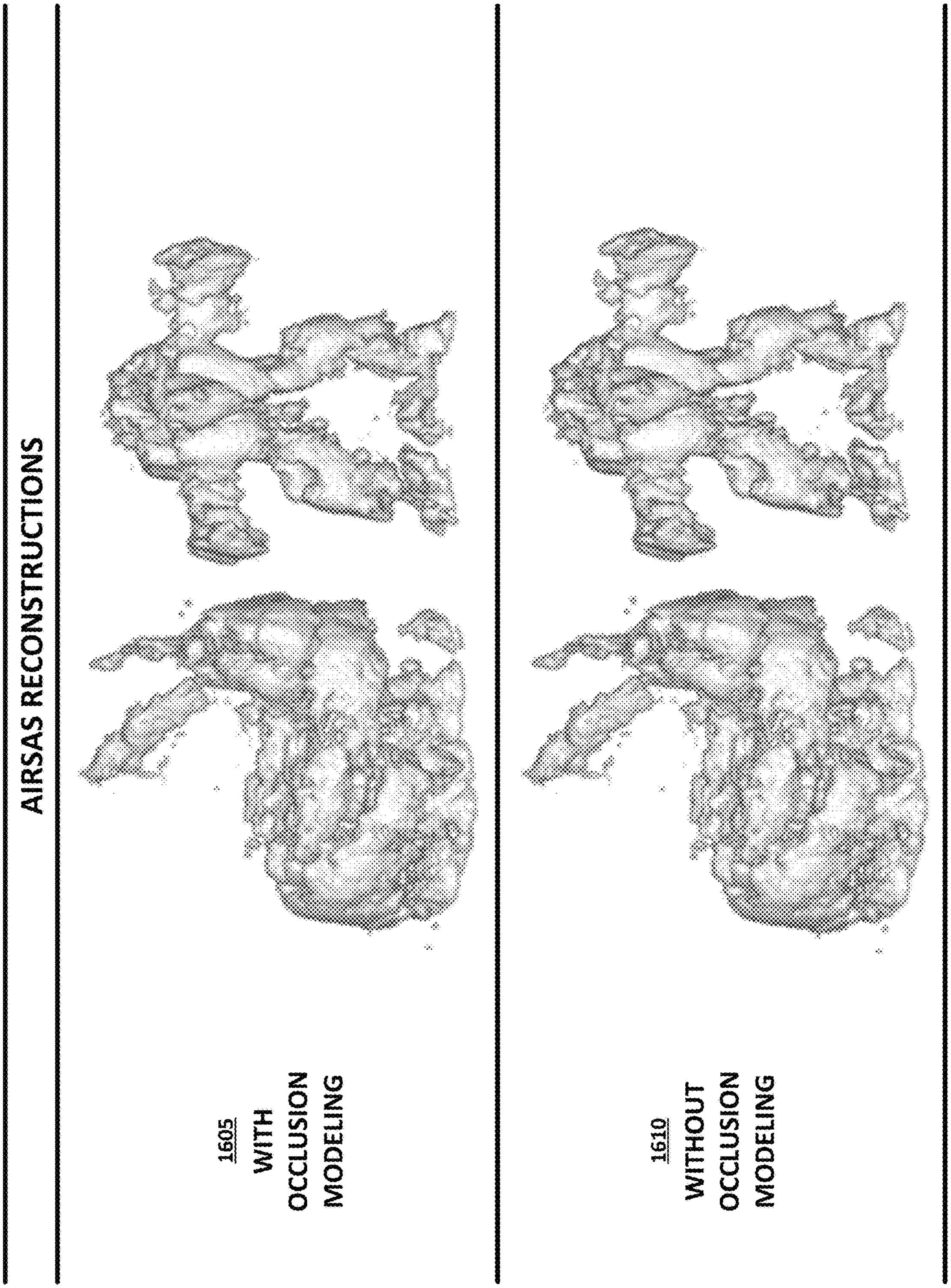
FIG. 16 shows AirSAS reconstructions of scenes measured with a $\Delta f$=20 kHz LFM with occlusion modeling 1605 and without occlusion modeling 1610, in accordance with aspects of the disclosure.

FIG. 16 shows AirSAS reconstructions of scenes measured with a Δf=20 kHz LFM with occlusion modeling 1605 and without occlusion modeling 1610, in accordance with aspects of the disclosure. One experiment turned off occlusion by setting $\zeta$=0 in the transmission probability of Equation 20. Occlusion modeling may be utilized by disclosed methodology to obtain accurate reconstructions.

FIG. 16 ablates the ability of differentiable forward model 376 (refer to FIG. 3B) to handle occlusion by setting $\zeta$=0 in the transmission probability calculation of Equation 20. Without occlusion, neural back-projection fails to capture sharp outlines of the object's geometry. As occlusion was a factor during the capture of the real-data, these artifacts are expected—the network predicts erroneous features since differentiable forward model 376 is unable to account for occlusion.

Figure 17A:
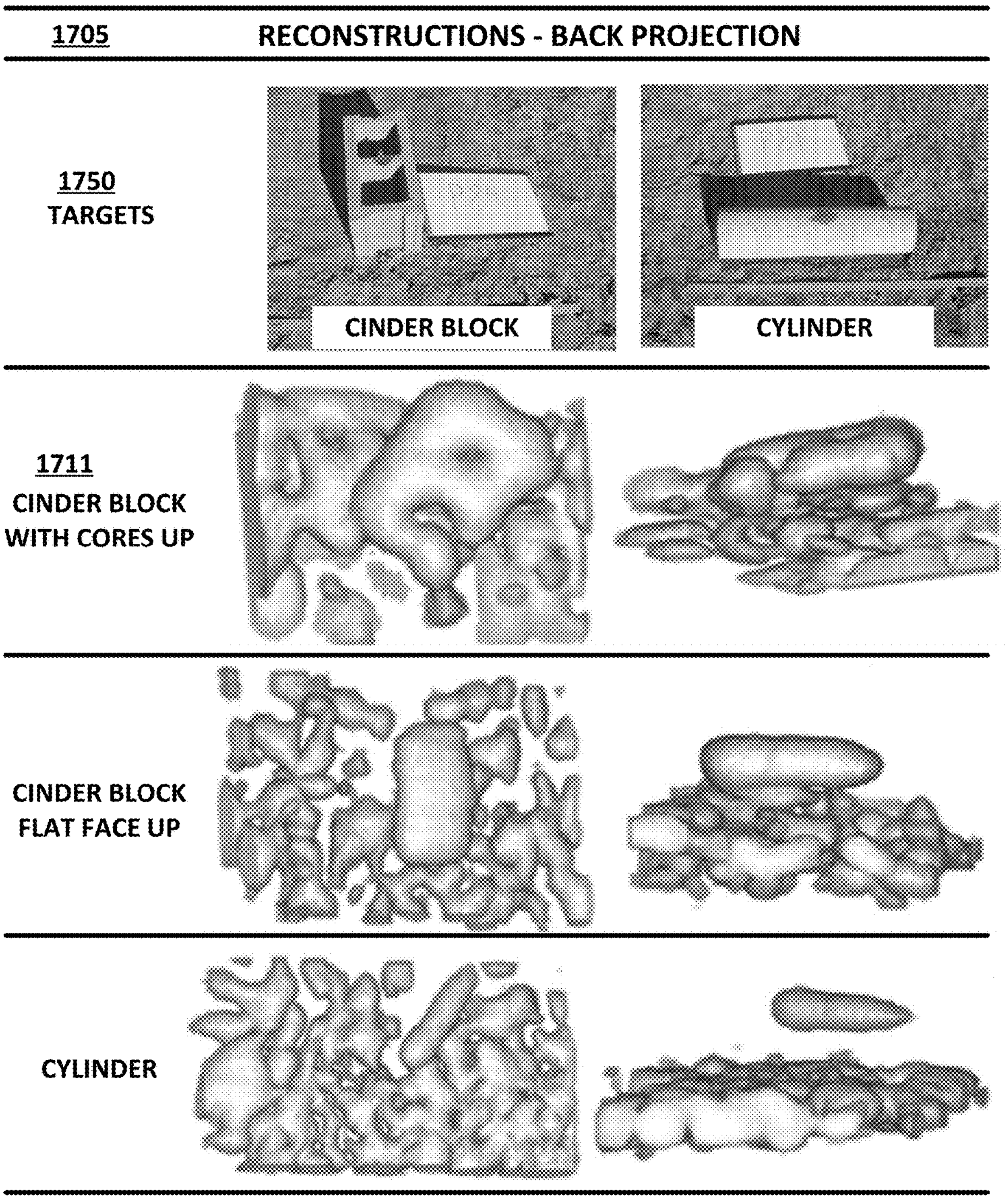
FIGS. 17A and 17B show two views of reconstructions with back-projection (1705 at FIG. 17A) and disclosed methodology (1710 at FIG. 17B) using in-water SAS data captured with SVSS, in accordance with aspects of the disclosure.
Figure 17B:
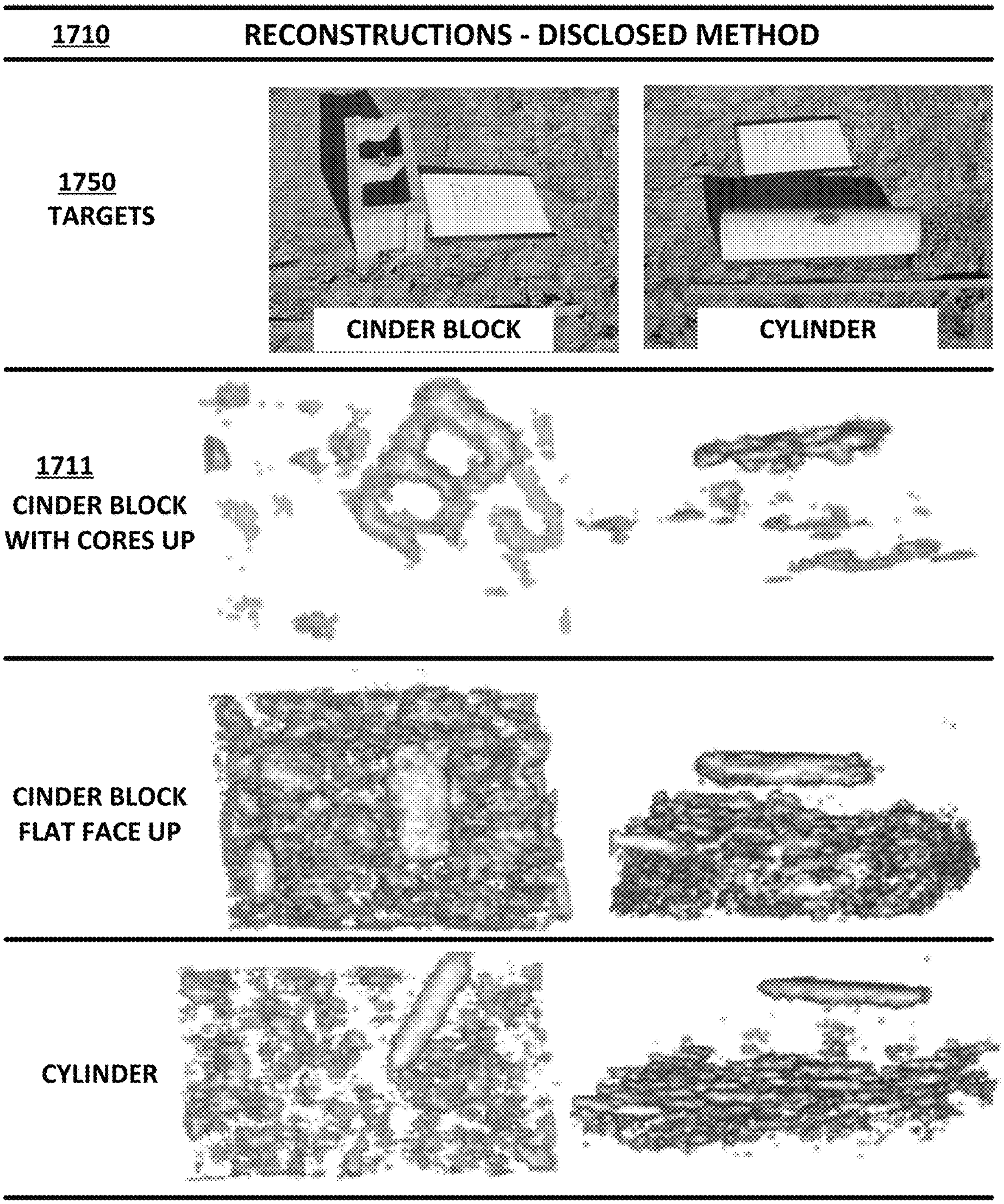

FIGS. 17A and 17B show two views of reconstructions with back-projection (1705 at FIG. 17A) and disclosed methodology (1710 at FIG. 17B) using in-water SAS data captured with SVSS. Disclosed methodology 1710 recovers sharper object geometries of the targets 1750, for example around cinder block with cores up 1711. Objects appear flatter reconstructions by disclosed methodology 1710 because of the pulse deconvolution step compressing measurements more than matched filtering.

SVSS Reconstructions:

Migrating from an in-lab to an in-water SAS deployed in the field brings a new set of challenges. First, the SVSS uses a more complicated sonar array that consists of five transmitters and eighty receivers, each with overlapping beamwidth that should be considered for accurate reconstructions. Additionally, the energy backscattered from the lakebed is relatively strong compared to the targets. As such, a naive application of deconvolution by disclosed methodology 1710 using sparsity regularization tends to deconvolve returns from the lakebed and set the significantly smaller energy from the target 1750 close to zero.

Using these measurements with neural back-projection yields subpar results since the objective function is mainly concerned with reconstructing the background. This issue is overcome by dynamic-range compressing deconvolved measurements of disclosed methodology 1710 before passing them to the network while this step amplifies noise, it makes the energy from the target 1750 strong enough for quality reconstructions. In particular, processing circuitry may dynamic-range compress measurements using $$s_{PD}^{drc} = \text{sign}(s_{PD})|s_{PD}|^{\kappa}, \text{ where } \kappa \to 0$$

increases the compression rate and sgn(•) returns the sign of the argument.

Reconstructions of three targets 1750 of interest are depicted along an SVSS track. Note that a 2D maximum intensity projection (MIP) of an entire track is depicted at FIG. 2C. Overall, reconstructions by disclosed methodology 1710 appear sharper and with flatter side-profiles, because disclosed methodology 1710 better compresses the waveforms during pulse deconvolution. In some cases, the object geometry appears more well-defined using disclosed methodology 1710, for example along the square cutouts in the cinder block target 1750. Disclosed methodology 1710 also measures quantitative dimensions of the reconstructed cinder blocks and it is observed that disclosed methodology 1710 and back-projection are roughly equivalent in estimating metric lengths.

In such a way, disclosed methodology 1710 provides an analysis-by-synthesis optimization for reconstructing SAS scenes, which yields several advantages to traditional approaches, including the ability to incorporate scene priors. Experiments with disclosed methodology 1710 demonstrate the usefulness of this ability as depicted by FIG. 13, where disclosed methodology 1710 achieves far better reconstructions in the under-sampled regimes of helical and sparse-view collection geometries.

Additionally, use of differentiable forward model 376 (refer to FIG. 3B) by disclosed methodology 1710 influences image formation in interesting ways. For example, inclusion of the Lambertian scattering model drastically improves disclosed methodology 1710 reconstructions, as shown in FIG. 15. These scattering constraints are easier to implement in the framework of disclosed methodology 1710 than with back-projection. A promising avenue for future investigations into additional physics-based scattering models that enhance SAS reconstruction accuracy is further provided.

While existing acoustic renderers for simulating SAS measurements exist, the experiments highlight the challenges of designing an efficient differentiable forward model 376 for SAS compatible with analysis-by-synthesis optimization, such as the burdensome sampling requirements for integrating spherically propagating acoustic sources. This challenge is addressed in two ways. First, disclosed methodology 1710 utilizes a pulse deconvolution step that yields waveforms with energy distributed among sparse time bins. It is shown through experiment that synthesis of each of these time bins equates to integrating the scene points that lie on the surfaces of ellipsoids. Second, disclosed methodology 1710 implements importance sampling in range and direction, and processing circuitry computes return rays only at the expected depth to make optimization by disclosed methodology 1710 tractable for 3D reconstructions.

The performance of disclosed methodology 1710 contrasts with back-projection in meaningful ways. First, disclosed methodology 1710 is less sensitive to transmit waveform bandwidth as shown in FIG. 12 when comparing the Δf=20 kHz and Δf=5 kHz reconstructions. As bandwidth is expensive (e.g., expensive transducers), these results demonstrate the potential for high-quality SAS imaging with inexpensive hardware. Second, disclosed methodology 1710 typically recovers more accurate 3D shape details than back-projection. This is due to the pulse deconvolution step of disclosed methodology 1710 compressing the waveforms for accurate localization, and properly modeling occlusion, surface normals, and Lambertian scattering in the differentiable forward model 376 (refer to FIG. 3B).

Analysis-by-synthesis frameworks applied to SAS reconstruction may apply optimizations slower than back-projection. Reconstructions by disclosed methodology 1710 may take up to 1-2 hours to complete, whereas back-projection can reconstruct scenes in minutes. Practically this implies a trade-off for the choice of reconstruction: back-projection may be most useful when surveying large underwater regions, whereas disclosed methodology 1710 can be applied to enhance visual details to regions of interest identified in the back-projected imagery. Additionally, analysis-by-synthesis reconstruction quality is limited by the accuracy of differentiable forward model 376 (refer to FIG. 3B). Using a neural network in the pipeline may compensate for forward model inaccuracies, but this is true only to an extent.

The model may not reconstruct effects ignored by differentiable forward model 376, such as elastic scattering. Elastic scattering describes the phenomena where an insonified target stores then radiates acoustic energy. Elastic scattered energy can be seen as non-zero energy that appears to radiate downward from the cylinder approximately centered on the back-projected 3D reconstruction slice in FIG. 2D. The presence of this energy is useful for target classification and detection. While disclosed methodology 1710 predicts sharper object boundaries, this energy may be absent in disclosed methodology 1710 reconstructions. This may be due to differentiable forward model 376 having no mechanism to handle non-linear acoustics.

Extensions to disclosed methodology 1710 may incorporate physics-based models that handle nonlinear acoustics. There are interesting directions for future work related to accounting for uncertainty in differentiable forward model 376. Extensions to disclosed methodology 1710 may prove useful for solving joint unknown problems. For example, there is typically uncertainty in the SAS platform's position with respect to the scene. Extensions may investigate using the analysis-by-synthesis framework of disclosed methodology 1710 to jointly solve for the platform position and the scene. Second, surrogate modeling may be useful for approximating inefficient and non-differentiable forward models with neural networks.

The pulse deconvolution step of disclosed methodology 1710 may prove useful as using the matched filtered waveforms as input to neural back-projection drastically underperforms using the deconvolved pulse waveforms. However, deconvolution is an ill-posed inverse problem that is sensitive to noise, making the performance of this step depend on sparsity and smoothness hyperparameters. Thus, pulse deconvolution may require user input to select hyperparameters that maximize deconvolution performance. Extensions to disclosed methodology 1710 may seek ways to robustly deconvolve the waveforms that minimize the need for hyperparameter tuning. Finally, the deconvolution method and subsequent neural back-projection operations of disclosed methodology 1710 may be done at the carrier frequency $f_c$, rather than at the baseband spectrum. Because experiments utilizing disclosed methodology 1710 operate a relatively low carrier frequency of $f_c$=20 and $f_c$=27.5 kHz for AirSAS and SVSS, respectively, relative to the sampling rate $F_S$=100 kHZ, this is a non-issue. However, adapting disclosed methodology 1710 to radar or even higher frequency SAS may require adapting the method to baseband signals. Empirically, it is observed that trivially adapting disclosed methodology 1710 to base-banded measurements results in worse reconstructions and therefore, it requires further investigation.

In such a way, the above description provides a reconstruction technique for SAS that outperforms traditional image formation in a number of settings. Importantly, disclosed methodology 1710 scales to in-water SAS data captured from field surveys. Disclosed methodology 1710 is an important step in advancing SAS imaging since it provides a framework for incorporating physics-based knowledge and custom priors into SAS image formation. More broadly, as this work demonstrates an impactful application of neural rendering for SAS, disclosed methodology 1710 opens new possibilities for other synthetic aperture and coherent imaging fields like radar and ultrasound.

Figure 18:
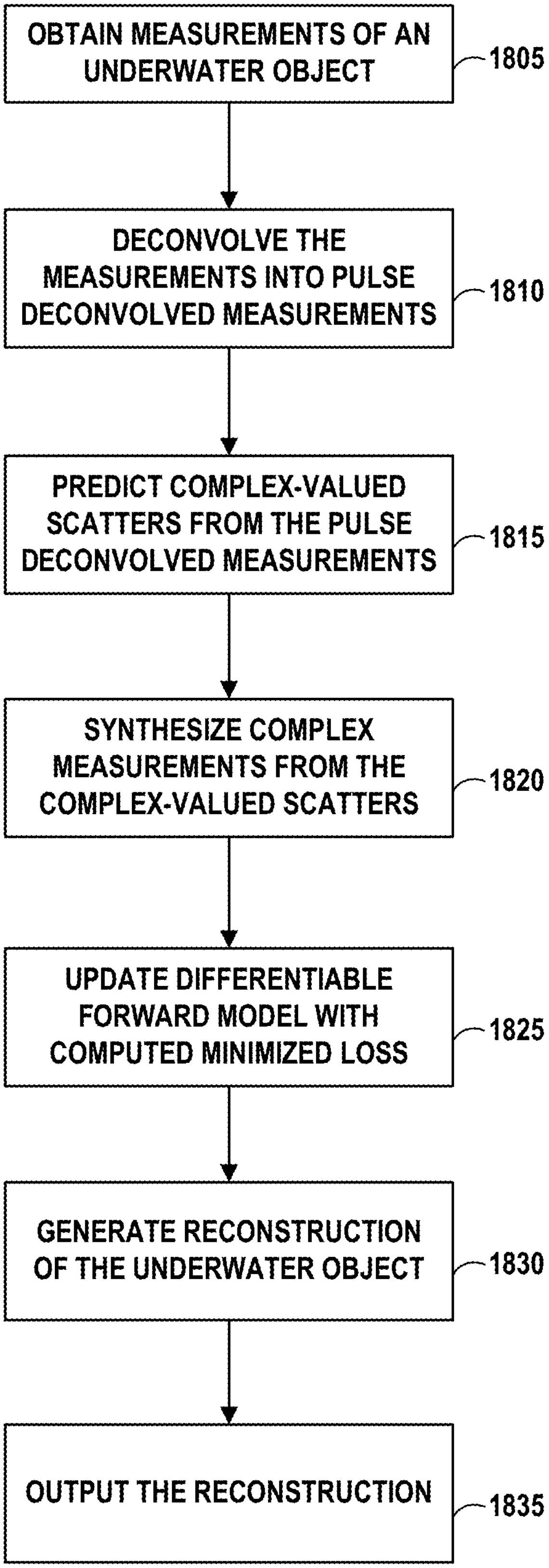
FIG. 18 is a flow chart illustrating an example mode of operation for computing device 100 to implement neural volumetric reconstruction for coherent synthetic aperture sonar, in accordance with aspects of the disclosure.

FIG. 18 is a flow chart illustrating an example mode of operation for computing device 100 to implement neural volumetric reconstruction for coherent synthetic aperture sonar, in accordance with aspects of the disclosure. The mode of operation is described with respect to computing device 100 and FIGS. 1-17.

Computing device 100 may obtain measurements of an underwater object (1805). For example, processing circuitry 199 of computing device 100 may obtain measurements of an underwater object using high-resolution Synthetic aperture sonar (SAS).

Computing device 100 may deconvolve the measurements into pulse deconvolved measurements (1810). For example, processing circuitry 199 of computing device 100 may apply an iterative deconvolution optimization process to the measurements to generate pulse deconvolved measurements.

Computing device 100 may predict complex-valued scatters from the pulse deconvolved measurements (1815). For example, processing circuitry 199 of computing device 100 may perform an analysis-by-synthesis reconstruction using an implicit neural representation to predict complex-valued scatterers from the pulse deconvolved measurements.

Computing device 100 may synthesize complex measurements from the complex-valued scatters (1820). For example, processing circuitry 199 of computing device 100 may generate synthesized complex measurements from the complex-valued scatterers using a differentiable forward model.

Computing device 100 may update a differentiable forward model with computed minimized loss (1825). For example, processing circuitry 199 of computing device 100 may iteratively update weights of the differentiable forward model with a computed minimized loss between the synthesized complex measurements and the complex-valued scatterers.

Computing device 100 may generate a reconstruction of the underwater object (1830). For example, processing circuitry 199 of computing device 100 may generate as output from the differentiable forward model, a reconstruction of the underwater object.

Computing device 100 may output the reconstruction (1835). For example, processing circuitry 199 of computing device 100 may return the output to a computing device.

Computing device 100 may coherently integrate the measurements to generate complex measurements from the measurements. Processing circuitry of computing device 100 may generate, via the differentiable forward model, the synthesized complex measurements using the complex measurements.

Computing device 100 may apply neural back-projection to the measurements using a neural network to estimate the object within a scene. Processing circuitry of computing device 100 may generate the synthesized complex measurements using the complex measurements.

Computing device 100 may perform neural volumetric reconstruction of the object using the measurements obtained of the underwater object using coherent synthetic aperture sonar.

Computing device 100 may tune performance of the differentiable forward model via sparsity and smoothness parameters for the reconstruction of the underwater object.

Computing device 100 may iteratively perform the analysis-by-synthesis reconstruction via the differentiable forward model to reduce back-projection streaking artifacts within the reconstruction of the underwater object.

Computing device 100 may obtain measurements of the underwater object using moving Synthetic Aperture Sonar (SAS) to collect both magnitude and phase information of a scene surrounding the underwater object.

Computing device 100 may optimize the reconstruction of the underwater object using physics-based constraints and scene priors incorporated into an image formation process by the differentiable forward model which generates the reconstruction of the underwater object as output.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with the examples of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

What is claimed is:

1. A system comprising:

processing circuitry; and non-transitory computer readable media storing instructions that, when executed by the processing circuitry, configure the processing circuitry to:

obtain measurements of an underwater object using high-resolution synthetic aperture sonar (SAS);

apply an iterative deconvolution optimization process to the measurements to generate pulse deconvolved measurements;

perform an analysis-by-synthesis reconstruction using an implicit neural representation to predict complex-valued scatterers from the pulse deconvolved measurements;

generate synthesized complex measurements from the complex-valued scatterers using a differentiable forward model;

iteratively update weights of the differentiable forward model with a computed minimized loss between the synthesized complex measurements and the complex-valued scatterers;

generate as output from the differentiable forward model, a reconstruction of the underwater object; and return the output to a computing device.

2. The system of claim 1, wherein the processing circuitry is further configured to:

coherently integrate the measurements to generate complex measurements from the measurements; and generate, via the differentiable forward model, the synthesized complex measurements using the complex measurements.

3. The system of claim 1, wherein the processing circuitry is further configured to:

apply neural back-projection to the measurements using a neural network to estimate the object within a scene; and generate the synthesized complex measurements using the complex measurements.

4. The system of claim 1, wherein the processing circuitry is further configured to:

perform neural volumetric reconstruction of the object using the measurements obtained of the underwater object using coherent synthetic aperture sonar.

5. The system of claim 1, wherein the processing circuitry is further configured to:

tune performance of the differentiable forward model via sparsity and smoothness parameters for the reconstruction of the underwater object.

6. The system of claim 1, wherein the processing circuitry is further configured to:

iteratively perform the analysis-by-synthesis reconstruction via the differentiable forward model to reduce back-projection streaking artifacts within the reconstruction of the underwater object.

7. The system of claim 1, wherein the processing circuitry is further configured to:

obtain measurements of the underwater object using moving Synthetic Aperture Sonar (SAS) to collect both magnitude and phase information of a scene surrounding the underwater object.

8. The system of claim 1, wherein the processing circuitry is further configured to:

optimize the reconstruction of the underwater object using physics-based constraints and scene priors incorporated into an image formation process by the differentiable forward model which generates the reconstruction of the underwater object as output.

9. A computer-implemented method comprising:

obtaining measurements of an underwater object using high-resolution Synthetic aperture sonar (SAS);

applying an iterative deconvolution optimization process to the measurements to generate pulse deconvolved measurements;

performing an analysis-by-synthesis reconstruction using an implicit neural representation to predict complex-valued scatterers from the pulse deconvolved measurements;

generating synthesized complex measurements from the complex-valued scatterers using a differentiable forward model;

iteratively updating weights of the differentiable forward model with a computed minimized loss between the synthesized complex measurements and the complex-valued scatterers;

generating as output from the differentiable forward model, a reconstruction of the underwater object; and returning the output to a computing device.

10. The computer-implemented method of claim 9, further comprising:

coherently integrating the measurements to generate complex measurements from the measurements; and generating, via the differentiable forward model, the synthesized complex measurements using the complex measurements.

11. The computer-implemented method of claim 9, further comprising:

applying neural back-projection to the measurements using a neural network to estimate the object within a scene; and generating the synthesized complex measurements using the complex measurements.

12. The computer-implemented method of claim 9, further comprising:

performing neural volumetric reconstruction of the object using the measurements obtained of the underwater object using coherent synthetic aperture sonar.

13. The computer-implemented method of claim 9, further comprising:

tuning performance of the differentiable forward model via sparsity and smoothness parameters for the reconstruction of the underwater object.

14. The computer-implemented method of claim 9, further comprising:

iteratively performing the analysis-by-synthesis reconstruction via the differentiable forward model to reduce back-projection streaking artifacts within the reconstruction of the underwater object.

15. The computer-implemented method of claim 9, further comprising:

obtaining measurements of the underwater object using moving Synthetic Aperture Sonar (SAS) to collect both magnitude and phase information of a scene surrounding the underwater object.

16. The computer-implemented method of claim 9, further comprising:

optimizing the reconstruction of the underwater object using physics-based constraints and scene priors incorporated into an image formation process by the differentiable forward model which generates the reconstruction of the underwater object as output.

17. Non-transitory computer-readable storage media comprising instructions that, when executed, configure processing circuitry to:

obtain measurements of an underwater object using high-resolution Synthetic aperture sonar (SAS);

apply an iterative deconvolution optimization process to the measurements to generate pulse deconvolved measurements;

perform an analysis-by-synthesis reconstruction using an implicit neural representation to predict complex-valued scatterers from the pulse deconvolved measurements;

generate synthesized complex measurements from the complex-valued scatterers using a differentiable forward model;

iteratively update weights of the differentiable forward model with a computed minimized loss between the synthesized complex measurements and the complex-valued scatterers;

generate as output from the differentiable forward model, a reconstruction of the underwater object; and return the output to a computing device.

18. The non-transitory computer-readable storage media of claim 17, wherein the processing circuitry is further configured to:

coherently integrate the measurements to generate complex measurements from the measurements; and generate, via the differentiable forward model, the synthesized complex measurements using the complex measurements.

19. The non-transitory computer-readable storage media of claim 17, wherein the processing circuitry is further configured to:

apply neural back-projection to the measurements using a neural network to estimate the object within a scene; and generate the synthesized complex measurements using the complex measurements.

20. The non-transitory computer-readable storage media of claim 17, wherein the processing circuitry is further configured to:

perform neural volumetric reconstruction of the object using the measurements obtained of the underwater object using coherent synthetic aperture sonar.

* * * * *